US010237259B2

(12) United States Patent
Ronda et al.

(10) Patent No.: US 10,237,259 B2
(45) Date of Patent: Mar. 19, 2019

(54) SYSTEMS AND METHODS FOR DISTRIBUTED IDENTITY VERIFICATION

(71) Applicant: SecureKey Technologies Inc., Toronto (CA)

(72) Inventors: Troy Jacob Ronda, Toronto (CA); Pierre Antoine Roberge, Toronto (CA); Dmitry Barinov, Richmond Hill (CA); Michael Varley, Toronto (CA); David Alexander Stark, Markham (CA); Gregory Howard Wolfond, Toronto (CA); Aleksandar Likic, Etobicoke (CA); Michael John Page, Markham (CA)

(73) Assignee: SecureKey Technologies Inc., Toronto (CA)

( * ) Notice: Subject to any disclaimer, the term of this patent is extended or adjusted under 35 U.S.C. 154(b) by 142 days.

(21) Appl. No.: 15/445,367

(22) Filed: Feb. 28, 2017

(65) Prior Publication Data

US 2017/0250972 A1    Aug. 31, 2017

Related U.S. Application Data

(60) Provisional application No. 62/453,133, filed on Feb. 1, 2017, provisional application No. 62/355,661, filed
(Continued)

(51) Int. Cl.
*H04L 9/32* (2006.01)
*H04L 29/06* (2006.01)
*H04L 9/08* (2006.01)

(52) U.S. Cl.
CPC ............. *H04L 63/08* (2013.01); *H04L 9/08* (2013.01); *H04L 9/0891* (2013.01);
(Continued)

(58) Field of Classification Search
None
See application file for complete search history.

(56) References Cited

U.S. PATENT DOCUMENTS 7,784,092 B2 * 8/2010 Pearson .............. H04L 63/0815
726/12
9,118,661 B1 * 8/2015 Juels ................... H04L 63/0853
(Continued)

FOREIGN PATENT DOCUMENTS

WO   2017/147692 A1   9/2017
WO   2017/147696 A1   9/2017

OTHER PUBLICATIONS

Joseph C. Guagliardo and Brittany Birnbaum, "Blockchain: Preparing for Disruption Like It's the '90s", Law360, Mar. 14, 2016, New York, USA. Available: https://www.law360.com/articles/771200/blockchain-preparing-for-disruption-like-it-s-the-90s.
(Continued)

*Primary Examiner* — Gary S Gracia
(74) *Attorney, Agent, or Firm* — Bereskin & Parr LLP/S.E.N.C.R.L., s.r.l.

(57) ABSTRACT

Systems and methods for decentralized and asynchronous authentication flow between users, relying parties and identity providers. A trusted user agent application or digital lock box under a user's control may perform the functions of an authentication broker. In particular, the user agent application or digital lock box can accept relying party requests and respond with authentication and identity data previously obtained from an identity provider server, and without the involvement of a centralized broker server.

9 Claims, 22 Drawing Sheets

Related U.S. Application Data on Jun. 28, 2016, provisional application No. 62/301,129, filed on Feb. 29, 2016.

(52) U.S. Cl.
CPC .......... *H04L 9/3236* (2013.01); *H04L 9/3247* (2013.01); *H04L 63/0428* (2013.01); *H04L 63/06* (2013.01); *H04L 63/123* (2013.01); *H04L 2209/38* (2013.01)

(56) References Cited

U.S. PATENT DOCUMENTS

| | | | |
|---|---|---|---|
| 9,854,001 B1* | 12/2017 | Roth | H04L 63/20 |
| 2004/0128546 A1* | 7/2004 | Blakley, III | G06F 21/6245 726/8 |
| 2004/0153560 A1* | 8/2004 | Masuhiro | H04L 41/26 709/229 |
| 2006/0021019 A1* | 1/2006 | Hinton | G06F 21/41 726/10 |
| 2008/0022085 A1* | 1/2008 | Hiltgen | H04L 63/0428 713/155 |
| 2009/0235345 A1* | 9/2009 | Oikawa | G06F 21/31 726/7 |
| 2010/0088519 A1* | 4/2010 | Tsuruoka | G06F 21/33 713/176 |
| 2010/0131973 A1* | 5/2010 | Dillon | G06F 21/10 725/27 |
| 2013/0318576 A1* | 11/2013 | Prakash | H04L 9/3226 726/4 |
| 2014/0196037 A1* | 7/2014 | Gopalan | G06F 9/4856 718/1 |
| 2014/0289117 A1* | 9/2014 | Baghdasaryan | G06Q 20/42 705/44 |
| 2014/0289833 A1* | 9/2014 | Briceno | H04L 63/08 726/7 |
| 2015/0288694 A1* | 10/2015 | Liebl, III | G06F 21/31 713/182 |
| 2015/0332395 A1* | 11/2015 | Walker | G06Q 20/06 705/69 |
| 2015/0350198 A1* | 12/2015 | Li | H04L 63/0823 713/156 |
| 2015/0381602 A1* | 12/2015 | Grim | H04L 63/08 726/4 |
| 2016/0119343 A1* | 4/2016 | Salmela | H04W 12/04 726/7 |
| 2016/0253622 A1* | 9/2016 | Sriram | H04L 63/126 713/179 |
| 2017/0251025 A1* | 8/2017 | Varley | H04L 9/3247 |

OTHER PUBLICATIONS

Thomas Harning, "Bitcoin Deterministic Key Generation", Blog for the Electrum for Android—Native Edition Project, Jul. 10, 2013, Available: http://e4a-ne.blogspot.com/2013/07/bitcoin-deterministic-key-generation.html.

Don Johnson, Alfred Menezes, and Scott Vanstone, "The Elliptic Curve Digital Signature Algorithm (ECDSA)", 2001, Certicom Corporation, Canada, Available: https://doi.org/10.1007/s102070100002.

Peter Wuille, "BIP0032: Hierarchical Deterministic Wallets", Feb. 11, 2012, Bitcoin Wiki, Available: https://github.com/bitcoin/bips/blob/master/bip-0032.mediawiki.

Michael B. Jones, "RFC7518: JSON Web Algorithms (JWA)", Internet Engineering Task Force (IETF), May 2015, ISSN: 2070-1721, Microsoft, USA.

Michael B. Jones, "RFC7517: JSON Web Key (JWK)", Internet Engineering Task Force (IETF), May 2015, ISSN: 2070-1721, Microsoft, USA.

Bitcoin Wiki, "Protocol Documentation", Accessed: Feb. 11, 2016, Available: https://en.bitcoin.it/wiki/Protocol_documentation.

Marek Palatinus and Pavol Rusnak, "BIP0043: Purpose Field for Deterministic Wallets", Bitcoin Wiki, Apr. 24, 2014, Available: https://github.com/bitcoin/bips/blob/master/bip-0043.mediawiki.

Justus Ranvier, "BIP0047: Reusable Payment Codes for Hierarchical Deterministic Wallets", Bitcoin Wiki, Apr. 24, 2015, Available: https://github.com/bitcoin/bips/blob/master/bip-0047.mediawiki.

Bitcoin Wiki, "Secp256k1" Accessed: Feb. 11, 2016, Available: https://en.bitcoin.it/wiki/Secp256k1.

Wikipedia, "Shamir's Secret Sharing", Accessed: Feb. 11, 2016, Available: https://en.wikipedia.org/wiki/Shamir's_Secret_Sharing.

Russell Housley, "RFC5084: Using AES-CCM and AES-GCM Authenticated Encryption in the Cryptographic Message Syntax (CMS)", Nov. 2007, Internet Engineering Task Force (IETF), Nov. 2007, Available: https://tools.ietf.org/html/rfc5084.

Documents relating to International Application No. PCT/CA2017/050252, dated Apr. 13, 2017 (International Search Report and Written Opinion).

Documents relating to International Application No. PCT.CA2017/050263, dated May 12, 2017 (International Search Report and Written Opinion).

Documents relating to U.S. Appl. No. 15/443,400 dated Nov. 23, 2018, pp. 1-37 (Office Action and List of References Cited).

* cited by examiner

US 10,237,259 B2

SYSTEMS AND METHODS FOR DISTRIBUTED IDENTITY VERIFICATION

CROSS-REFERENCE TO RELATED APPLICATIONS

This application claims the benefit of U.S. provisional patent application no. 62/301,129, filed Feb. 29, 2016, U.S. provisional patent application no. 62/355,661, filed Jun. 28, 2016, and U.S. provisional patent application no. 62/453,133, filed Feb. 1, 2017. The entire content of U.S. provisional patent application nos. 62/301,129, 62/355,661, and 62/453,133 is hereby incorporated by reference.

FIELD

The described embodiments relate to identity verification in electronic systems and, in particular, to identity provision and verification in a networked environment such as the Internet.

BACKGROUND

Many identity verification systems use a broker-based model, which employs a broker to facilitate end-user identification. For example, one federated model used on the Internet allows a user to identify to a relying party by leveraging existing data from a preferred identity provider. The traditional deployment model uses a centralized broker to act as the interface between identity providers and relying parties.

However, existing broker-based models suffer from a number of drawbacks. For example, existing models rely upon the continued and active participation of identity providers, meaning that service outages or the decommissioning of identity provider services can result in the inability to use a source of identification. Existing models do not allow for users to mix-and-match identification attributes from multiple identity providers, limiting their usefulness in many situations. Furthermore, existing models require the disclosure, such as an address, of the sensitive data that is being used for identification. These and other drawbacks highlight the need for improved methods and systems for electronic identity provision and verification.

SUMMARY

In a broad aspect, there is provided an identity management method for controlling an exchange of data bundles by an identity provider server, the method comprising: receiving, at the identity provider server, a first request from a user agent server, the first request identifying one or more claim categories; generating, at the identity provider server, a data bundle at a first time in response to the first request, the data bundle identifying one or more attributes associated with a user related to the user agent server, wherein each attribute corresponds to a claim category of the one or more claim categories identified in the first request and a corresponding value; and transmitting, by the identity provider server, the data bundle to the user agent server.

In some cases, methods further comprise, prior to transmitting, the identity provider server encrypting the data bundle with a user encryption key (UEK).

In some cases, methods further comprise: prior to receiving the first request, registering the user agent server at the identity provider server.

In some cases, registering the user agent server at the identity provider server comprises: receiving a user agent public key corresponding to the user agent server and a first user agent address uniquely identifying the user agent server to the identity provider server; and transmitting an identity provider public key associated with the identity provider server to the user agent server.

In some cases, the first user agent address and the user encryption key are at least partially based on the user agent public key.

In some cases, methods further comprise: generating, at the identity provider server, a data bundle ownership public key for the user agent server, the data bundle ownership public key being usable for releasing a response bundle based on one or more data bundles to a relying party server.

In some cases, methods further comprise: generating a data encryption key (DEK) for encrypting the one or more attributes identified in the data bundle; and encrypting the one or more attributes with the data encryption key to generate corresponding one or more encrypted attributes.

In some cases, methods further comprise: splitting the data encryption key into at least a first data encryption key and a second data encryption key.

In some cases, methods further comprise: computing a cryptographic hash of the one or more attributes to generate corresponding one or more hashed attributes.

In some cases, methods further comprise: transmitting a key registrar bundle to a key registrar server, the key registrar bundle comprising the second data encryption key and the one or more hashed attributes, wherein the key registrar bundle is encrypted with a key registrar public key and signed by the identity provider server with an identity provider private key.

In some cases, the key registrar server is configured to: decrypt the key registrar bundle using a key registrar private key to generate a decrypted key registrar bundle; verify signature of the identity provider server based on the identity provider public key to generate a signature verification result; and store the decrypted key registrar bundle and the signature verification result in a key registrar record.

In some cases, methods further comprise: generating a first entry for a first ledger, the first entry comprising: a hashed data bundle generated by cryptographic hashing of the data bundle; the data bundle ownership public key; the identity provider public key; the one or more hashed attributes and corresponding blinding factor; a cryptographic nonce; metadata corresponding to the one or more attributes; expiry information corresponding to the one or more attributes; a second ledger identifier identifying a second ledger storing a corresponding second entry and a second entry address identifying an address of the second entry in the second ledger; and a revocation status of the data bundle.

In some cases, methods further comprise: signing the first entry with an identity provider private key corresponding to the identity provider server to generate a signed first entry; and transmitting the signed first entry to the first ledger.

In some cases, the first ledger is configured to: verify signature of the identity provider server on the first entry to generate a first signature verification result; store the first entry in the first ledger based on the first signature verification result; and transmit a first entry address to the identity provider server, the first entry address identifying an address of the first entry in the first ledger.

In some cases, methods further comprise: generating a second entry for a second ledger, the second entry comprising: a hashed data bundle generated by cryptographic hashing of the data bundle; a cryptographic hash of the data bundle ownership public key and a corresponding blinding factor; a cryptographic hash of the identity provider public key and a corresponding blinding factor; the one or more hashed attributes and corresponding blinding factor; a cryptographic nonce; metadata corresponding to the one or more attributes; expiry information corresponding to the one or more attributes; and a revocation status of the data bundle.

In some cases, methods further comprise: signing the second entry with a second key to generate a signed second entry, the second key being derived from an identity provider private key corresponding to the identity provider server; and transmitting the signed second entry to the second ledger.

In some cases, the second ledger is configured to: verify signature of the identity provider server on the second entry to generate a second signature verification result; store the second entry in the second ledger based on the second signature verification result; and transmit the second entry address to the identity provider server.

In some cases, methods further comprise: generating an auditor bundle for an auditor system comprising one or more auditor servers, the auditor bundle comprising a first ledger identifier identifying the first ledger storing the first entry, a second ledger identifier identifying the second ledger storing the second entry, the first entry address and the second entry address; and signing the auditor bundle with the identity provider private key corresponding to the identity provider server to generate a signed auditor bundle.

In some cases, the auditor system is configured to: access the first entry based on the first ledger identifier and the first entry address; verify the signature of the identity provider server on the first entry; access the second entry based on the second ledger identifier and the second entry address; verify the signature of the identity provider server on the second entry; generate a confirmation entry for each of the one or more auditor servers within the auditor system, wherein each confirmation entry is based on successful verification of the signature of the identity provider server on the first entry and the signature of the identity provider server on the second entry; and link the first entry address to the second ledger identifier and the second entry address to the first ledger identifier based on the confirmation entry of the one or more auditor servers.

In some cases, the data bundle further comprises: encrypted attributes generated by encrypting the one or more attributes identified in the data bundle with the data encryption key; hashed attributed generated by cryptographic hashing of the one or more attributes within the data bundle; metadata corresponding to the one or more attributes; the first data encryption key; a first ledger identifier identifying the first ledger storing the first entry; a second ledger identifier identifying the second ledger storing the second entry; the first entry address; and the second entry address;

In some cases, the data bundle further comprises: user visible attributes selected from the one or more attributes identified in the data bundle.

In some cases, the data bundle further comprises: derivation material generated by the identity provider server.

In some cases, the encrypted data bundle is signed by the identity provider private key.

In some cases, the user agent server is further configured to: generate a user encryption key based on the derivation material; decrypt the encrypted data bundle based on the user decryption key to generate a decrypted data bundle; and store the decrypted data bundle in a user database managed by the user agent server.

In some cases, methods further comprise the identity provider server generating and transmitting a revocation update to the second ledger, the revocation update for causing the second ledger to change the revocation status of the data bundle to indicate revocation.

In some cases, the identity provider server is a group identity provider server, and methods may further comprise: the identity provider server determining that a child transaction is required to fulfil the first request; and generating at least one child transaction request; and transmitting the at least one child transaction request to at least one other group identity provider server.

In some cases, methods may further comprise: the identity provider server determining that a blind query is required to fulfil the first request; and generating at least one blind query; and transmitting the at least one blind query to at least one other identity provider server.

In another broad aspect, there is provided an identity management system for controlling an exchange of data bundles, the system comprising: a memory unit; and a processing unit coupled to the memory unit, the processing unit being configured to carry out methods as described herein.

In another broad aspect, there is provided an identity management system for controlling an exchange of data bundles, the system comprising: a user agent server configured to transmit a first request identifying one or more claim categories to an identity provider server; and the identity provider server in communication with the user agent server, the identity provider server being configured to: receive the first request; generate a data bundle at a first time in response to the first request, the data bundle identifying one or more attributes associated with a user related to the user agent server, wherein each attribute corresponds to a claim category of the one or more claim categories identified in the first request and a corresponding value; transmit the data bundle to the user agent server.

In some cases, the identity provider server is configured to: generate a first entry; sign the first entry with an identity provider private key corresponding to the identity provider server to generate a signed first entry; generate a second entry; and sign the second entry with a second key to generate a signed second entry, the second key being derived from the identity provider private key.

In some cases, the system further comprises: a first ledger configured to: verify signature of the identity provider server on the first entry to generate a first signature verification result; store the first entry in the first ledger based on the first signature verification result; and transmit a first entry address to the identity provider server, the first entry address identifying an address of the first entry in the first ledger; and a second ledger configured to: verify signature of the identity provider server on the second entry to generate a second signature verification result;

store the second entry in the second ledger based on the second signature verification result; and transmit a second entry address to the identity provider server, the second entry address identifying an address of the second entry in the second ledger.

In some cases, the system further comprises: one or more auditor servers in communication with the first ledger and the second ledger, the one or more auditor servers being configured to: receive a first ledger identifier identifying the first ledger storing the first entry, a second ledger identifier identifying the second ledger storing the second entry, the first entry address and the second entry address; access the first entry based on the first ledger identifier and the first entry address; verify the signature of the identity provider server on the first entry; access the second entry based on the second ledger identifier and the second entry address; verify the signature of the identity provider server on the second entry; generate a confirmation entry for each of the one or more auditor servers, wherein each confirmation entry is based on successful verification of the signature of the identity provider server on the first entry and the signature of the identity provider server on the second entry; and link the first entry address to the second ledger identifier and the second entry address to the first ledger identifier based on the confirmation entry of the one or more auditor servers.

In another broad aspect, there is provided an identity management method for controlling an exchange of data bundles by a user agent server, the method comprising: transmitting a first request to an identity provider server, the first request identifying one or more claim categories; receiving, at a first time, at least a portion of an encrypted data bundle from the identity provider server based on the first request, the encrypted data bundle identifying one or more attributes associated with a user related to the user agent server, wherein each attribute corresponds to a claim category of the one or more claim categories identified in the first request and a corresponding value; receiving a second request at a second time different than the first time from a relying party server, the second request identifying a scope of attributes; and transmitting a response bundle in response to the second request to the relying party server.

In some cases, methods may further comprise: receiving a user consent to release at least some attributes from the scope of attributes; and generating the response bundle based on the scope of attributes identified in the second request and the user consent, wherein the response bundle identifies one or more response attributes associated with a user related to the user agent server, wherein each response attribute corresponds to a claim category and a corresponding value.

In some cases, methods may further comprise: generating a second user agent address uniquely identifying the user agent server to the relying party server.

In some cases, methods may further comprise: generating a second entry for a second ledger, the second entry comprising: a hashed response bundle generated by cryptographic hashing of the response bundle; a cryptographic hash of a relying party public key; a cryptographic hash of the second user agent address; a cryptographic hash of the one or more response attributes identified in the response bundle and corresponding blinding factor; a cryptographic nonce; metadata corresponding to the one or more response attributes; expiry information corresponding to the one or more response attributes; and revocation status of the response bundle.

In some cases, methods may further comprise: signing the second entry with a second key to generate a signed second entry, the second key being derived from a private key corresponding to the second user agent address; and transmitting the signed second entry to the second ledger.

In some cases, the second ledger is configured to: verify the second key to generate a second signature verification result; store the second entry in the second ledger based on the second signature verification result; and transmit a second entry address to the user agent server, the second entry address identifying an address of the second entry in the second ledger.

In some cases, methods may further comprise: generating, at the user agent server, a response data bundle ownership public key and a response data bundle ownership private key, the response data bundle ownership public and private keys being usable for releasing the response bundle to the relying party server.

In some cases, methods may further comprise: generating a first entry for a first ledger, the first entry comprising: a hashed response data bundle generated by cryptographic hashing of the response data bundle; an identity provider public key;

the response data bundle ownership public key; a cryptographic hash of the one or more response attributes identified in the response bundle and corresponding blinding factor; a cryptographic nonce; metadata corresponding to the one or more response attributes; expiry information corresponding to the one or more response attributes; a second ledger identifier identifying the second ledger storing the second entry and the second entry address identifying an address of the second entry in the second ledger; a data provisioning ledger identifier identifying a ledger storing a data provisioning record generated by an identity provider server and a corresponding address identifying location of the data provisioning record in the ledger; and revocation status of the response bundle.

In some cases, methods may further comprise: signing the first entry with the response data bundle ownership private key to generate a signed first entry; and transmitting the signed first entry to the first ledger.

In some cases, the first ledger is configured to: verify the response data bundle ownership private key to generate a first signature verification result; store the first entry in the first ledger based on the first signature verification result; and transmit a first entry address to the user agent server, the first entry address identifying an address of the first entry in the first ledger.

In some cases, methods may further comprise: generating a third entry for a third ledger, the third entry comprising a hashed response data bundle generated by cryptographic hashing of the response data bundle; a relying party public key; the second user agent address; a cryptographic hash of the one or more response attributes identified in the response bundle and corresponding blinding factor; a cryptographic nonce; metadata corresponding to the one or more response attributes; a second ledger identifier identifying the second ledger storing the second entry and the second entry address identifying an address of the second entry in the second ledger; and revocation status of the response bundle.

In some cases, methods may further comprise: signing the third entry with a third key to generate a signed third entry, the third key being derived from a private key corresponding to a user agent address uniquely identifying the user agent server at the identity provider server; and transmitting the signed third entry to the third ledger.

In some cases, the third ledger is configured to: verify the third key to generate a third signature verification result; store the third entry in the third ledger based on the third signature verification result; and transmit a third entry address to the user agent server, the third entry address identifying an address of the third entry in the third ledger.

In some cases, methods may further comprise: generating a first auditor bundle for a first auditor system, the first auditor bundle comprising a first ledger identifier identifying the first ledger storing the first entry, a second ledger identifier identifying the second ledger storing the second entry, the first entry address and the second entry address.

In some cases, the first auditor system is configured to: verify that the first entry is consistent with the second entry to generate a first result; verify that the response data bundle ownership public key in the first entry matches a response data bundle ownership public key in the data provisioning record to generate a second result; generate at least one confirmation entry based on the first result and the second result; and link the first entry address to the second ledger identifier and the second entry address to the first ledger identifier.

In some cases, methods may further comprise: generating a second auditor bundle for a second auditor system, the second auditor bundle comprising a second ledger identifier identifying the second ledger storing the second entry, a third ledger identifier identifying the third ledger storing the third entry, the second entry address and the third entry address.

In some cases, the second auditor system is configured to: verify that the second entry is consistent with the third entry to generate a first result; generate at least one confirmation entry based on the first result; and link the third entry address to the second ledger identifier and the second entry address to the third ledger identifier.

In some cases, the response bundle transmitted to the relying party server comprises: encrypted response attributes generated by encrypting the one or more response attributes identified in the response bundle; hashed response attributes generated by cryptographic hashing of the one or more response attributes; a first data encryption key; a cryptographic nonce; and a second ledger identifier identifying the second ledger storing the second entry; and the second entry address.

In some cases, the relying party server decrypts the response attributes based on a reconstructed data encryption key, wherein a portion of the reconstructed data encryption key is received from a key registrar server.

In some cases, the relying party server is configured to transmit a key registrar bundle to the key registrar server, wherein the key registrar bundle comprises: a relying party public key corresponding to the relying party server; the second entry address; and a cryptographic nonce.

In some cases, the key registrar server is configured to validate the relying party server based on the relying party public key contained in the key registrar bundle.

In some cases, the key registrar server is further configured to: access the second entry at the second ledger based on the second entry address; retrieve the cryptographic hash of the one or more response attributes identified in the response bundle; locate a second data encryption key based on the cryptographic hash of the one or more response attributes; encrypt the second data encryption key with the relying party public key to generate an encrypted second data encryption key; and transmit the encrypted second data encryption key to the relying party server.

In some cases, the relying party server generates the reconstructed data encryption key based on the first data encryption key received from the user agent server and the encrypted second data encryption key received from the key registrar server.

In some cases, the relying party server is further configured to verify the one or more response attributes identified in the response bundle.

In some cases, the relying party server is configured to verify the one or more response attributes by: accessing the second entry stored in the second ledger; verifying that the first entry address is linked to the second ledger identifier by a trusted first auditor; verifying that the third entry address is linked to the second ledger identifier by a trusted second auditor; and comparing the cryptographic hash of the one or more response attributes contained in the second entry with the hashed response attributes in the response bundle.

In another broad aspect, there is provided an identity management system for controlling an exchange of data bundles, the system comprising: a memory unit; and a processing unit coupled to the memory unit, the processing unit being configured to carry out methods as described herein.

In another broad aspect, there is provided an identity management system for controlling an exchange of data bundles, the system comprising: a user agent server; and a relying party server configured to transmit a request to the user agent server, the request identifying a scope of attributes; wherein the user agent server is in communication with the relying party server, the user agent server being configured to: determine if a data bundle corresponding to the scope of attributes contained in the request is available in a user agent database managed by the user agent server; determine if a user corresponding to the user agent database has provided a release consent for at least some attributes within the scope of attributes; and transmit a response bundle to the relying party server based on the request and the release consent, wherein the response bundle identifies one or more response attributes associated with the user, and wherein each response attribute corresponds to a claim category and a corresponding value.

In some cases, the user agent server is configured to: generate a first entry;
sign the first entry with a first key to generate a signed first entry, the first key corresponding to a response data bundle ownership private key; generate a second entry; sign the second entry with a second key to generate a signed second entry, the second key being derived from a private key corresponding to a user agent address uniquely identifying the user agent server to the relying party server; generate a third entry; and sign the third entry with a third key to generate a signed third entry, the third key being derived from a private key corresponding to a user agent address uniquely identifying the user agent server at the identity provider server.

In some cases, the system further comprises: a first ledger configured to: verify the response data bundle ownership private key to generate a first signature verification result; store the first entry in the first ledger based on the first signature verification result; and transmit a first entry address to the user agent server, the first entry address identifying an address of the first entry in the first ledger; a second ledger configured to: verify the second key to generate a second signature verification result; store the second entry in the second ledger based on the second signature verification result; and transmit a second entry address to the user agent server, the second entry address identifying an address of the second entry in the second ledger; and a third ledger configured to: verify the third key to generate a third signature verification result; store the third entry in the third ledger based on the third signature verification result; and transmit a third entry address to the user agent server, the third entry address identifying an address of the third entry in the third ledger.

In some cases, the system further comprises: a first auditor system in communication with the first ledger and the second ledger, the first auditor system being configured to: receive a first auditor bundle comprising a first ledger identifier identifying the first ledger storing the first entry, a second ledger identifier identifying the second ledger storing the second entry, the first entry address and the second entry address; verify that the first entry is consistent with the second entry to generate a first result; verify that the response data bundle ownership public key in the first entry matches a response data bundle ownership public key in a data provisioning record to generate a second result; generate at least one confirmation entry based on the first result and the second result; and link the first entry address to the second ledger identifier and the second entry address to the first ledger identifier.

In some cases, the system further comprises: a second auditor system in communication with the second ledger and the third ledger, the second auditor system being configured to: receive a second auditor bundle comprising a second ledger identifier identifying the second ledger storing the second entry, a third ledger identifier identifying the third ledger storing the third entry, the second entry address and the third entry address; verify that the second entry is consistent with the third entry to generate a first result; generate at least one confirmation entry based on the first result; and link the third entry address to the second ledger identifier and the second entry address to the third ledger identifier.

In some cases, the relying party server is further configured to verify the one or more response attributes identified in the response bundle.

In some cases, the relying party server is configured to: access the second entry stored in the second ledger; verify that the first entry address is linked to the second ledger identifier by a trusted first auditor; verify that the third entry address is linked to the second ledger identifier by a trusted second auditor; and compare the cryptographic hash of the one or more response attributes contained in the second entry with the hashed response attributes in the response bundle.

BRIEF DESCRIPTION OF THE DRAWINGS

Embodiments of the present invention will now be described in detail with reference to the drawings, in which.

DESCRIPTION OF EXEMPLARY EMBODIMENTS

Figure 1:
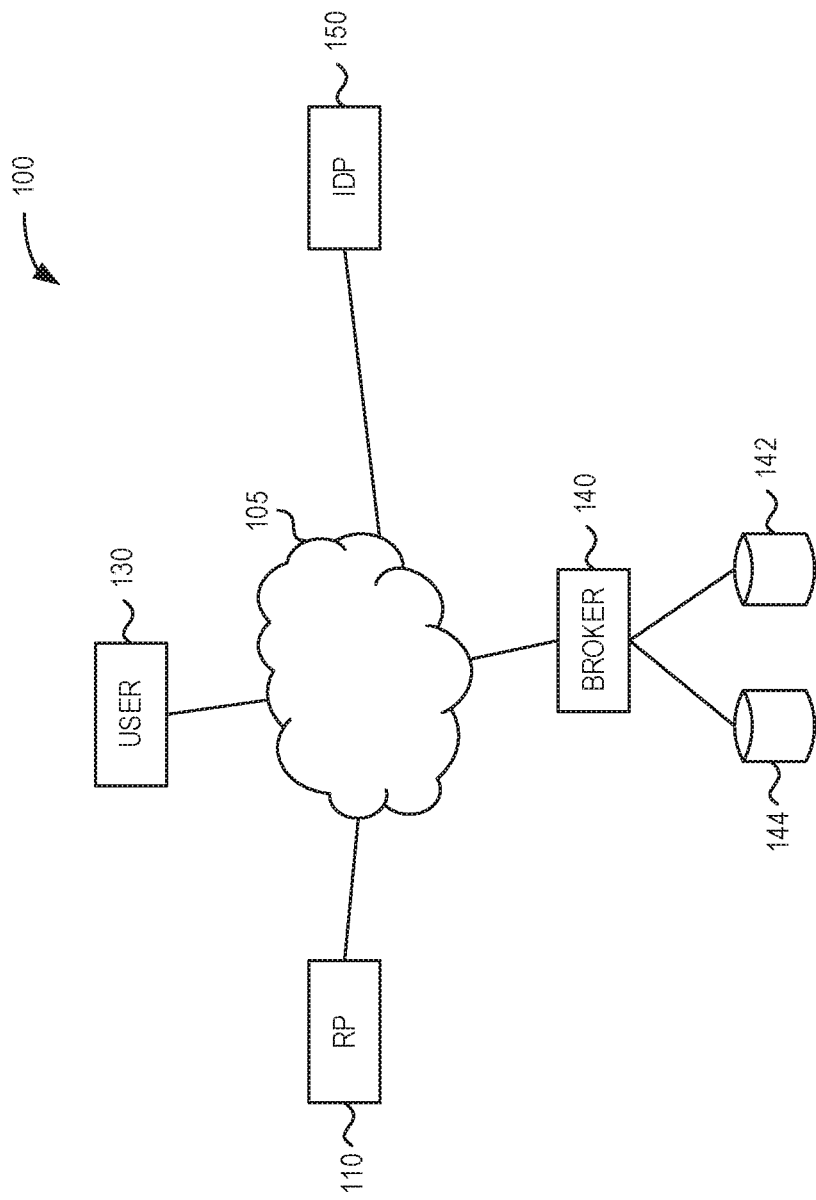
FIG. 1 is a schematic block diagram of a traditional broker-based authentication system according to the prior art.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

It should also be noted that there may be some elements that are used to implement at least part of one of the embodiments described herein that may be implemented via software that is written in a high-level computer programming language such as one that employs an object oriented paradigm. Accordingly, the program code may be written in Java, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The described embodiments are generally directed to providing participants in an identification and authentication system with assurance that data, events, and transactions related to digital identity attributes are valid, authentic and provided with the user's consent. Transactions can be any transactions that involve the exchange of data or attributes, for example, credential generation, identity verification, payments, contracts, and so forth. Some categories of transactions may be:

Requests from user agents or relying parties awaiting fulfilment

Identity providers and user agent servers agreeing to fulfilment

Message transmission and evidence of data being exchanged

User agent server and digital lock box management

Creation and distribution of pseudonymous user identifiers

Assignment of billing codes and evidence of request fulfilment

System configuration changes (e.g., adding new relying parties or identity providers, changes to policies, etc.)

Profile changes (e.g., relying party or identity provider information and billing code updates)

Generally, these assurances can be provided using a system of ledgers that can be queried by participants, while maintaining the privacy of system participants. The system can also be monitored by a consortium of identity providers and audited during a dispute or to satisfy a legal requirement.

Likewise, the described embodiments can provide end users with control of their online identity, while maintaining confidence in the protection of their data by third party providers.

The described embodiments can allow identity providers with the ability to "mint" a digital identity attributes, which frees the identity providers from costly integration and data sharing agreements with individual relying parties, while giving end users the power to control when and where their identity data is shared.

As noted above, in the field of online federated authentication systems, the traditional broker deployment model provides centralized authentication or identity services from a set of identity providers to a set of relying parties. One example of a broker service is the SecureKey Concierge™ service, which is a privacy enhancing web-based system that allows a user to authenticate or provide data claims that originate from their preferred identity provider to other relying parties. This broker service acts as a centralized service that all participants trust to maintain privacy, audit records and supply reports for billing purposes. To enhance privacy, the broker service can mitigate user tracking, for example, hiding from identity providers the websites that users are visiting.

In some embodiments, a billing ledger may be provided and billing codes assigned for some or all transactions. Generally, the assignment of billing codes and any associated amounts should be performed separately for each party to a transaction, to maintain privacy and prevent correlation of identifying data. To do so while preserving audit information, a pairing identifier can be created for each transaction, that can be shared by the parties to a transaction.

Referring now to FIG. 1, there is illustrated a schematic block diagram of a traditional broker-based authentication system according to the prior art. Broker-based system 100 has a broker server 140, which communicates with a relying party server 110 and an identity provider server 150 via a data communication network 105, such as the Internet. Both relying party server 110 and identity provider server 150 communicate with a user device 130, also via data communication network 105. Broker server 140 maintains a user identifier mapping database 144 and an audit database 142, which stores audit log information for transactions handled by broker server 140. User identifier mapping database 144 contains a mapping of user identifiers used by each relying party server 110 and identity provider server 150, which enables broker server 140 to use different user identifiers (i.e., for the same user) with different relying party servers 110 or identity provider servers 150.

Figure 2:
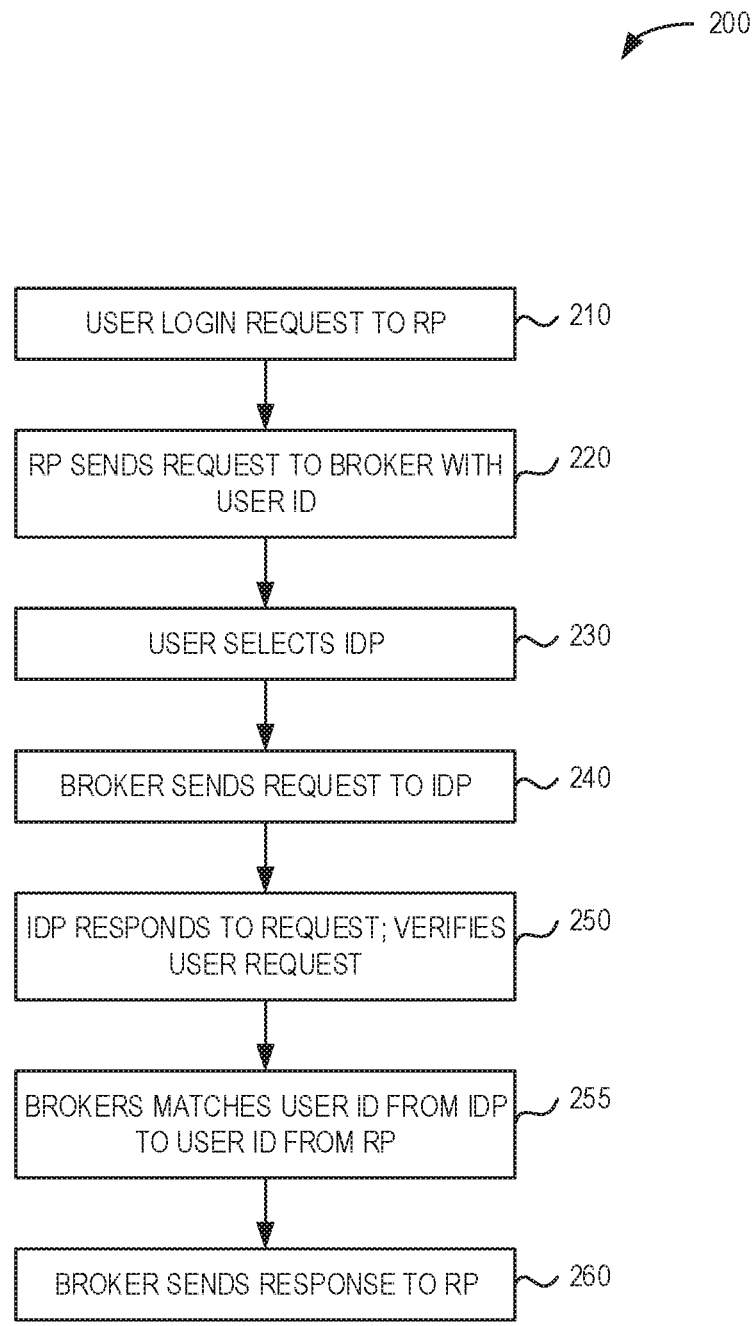
FIG. 2 is a simplified process flow diagram for the broker-based authentication system of FIG. 1.

Referring now to FIG. 2, there is illustrated a simplified process flow diagram for the broker-based authentication system of FIG. 1, according to the prior art.

Flow 200 begins at 210 with a user device 130 requesting to authenticate with relying party server 110. At 220, the relying party server 110 sends a request to the broker server 140 containing the user identifier supplied to the relying party server 110.

At 230, the user selects an identity provider server. The selection may be made by referring the user device 130 to broker server 140 and by providing a list of possible identity providers.

At 240, broker server 140 sends a request to the identity provider server 150 associated with the selection made at 230. Identity provider server 150 authenticates the user device 130, for example by issuing a challenge to user device 130, or by verifying a token or credential supplied in the original request by user device 130.

If the authentication is successful, identity provider server 150 responds to indicate successful authentication at 250, and may also include one or more requested data item. For example, if identity provider server 150 is operated by a bank, the requested data item may be a user's mailing address, which has been previously verified by the bank.

At 255, broker server 140 identifies a user record associated with the supplied user identifier and determines a corresponding user identifier to be used with the relying party 110, using user identifier mapping database 144.

At 260, broker server 140 receives the response and forwards the data to the relying party server 110.

According to flow 200, the relying party server requests authentication and data from the broker server. The identity provider server must be available to authenticate the user and provide data back to the broker server, which can then send the data to the relying party server. Transaction and user identifier records are kept by the broker server.

Broker-based system 100 does not enable a single end user to demonstrate control and ownership of multiple identities from various identity providers in a single transaction.

In contrast with broker-based system 100, the described embodiments provide a number of useful features.

For example, a user may wish to identify to a relying party both as "John Smith with phone number 212-555-1212" and as "John A Smith with a verified government agency account number". At least some of the described embodiments can allow an end user to collect personal data from disparate sources (e.g., from multiple identity providers), while also maintaining the proof of origin, integrity, validity and authenticity of the personal data in a single bundle. In particular, at least some of the described embodiments allow for an end user to mix-and-match data from disparate sources, while masking portions of the data to preserve privacy.

Moreover, at least some of the described embodiments allow for users to make use of their verified identity information as needed and without involving an identity provider. Identity information can be obtained asynchronously.

At least some of the described embodiments allow for metadata regarding identity data to be cryptographically bound with the identity data itself. At least some of the described embodiments also provide for a strong audit trail.

At least some of the described embodiments generally enable the exchange of identity attributes between users and relying parties, while providing for the verification of these attributes based on identity provider claims.

Generally, at least some of the described systems and methods enable a decentralized and asynchronous authentication flow between users, relying parties (RP) and identity providers (IdP), by shifting functions previously performed by a broker server to a trusted user agent application under the user's control. In particular, the user agent application can handle the acceptance of RP requests and response with authentication and identity data, thereby obviating the need for the broker server to carry out these functions.

In at least some of the described embodiments, the IdP is not necessarily required for each transaction. Instead, the user agent can share a previously issued and stored Identity Provider Data Bundle (e.g., a collection of one or more claims), or a subset thereof, with the RP.

At least some of the described embodiments also enhance privacy, auditing, monitoring and assurance levels as compared to the prior art by employing blockchain-type ledgers, including private participant ledgers, that can be monitored to ensure proper service behavior in a way that nevertheless protects the user's privacy and confidentiality during operation.

Accordingly, at least some of the described embodiments preclude various forms of user tracking, such that:
- Identity providers cannot see where their users are sending data;
- Identity providers cannot count how often a Data Bundle was shared;
- Identity providers cannot learn or mine data from other identity providers;
- Relying parties can be blinded, such that they can only see a category of the identity provider that is the source of a claim (thereby keeping confidential the particular institution with which the user has a relationship);
- Relying parties and identity providers do not learn each other's user identifiers for a particular user; and
- Relying parties cannot learn or mine data from other relying parties.

Blockchain-type ledgers can be used to provide system auditing, monitoring and usage statistics, while preserving participant privacy and confidentiality. These Service Ledgers offer the ability to:
- Deliver proof that events and transactions occurred and were authorized;
- Deliver proof that data is valid (or has become stale, been revoked, or never even issued);
- Allow participants to monitor the behavior of the system as it relates to them, but not that of other participants;
- Hide some event and transaction data during normal operation, such that entities are unable to perform user tracking—however, in exceptional circumstances, such as under a court order, the hidden data of a particular transaction can be revealed and proven to be part of the ledger;
- Allows system operators to demonstrate that the ledgers have not been manipulated;
- Efficiently collect new events and prove that events are part of the ledgers;
- Provide ledger replication and query capabilities to the appropriate participants to enable monitoring and auditing;
- Enable the creation of usage statistics without sacrificing participant privacy;
- Minimize the impact of a breach of a single component without compromising the overall system; and
- Minimize the impact of a compromised entry to the entry itself, and not the overall system.

Generally, in a blockchain-based system the parameters of transactions are preserved into a hash chain structure. A hash chain provides an audit trail, typically immutable, where transactions that are received within the same time period (typically seconds) are organized into blocks, and each block contains evidence of the previous block's contents (typically as hashes). In this way, an investigator can iterate backwards from a starting block to a block containing a transaction of interest and have confidence that these blocks have not been modified.

To gain confidence that the starting block is valid, an investigator can observe the latest block computed by multiple organizations (for the latest transactions). As there is consensus on the latest block (and therefore also the evidence of the previous block), an investigator can have confidence that the starting block has not been tampered with. The investigator can then proceed through each block until they find their transaction. An investigator also has confidence in each recorded transaction within a valid block since multiple organizations independently endorse each transaction.

Generally, transactions can be preserved to allow for later investigations or audits, however the need for preservation must be balanced against the privacy concerns of end users, and the confidentiality of member organizations such as relying parties and identity providers. To this end, each system participant can be prevented from tracking the activity of other relying parties, identity providers and/or end users to the extent possible without sacrificing the retention of transaction material for investigations. In particular, it may be desirable to ensure that no single entity can observe an identity provider, relying party and user agent identifier outside the context of an authorized investigation (e.g., audit). This concept may be referred to as a "triple blind" system, in which the identity of all three parties to a transaction (e.g., user, identity provider and relying party) is not immediately available).

However, as described herein, to enable investigations the parameters of each transaction can be recorded into an immutable audit trail, using a hash chain structure (e.g., ledgers) to achieve immutability, and multi-organization distributed networks can be used to demonstrate the validity of the latest transactions. Some parameters may be sensitive (e.g., they enable activity tracking) and can be protected as described herein, for example by the use of encryption that requires multiple parties to decrypt (e.g., splitting decryption keys). Some transactions also may depend on relative ordering (such as assigning billing codes based on the current configuration), and this ordering can be preserved in the ledgers.

By using dual or multiple control and data segregation, data leaks and activity tracking of preserved transactions can be mitigated. Dual or multiple control means that multiple entities act together to decrypt sensitive transaction parameters and reduce the risk of ex post facto repudiation. For example, in some embodiments, a digital lock box provider can authenticate a user and the user's device (or user agent server) can sign transactions using keys not controlled by the digital lock box provider. User identifiers, the digital lock box provider name, and the public keys used to sign the transaction are preserved within the protected parameters of a transaction to allow later investigation. In some other embodiments, the digital lock box provider may handle private keys on behalf of the user, and therefore can require user authentication to perform key-based operations on behalf of the user; in such cases, the digital lock box provider may be prevented from seeing the transaction data or one or more parties to the transactions—the transaction data being encapsulated in additional layers of encryption or hashing—thus restricting the digital lock box provider to handling private key operations (e.g., signing, encrypting).

Data segregation means that transactions can be associated to a custodian entity (and its auditors/monitors). For example, the provider of a digital lock box for a user agent server may act as custodian, and the provider may be assigned one or more auditors and/or monitors. Auditors may have their own segregated ledgers to preserve their assigned transactions (e.g., as salted hashes), as described herein.

In the absence of a central broker, each transaction can be examined and endorsed for validity by multiple organizations or entities. Once endorsed by enough entities (e.g., three or as set by policy), the transaction can be preserved into an immutable audit trail and the system's ledgers can be updated to reflect that the transaction is accepted.

In particular, at least some of the described embodiments leverage both a Distributed Service Ledger along with individual Private Service Ledgers for participating IDPs and RPs. The Private Ledgers only store entries related to a particular IDP or RP, whereas the Distributed Service Ledger contains entries for all participants. The Distributed Service Ledger exists to prove that the Private Ledgers have not been tampered with, and to prove the relationships between the entries of each of the different Participant Private Ledgers. As such, whenever a Private Ledger entry is written there typically should be a corresponding entry written to the Distributed Service Ledger.

As will be discussed in greater detail below, the Distributed Service Ledger entries can have increased blinding compared to the Private Ledgers, to hide which users and participants were involved in a particular ledger entry. In some cases, the Private Ledgers can be populated for each participant by a service provider, and made available to the corresponding participant for querying. The Distributed Service Ledger can be populated by and replicated by a consortium of identity providers.

Identity Management System

Figure 3A:
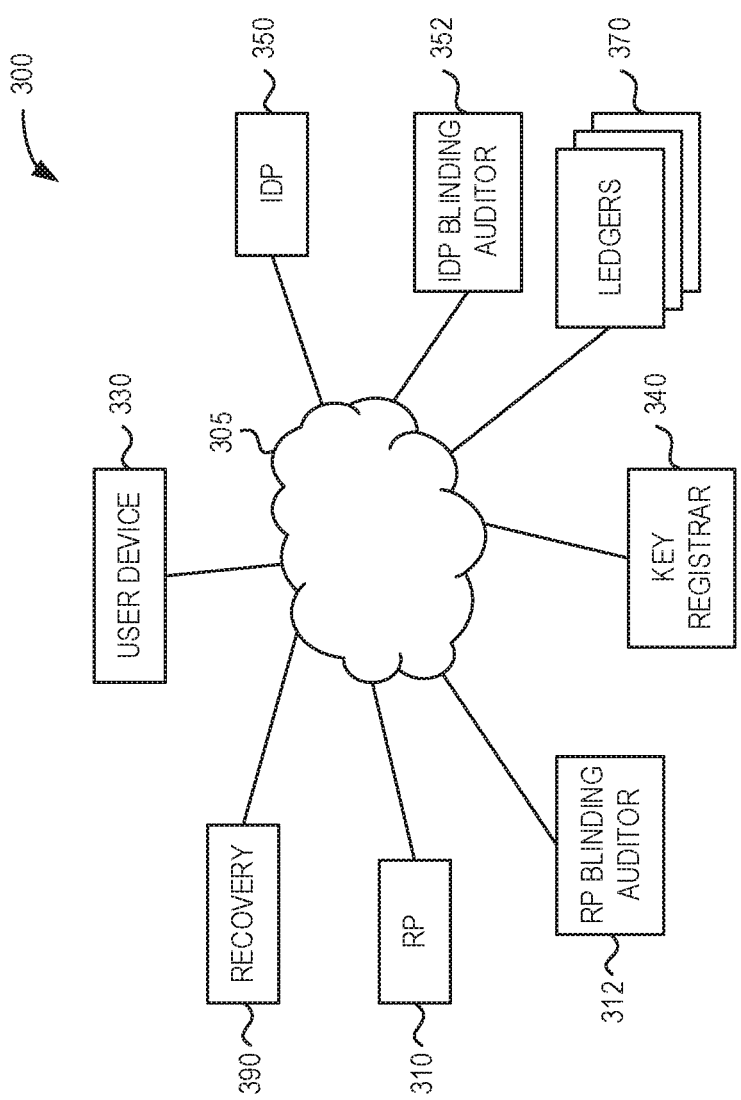
FIG. 3A is a schematic block diagram of an identity management system in accordance with at least some embodiments.

Referring now to FIG. 3A, there is illustrated a schematic block diagram of an identity management system in accordance with at least some embodiments.

Identity management system 300 has many authentication and identity broker functions integrated into the user device 330, a subset of which may be referred to as a user agent server. Generally, the term user agent server refers to the user device 330 when a processor of the user device is executing a secure application, i.e., an application that causes the processor to implement the user agent server. In some embodiments, the user agent server may be a physically separate device, in which case user device 330 may cooperate and communicate with the physically separate device via a suitable data connection to carry out the functions described herein.

The user agent server locally authenticates a user at the user device 330 and manages consent procedures.

In some embodiments, however, the user agent server may be executed by a computer or server that is physically separate from the user device 330. In such cases, the user agent server will be in communication with a user agent that is executed by the user device 330, with the functionality of the user agent server divided accordingly.

User computing device 330 communicates with a relying party (RP) server 310 and an identity provider (IdP) server 350 via a data communication network 305, such as the Internet. In addition, identity management system 300 may have one or more auditor servers, such as RP blinding auditor 312 and IdP blinding auditor 352. In some cases, the auditor servers may be distributed and have separate ledgers for backing. Identity management system 300 further has a key registrar server 340 (which key registrar system may in some cases be a distributed system with separate ledgers), a recovery server 390 and ledger server system 370, which can include one or more IdP private service ledger, RP private service ledger and distributed service ledger, or ledger server system 370', which can include multiple copies of a distributed service ledger with logical partitions.

IdP server 350 is generally provided or operated by an entity that can provide one or more user identity attributes, because the user has some sort of relationship with the entity. For example, the entity may be a financial institution or a government agency. In many cases, the entity will have procedures for the real-world verification of identity attributes, which means that identity attributes will have strong assurances when their origin is the IdP.

RP server 310 is a server that makes a request for identity data by requesting a scope, which identifies the claim categories of identity attributes to be fulfilled. For example, RP server 310 may be operated or provided by a web service, such as an online social networking website, or an e-commerce website. Generally, RP server has a desire to obtain some identity attribute from user device 330, or to have user device 330 prove that it has control over that identity attribute.

Each server and computing device described herein generally has a processor, volatile memory and non-volatile storage memory, at least one network interface. Depending on its configuration, each server and computing device may have input devices such as a keyboard, trackpad or touchscreen, output devices such as a display and speakers, and various other input/output devices as will be appreciated.

Moreover, each server may be constructed from multiple devices, as in a server farm, which may be in geographically diverse locations, and accessed via a load balancer. Such arrangements are sometimes referred to as a "cloud" service. For example, relying party server 310 may be constructed of multiple edge node servers, which replicate and serve data in geographically diverse locations. The functionality described herein as provided by a particular server (e.g., relying party server 310) may be divided among multiple physical devices, which are then logically linked or merged from the third party perspective.

In some embodiments, the functionality of multiple servers may be combined into one server, whether via hardware virtualization or otherwise. For example, a single physical device may serve as both the RP blinding auditor server 312 and the IdP blinding auditor server 352.

Identity management system 300 generally provides a decentralized and asynchronous authentication flow between participants, which is made possible by providing several authentication and identity functions in a trusted user agent server, which the user controls. As a result, IdPs are not required to be online during an identity transaction or other transaction; that is, interactions between the user device 330 and IdP server 350 can be carried asynchronously to those interactions between the user device 330 and RP server 310.

As the IdP is not necessarily involved during an identity transaction with RP server 310, one or more auditor server 312, 352 is provided to certify that user device 330 has control over the credentials and data it supplies to RP server 310. Each auditor server can verify data entries in ledger server system 370 or 370'.

In addition to the cryptographic operations locally performed by the user agent or user agent server, system 300 has a number of oracles, which can include both blinding auditors and key registrars. An oracle generally is an independent server that has a cryptographic key pair, and which can sign transactions on request and can maintain state data for system 300, to help prevent attacks or errors that would lead to the introduction of inconsistent or erroneous data in system 300.

Ledger server system 370 or 370' ensure data integrity, including by identifying the data publisher of recorded events and transactions that occur, while maintaining participant privacy. Service ledger servers manage databases or stores, which can be used to provide notarization and integrity controls to the RP and other participants. Generally, the ledger servers can be implemented as a network of peer verifiers. Service ledgers (sLedgers) generally include both a distributed service ledger that is accessible to all system participants, and a private ledger that is devoted to each system participant. In some cases, ledgers may be operated by, or may serve as, custodians, as described elsewhere herein.

Figure 6A:
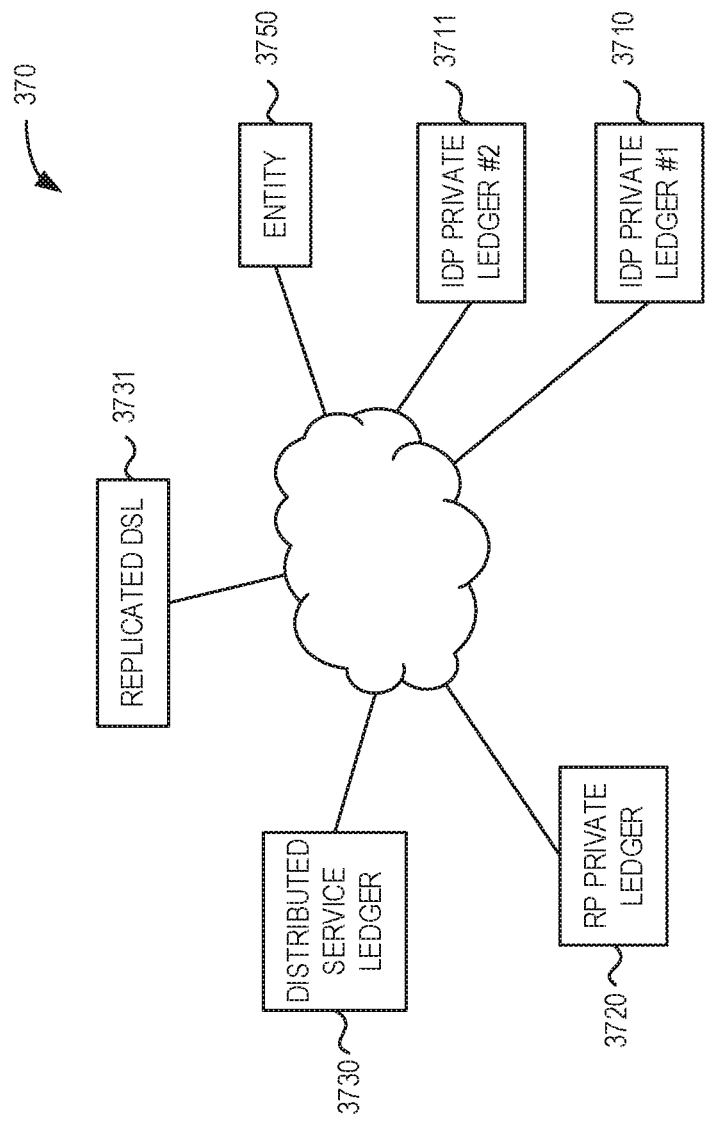
FIG. 6A is a system block diagram for a distributed service ledger system in accordance with some embodiments.
Figure 6B:
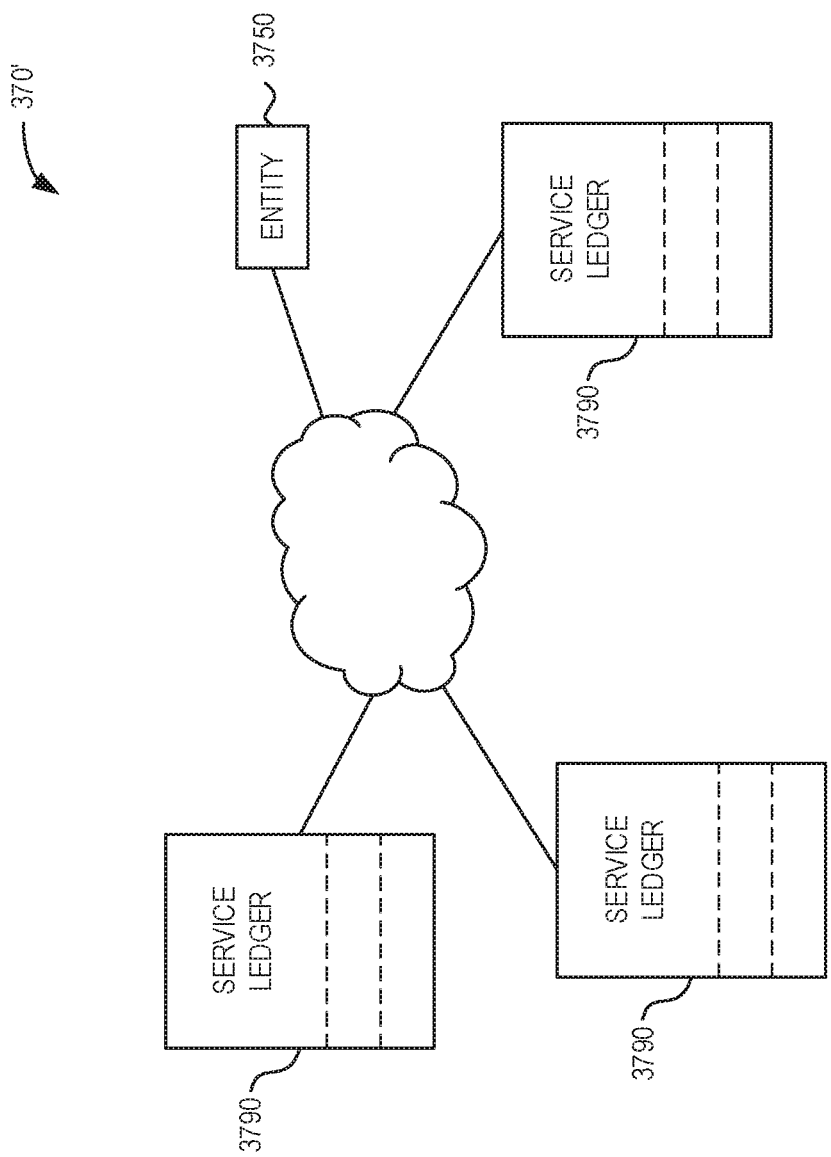
FIG. 6B is a system block diagram for another distributed service ledger system in accordance with some embodiments.

In practice, service ledgers may be a public distributed data store which acts to publish cryptographic hash digests (hashes) for any system participant to review. The distributed service ledger can be implemented using a blockchain paradigm. Except where otherwise noted, the term ledger is used interchangeably with the terms ledger server and ledger partition herein, depending on the specific implementation of the service ledgers that is used, as described with reference to FIGS. 6A and 6B. For example, the term private service ledger as used herein refers to a private ledger server if the service ledger system 370 is used, as shown in FIG. 6A, or to a private ledger partition of the service ledger if the service ledger system 370' is used, as shown in FIG. 6B. it will be understood that operations involving a ledger will also involve the ledger server computer processor, memory and databases, as appropriate.

Each private service ledger stores entries related to a RP or IdP server, whereas the distributed service ledger stores entries for more than one, or even all, participants. Accordingly, the distributed service ledger can be consulted to verify that entries in a private service ledger have not been tampered with, and also to verify relationships between the entries of two different participant private service ledgers. To facilitate this verification, whenever a private service ledger entry is made, there should be a corresponding entry written to the distributed service ledger. As discussed further herein, entries in the distributed service ledger may have increased obfuscation or blinding compared to the private service ledgers, to safeguard the privacy of the private service ledger parties.

In some embodiments, to prevent a server from inferring private data, each ledger may be assigned a particular role (e.g., IdP private service ledger or distributed service ledger), and may be used only for that role. For example, an IdP service ledger would not simultaneously serve as a distributed service ledger. In some other embodiments, each server may have a full copy of the distributed service ledger and/or partitions and may operate in several roles depending on the particular transaction context.

In some embodiments, key registrar server 340 generally operates to store partial cryptographic keys, and to release partial keys to RP servers 310 at appropriate times, to enable RP servers 310 to reconstruct cryptographic keys as described herein. In some other embodiments, key registrar server 340 may be a trusted server that stores keys on behalf of a user; in such cases, the key registrar server may be combined with a digital lock box provider.

Data communication network 305 is a network, such as the Internet, which can be constructed using various networking technologies and topologies. For example, portions of network 305 may be mobile data networks. Although shown as one monolithic network for ease of illustration, various elements of identity management system 300 may communicate via virtual private networks provisioned over network 305, or via private networks provisioned over dedicated links (not shown). Moreover, although not explicitly described in each case, communications between the various elements of system 300 generally involve session-level security, such as Transport Layer Security (TLS).

Although only one of each type of participant is shown, identity management system 300 can include one or more user devices 330, one or more RP servers 310 and one or more IdP servers 350. Each user device can be operated by an individual that has a relationship with one or more IdP server and may have multiple relationships, or no relationships, with relying party servers. Identity management system 300 allows for there to be no explicit relationship between RP servers and IdP servers.

Thus, identity management system 300 provides a framework for the exchange of trusted digital identity documents between parties. Trusted claims, such as identity data or identity credentials, originate from strong identity assurance processes performed by trusted IdPs, such as financial institutions or government entities. Users are able to safely collect verified identity data and later share this verified identity data with RP servers. RP servers can leverage these reliable identity credentials for services or transactions.

In particular, identity management system 300 allows one or more user device 330 to request that one or more IdP server 350 "mint" a digital identity document, referred to herein as a data bundle, where the data bundles contain one or more identity attribute known to the IdP server and associated with the user. Each data bundle generally has claim categories for each identity attribute it contains. Under the control of user device 330, one or more collected identity attributes can be shared with a RP server, thus giving the user the power of when and where their data is shared, while also freeing the IdP servers from costly and difficult point-to-point integration and data sharing agreements with every RP server with which users may wish to interact. The distributed approach is private and secure, and has no central point of data collection that can be used to simultaneously attack all users or participants.

Figure 3B:
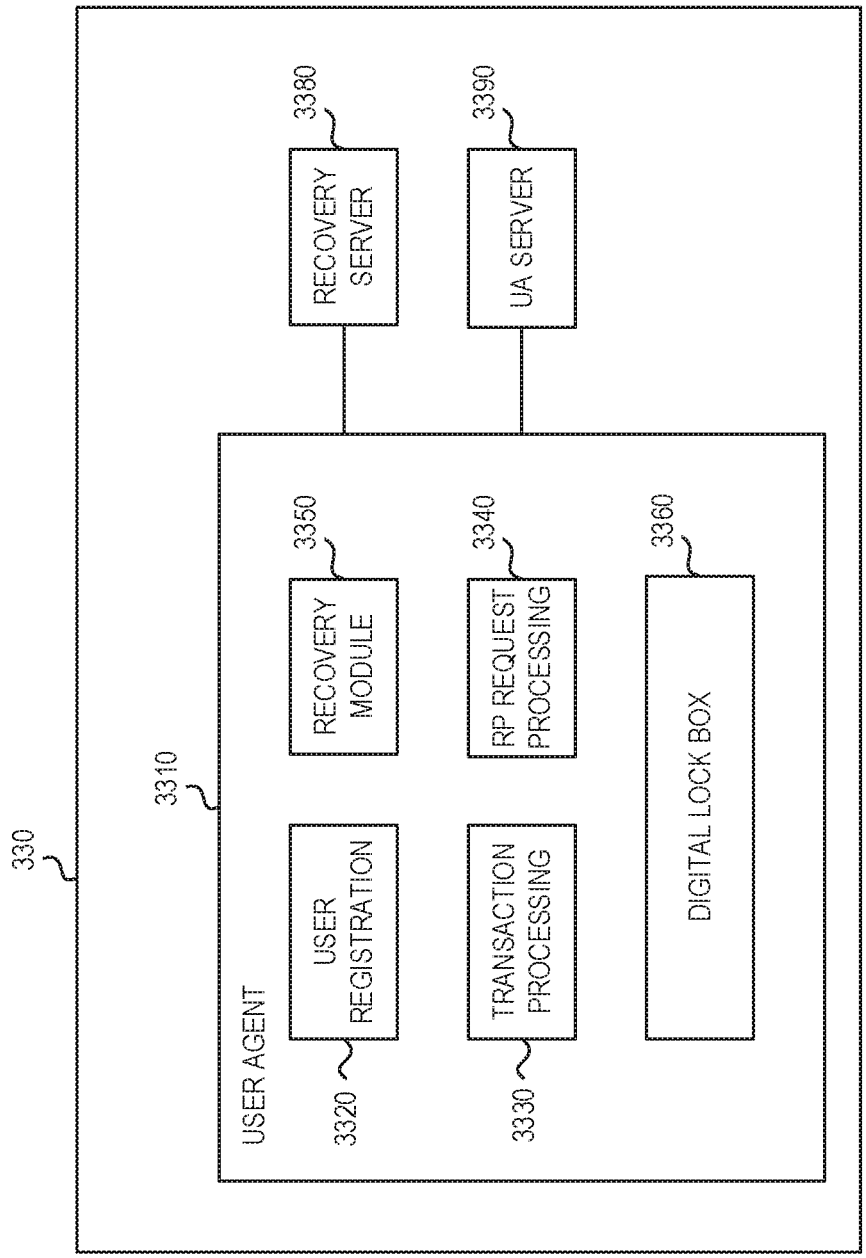
FIG. 3B is a simplified system block diagram of user device 330 of FIG. 3A.

Referring now to FIG. 3B, there is illustrated a simplified system block diagram of user device 330 of FIG. 3A. User device 330 has a user agent 3310 executed by a processor of the user device, and which interfaces with a recovery server 3380 and user agent server 3390 that also execute on user device 330. The end user interacts with system 300 via the user agent 3310, which provides graphical user interfaces for displaying output to the user via the user device 330, and accepts input from the user. User agent 3310 implements a variety of software modules, such as user registration module 3320 for managing the user registration and on-boarding process, transaction processing module 3330 for managing identity transactions and the collection of data bundles from IdPs, RP request processing module 3340 for managing RP requests for data bundles and obtaining consent from the user, and recovery module 3350 for recovery procedures. User agent 3310 can also manage a digital lock box 3360, which may be a local or distributed data store that contains cryptographic key generation and derivation routines and data.

Digital lock box 3360 generally stores state information for user agent 3310, and profile information such as key derivation data, data bundles, data bundle ownership information, secret share data for data bundle decryption and so on, as described further herein. Digital lock box 3360 can also store digital content owned by the user, such as cryptographically signed documents. The content of digital lock box 3360 is cryptographically protected such that only the user agent 3310 can decrypt the information. However, in some cases, third parties (e.g., digital lock box providers) may be provided access to some or all of the content of the digital lock box, for example with a dedicated cryptographic key.

In some cases, some or all of the digital lock box 3360 can be implemented externally on a network server. In some cases, the external digital lock box 3360 can be implemented as part of a distributed database provided by one or more servers of system 300. In some other cases, the external digital lock box may be provided by a digital lock box provider, such as a trusted IdP server, in which case the IdP server may store keys and carry out some functions, such as signing and encryption, on behalf of the user but generally without access to the unencrypted transaction data itself. The external digital lock box can be implemented in addition to a local digital lock box, or in lieu of some or all of the local digital lock box (this may occur, for example, where the digital lock box includes a data item that occupies more storage space than is available or practical on a user device 330). The distributed database may be composed of servers such as trusted IdP servers 350, RP servers 310, or other servers (not shown). Additionally, use of the distributed database can facilitate recovery in the event of device loss or failure, synchronization if the user has multiple user devices 330, and to support some privacy requirements, as described elsewhere herein. Optionally, the entirety of a user's digital lock box 3360 can be implemented externally, including the recovery and data secrets and, in such cases, generally the digital lock box will be split into multiple components to prevent unauthorized decryption and use by third parties.

In some cases, a user may wish to make data available as part of the digital lock box, but it may not be desirable to store it in a ledger, for example due to size constraints. In such cases, a data reference (e.g., a URL) can be stored in its place, and the data itself stored, optionally encrypted, in an external storage, such as a web server.

Storing a subset of digital lock box 3360 online provides service continuity capability for a user in the situation where their user device 330 data has become corrupted, lost or generally unavailable. Without this capability, the user would be required to re-register with each IdP and obtain new data bundles.

Figure 3C:
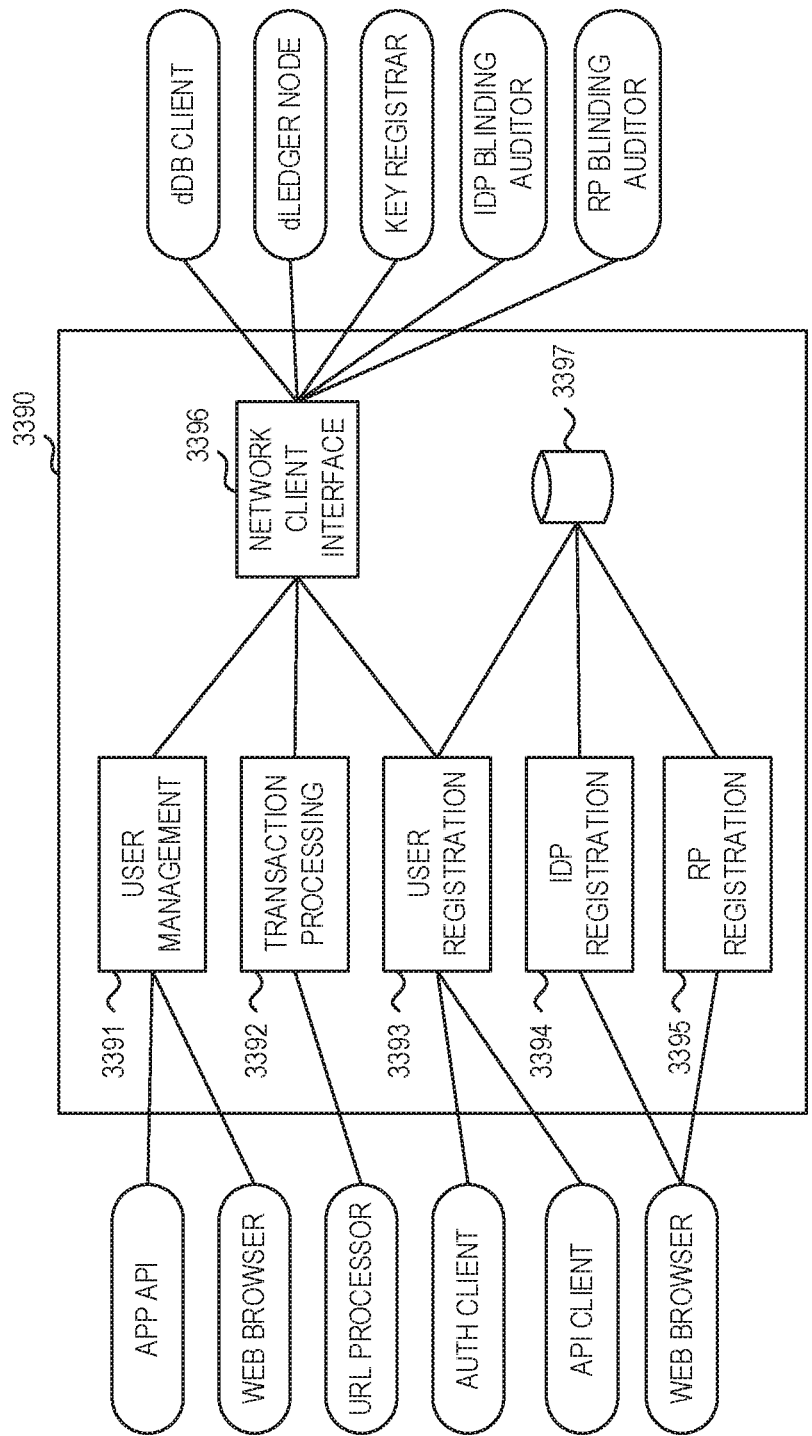
FIG. 3C is a detailed system block diagram of the user agent server 3390 of FIG. 3B.

Referring now to FIG. 3C, there is illustrated a detailed system block diagram of the user agent server 3390 of FIG. 3B and its interfaces. User agent server 3390 generally is the primary interface between user agent 3310 and any IdP server or RP server, or other network clients.

User agent server 3390 has a user management module 3391 for handling user registration functions, a transaction processing module 3392 for handling the exchange of data bundles, a RP request processing module 3393 for managing RP requests for data bundles, an IdP registration module 3394 for handling registration with IdP servers, a RP registration module 3395 for handling registration with RP servers, a configuration database 3397 for storing parameters and data, and a network client interface 3396 for handling communication with other elements of system 300 outside the user device 330.

Generally, user management module 3391 may exchange data with a web browser or mobile application programming interface (API) executing on user device 330. Web browser user management may be used by a service administrator to authenticate into various elements of system 300. Similarly, transaction processing module 3392 may exchange data with a uniform resource locator (URL) processor. User registration module 3393 may exchange data with an authentication client (e.g., OAuth) or other API client executing on user device 330. IdP and RP registration modules 3394 and 3395 optional modules that may be used by a service administrator, for example, to register new IdP servers or RP servers. In some embodiments, interfaces may be implemented using the OpenID Connect authentication layer, or equivalent.

Configuration database 3397 can be used to store configuration parameters, such as the identification and network addresses of elements within system 300, such as IdP servers 350, RP servers 310, and related data.

Network client interface 3396 provides a collection of processes and libraries, for example with a RESTful web service API, that allows user agent server 3390 entities to exchange data with other elements of system 300. Generally, the processes and libraries of network client interface 3396 are abstracted, and leave specific application logic (e.g., banking website functions) to other elements of the system (e.g., mobile web browser). Network client interface 3396 can interface with the service ledger system 370 or 370', RP blinding auditor servers 312, key registrar servers 340 and IdP blinding auditor server 352, among others. Network client interface 3396 can also update the distributed database (dDB), which is a distributed data store used by user agent 3310 and IdP to store a user encrypted data bundle, and which all participants can read; the dDB is encrypted and may be partially or fully replicated at multiple locations in the system (e.g., at each IdP server or RP server). For example, the distributed database can be distributed and replicated using Apache Cassandra™ or InterPlanetary File System (IPFS). In some cases, the distributed database may comprise one or more side database to the ledger system.

Accordingly, user agent server 3390 can act as a transaction processing hub, to orchestrate interactions for or with user agents, and to communicate with one or more blinding auditors and key registrars to complete requested tasks and propagate system data into service ledgers and the distributed database dDB.

Figure 3D:
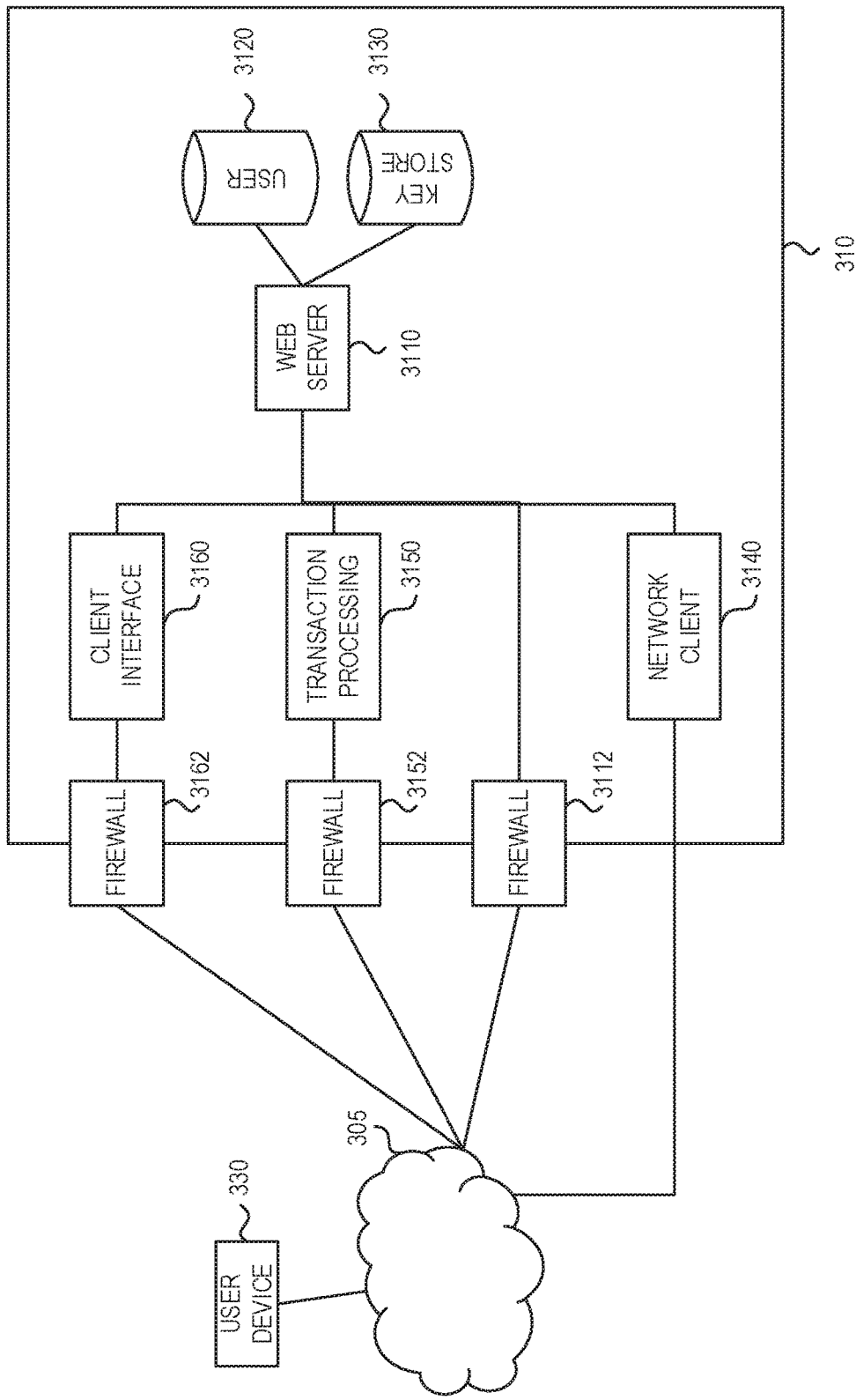
FIG. 3D is a detailed system block diagram of the RP server 310 of FIG. 3A and its interfaces to other elements of system 300.

Referring now to FIG. 3D, there is illustrated a detailed system block diagram of the RP server 310 of FIG. 3A and its interfaces to other elements of system 300, in accordance with some example embodiments.

RP server 310 has a legacy web server 3110, which can continue to operate in known manner. Web server 3110 may have a user and application data store 3120, along with a cryptographic key store 3130. Generally, web server 3110 may serve requests for data according to known techniques, by exchanging data via a firewall 3112 and network 3105. However, to interface with system 300, as when obtaining a data bundle from a user, RP server 310 has a client authentication interface module 3160, transaction processing module 3150, and a network client interface 3140. Client authentication interface module 3160 can connect to a user agent 3310 via a firewall 3162 and network 305. In some cases, user authentication can be performed out-of-band. Transaction processing module 3150 can connect to a user agent server via a firewall 3152 and network 305. Network client interface module 3140 can connect to a user agent server via network 305.

Generally, to obtain data bundles, RP server 310 can first authenticate to the user device 330 user agent 3310, using one or more interfaces. In one example, RP server 310 can employ client interface 3160. As will be appreciated, various interfaces can be used, such as OAuth 2.0, OpenID Connect or Security Assertion Markup Language (SAML) form interfaces. Once authenticated, transaction processing module 3150 can request a particular data bundle type, by communicating with transaction processing module 3330 of user agent 3310. Transaction processing module 3330 may exchange data with transaction processing module 3392 of user agent server 3390, to ensure that authorization is obtained and that the request data bundles can be decrypted. The data bundles can then be transmitted via network client interface 3140, to a corresponding network client interface 3396 of user agent server 3390.

Figure 3E:
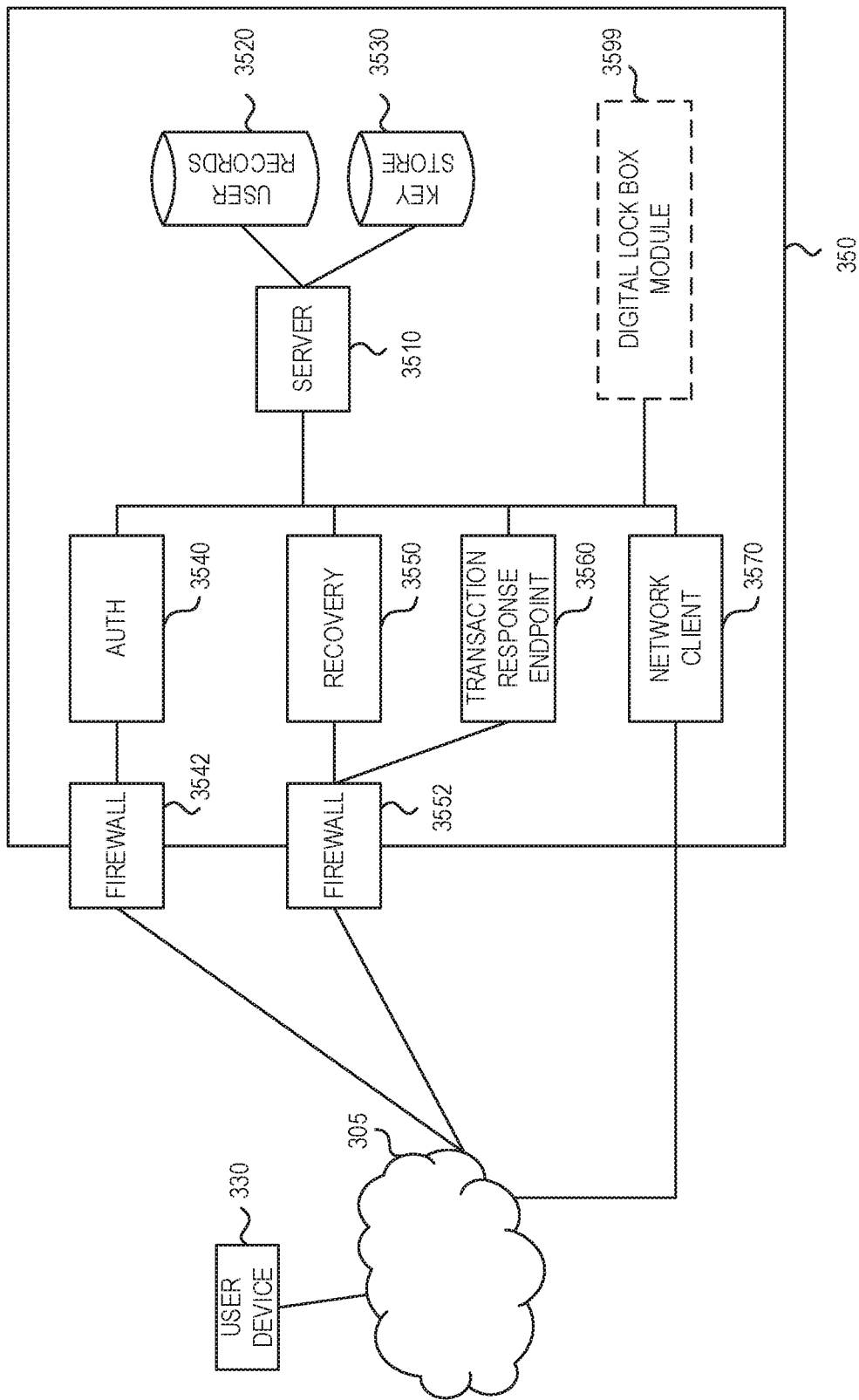
FIG. 3E is a detailed system block diagram of the IdP server 350 of FIG. 3A and its interfaces to other elements of system 300.

Referring now to FIG. 3E, there is illustrated a detailed system block diagram of the IdP server 350 of FIG. 3A and its interfaces to other elements of system 300.

IdP server 350 has a server 3510, which may be operated, for example, by a financial institution or government agency. Server 3510 may have a user record data store 3520, along with a cryptographic key store 3530. To interface with system 300, as when providing a data bundle to a user, IdP server 350 has an authentication interface module 3540 (e.g., which can perform out-of-band authentication in some cases), recovery module 3550, transaction response endpoint module 3560, and a network client interface 3570. Authentication interface module 3540 can connect to a user agent 3310 via a firewall 3542 and network 305. Transaction response endpoint module 3560 and recovery module 3550 can connect to a user agent server, for example using a REST protocol, via a firewall 3552 and network 305. Network client interface module 3570 can connect to a user agent server via network 305. Although several modules and firewalls are shown, it will be appreciated that firewalls can be merged or further split or omitted altogether. Likewise, modules may also be merged, divided or omitted in some cases.

Server 3510 may provide core services to the user in known fashion. For example, if server 3510 is provided by a financial institution, server 3510 may provide some online banking services, or support such services. To interface with system 300, once a user agent 3310 is authorized, it may request and collect new data bundles from IdP server 350 via transaction response endpoint 3560. Transaction response endpoint 3560 can obtain identity attribute data from user records store 3520, and populate pre-defined data bundle types with the identity attribute data. Data bundle types may be viewed as a digital document form, with claim category fields that can be populated using identity attributes. The generated data bundle can be transmitted to user agent 3310 via network client interface 3570. Optionally, user agent 3310 may request a recovery service, in which case recovery module 3550 can be engaged to provide a portion of a user recovery key, as described further herein.

In some cases, where IdP server 350 also acts as a digital lock box provider, server 350 may also have a digital lock box module 3599, which can carry out digital lock box provider functions as described further herein.

Provisioning Attributes and Minting Identity Documents

Figure 4:
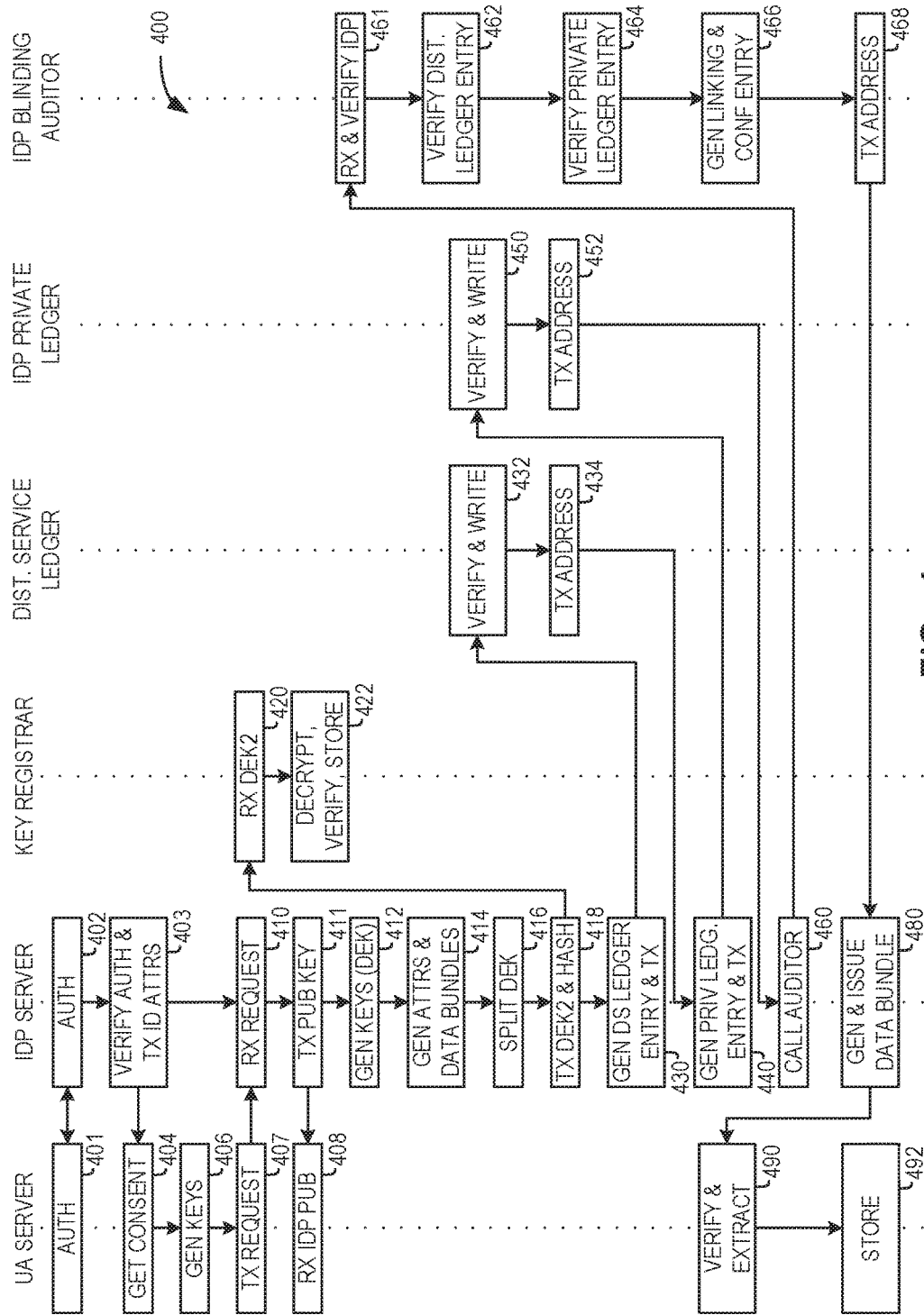
FIG. 4 is a process flow diagram for an example identity management method for controlling an exchange of data bundles by an identity provider server, in accordance with some embodiments.

Referring now to FIG. 4, there is illustrated a process flow diagram for an example identity management method for controlling an exchange of data bundles by an identity provider server, in accordance with some embodiments.

Identity management method 400 generally enables asynchronous authentication and provision of identity attributes. This means that a user—and more specifically the user agent—can collect digital identity data from one or more IdP servers at any time before exchanging data with a RP server. Assuming that the user agent has already collected the information required by RP server (e.g., user's first name, last name, date of birth) in a data bundle, the user may authorize the user agent to release the requested data bundle to the RP server, without further involvement from the IdP server.

At a high level, identity management method 400 involves three primary acts: 1) generating a request from a user agent server to an IdP server, wherein the request identifies one or more claim categories, and wherein the request contains a user agent server address; 2) at the IdP server, certifying that the requested data can be provided to the user agent server and then generating a data bundle in response to the request, the data bundle identifying one or more identity attributes associated with a user related to the user agent server, wherein each attribute corresponds to a claim category of the one or more claim categories identified in the request and a corresponding value; and 3) transmitting the generated data bundle to the user agent server.

In general, identity attributes are data that relates to a user that is in the possession of a third party, may have been verified by the third party, and which can be attested to by the third party. Identity attributes can include data such as: user identification information (e.g., name, age, citizenship, driver's license number, etc.); information about a user's property or assets (e.g., car license plate number, home address, etc.); items in the possession of a user (e.g., shareholder certificate, lottery ticket, fishing license or quota, warranties, etc.), education information (e.g., student enrollment status, student identifier, etc.), employment information (e.g., employer, employee ID, employee position, etc.), health information (e.g., medical records, insurance information, etc.), and many others.

Method 400 begins at 401 with the user device 330, via its user agent 3310, contacting IdP server 350 to begin authentication. IdP server 350 responds to the authentication request, for example by serving a web page with input fields for a username and password. In some cases, IdP server 350 may employ two-factor authentication, biometric authentication or various other forms of authentication. In some cases, the user device 330 may provide a previously generated token or cookie to the IdP server 350 to authenticate the user. In some embodiments, a RP server with a license for attributes associated with a user may carry out method 400 in a substantially similar manner as user agent server 3390, as described further with reference to FIG. 15; the RP server may continue to interact with the ledger servers as described herein when using a license to access data from an IdP server.

User agent server 3390, working with user agent 3310, can request authentication information from the user via an application executed on user device 330 and provide the authentication information to IDP server 350 for verification. For example, the web browser of user device 330 may render and display a page provided by IdP server 350 with input fields for authentication data, and transmit the entered data when a user selects a "login" or "submit" button.

At 403, IdP server 350 verifies the authentication information, and if authentication was successful, generates and transmits an indication of the claim categories, or identity attributes, available for the authenticated user to user agent server 3390.

At 404, user agent server 3390, working with user agent 3310, generates and displays an interface to obtain consent input from the user, which will allow the release of data from the IdP and creation of a data bundle. For example, the interface may display the indication of the claim categories, or identity attributes, received from IdP server 350 at 403, along with corresponding checkboxes or similar user interface elements. As part of obtaining the consent, the user may select the specific identity attributes to be obtained from the IdP server 350. For example, the user may wish to obtain a mailing address identity attribute from the particular IdP; this can be selected and confirmed via the user device 330.

At 406, user agent server 3390 can generate cryptographic keys for use with IdP server 350. User agent server 3390 can generate a user agent cryptographic key pair for use with a public key cryptographic system, including a user agent public key (UPub) and a user agent private key (UPr). The generated cryptographic key pair is specific to the user agent server and IdP. Once the key pair is generated, user agent server 3390 can generate a pseudonym or user agent address (User@IdP) uniquely identifying the user agent server to the identity provider server, which can be generated based on UPub. In some embodiments, the pseudonym may be created and assigned to the user agent by another entity, such as the IdP or a digital lock box provider which stores the user's private keys. In either event, the public key UPub is associated with the pseudonym, and the private key remains with the creating agent (e.g., user agent server or digital lock box provider). In this way, possession of the private key associated with a public key can prove ownership of a pseudonym.

As user identifiers, such as the pseudonym or user agent address, can be used to correlate user activity between entities, only the pseudonym or user agent address is shared with the IdP server (e.g., other identifiers need not be shared). Optionally, user agent server 3390 can generate a user recovery key (R) for use with a user account recovery method, as described elsewhere herein. The user recovery key R can be split into a first IdP key portion R1 and a second recovery server key portion R2, using a key splitting algorithm such as Shamir Secret Sharing Scheme. The IdP key portion R1 may be grouped with the user agent address User@IdP or pseudonym for storage by IdP server 350 and later use during the recovery process.

Separately, user agent server 3390 can generate a recovery registration message to a recovery server 390. The recovery registration message can contain recovery data such as a user identifier, a recovery method identifier (which may include a password hash) and the recovery server key portion R2. The recovery server 390 receives the recovery registration message and stores the received data for later use during a recovery process.

User agent server 3390 may encrypt the recovery data using R and submit the recovery data to a network location, such as the distributed database. An address of the network location can also be determined depending on the type of distributed database (e.g., in some examples, a hash of the recovery key may be created and used as the address for the recovery data). Recovery key R may be deleted, since the key portions R1 and R2 are stored with IdP server 350 and key server 340, respectively. In some cases, recovery server key portion R2 may be stored in the distributed database, if it is first encrypted.

At 407, user agent server 3390 registers the user agent server with IdP server 350, by generating and transmitting a request to IdP server 350 with the user public key UPub and pseudonym/user agent address User@IdP (and IdP key portion R1, if created), and by identifying one or more claim categories to be fulfilled (i.e., by the IdP server providing identity attributes for those claim categories). In some embodiments, the request may also specify particular data bundles to be created by the IdP. Data bundles are collections of claim categories and attribute values. For example, one data bundle may include claim categories of [First name, Second name, Profession]. Corresponding attributes values may be [John, Smith, Engineer]. Accordingly, a corresponding data bundle may contain both the claim categories (or identifiers) and their values, such as [First name=John, Second name=Smith, Profession=Engineer].

At 410, IdP server 350 receives the user public key and pseudonym/user agent address, and transmits its identity provider public key (IdPPub) to the user agent server 3390 at 411. The identity provider public key IdPPub is part of an identity provider cryptographic key pair, which also includes an identity provider private key (IdPPr). The IdPPub is received by user agent server 3390 at 408.

At 412, IdP server 350 generates a user encryption key (UEK), a data bundle ownership public key for the user agent (UaboPub) and a data encryption key (DEK). The DEK can be generated using, for example, a random key generation algorithm or protocol, in accordance with the desired security and strength requirements. The UEK and UaboPub can be generated based on the user agent public key UPub and additional derivation material (DM), using a key derivation protocol. In some example embodiments, the key derivation protocol can be one specified by BIP32, which is part of the Bitcoin Improvement Protocol and available online at <https://github.com/bitcoin/bips/blob/master/bip-0032.mediawiki>. In some other example embodiments, the key derivation protocol can be one specified for use with the IBM Hyperledger Fabric as described at <http://www.ibm.com/blockchain/hyperledger.html>. Derivation material may be, for example, random or pseudorandom data obtained from a suitable generator (e.g., /dev/urandom in some UNIX-like computer systems), or an index. The data bundle ownership key UaboPub will be usable for releasing a response bundle based on one or more data bundles to a relying party server, as described further. In some embodiments, the DEK can be rotatable, being generated based on a time-based algorithm.

At 414, IdP server 350 retrieves attributes, where each retrieved attribute corresponds to a claim category of the one or more claim categories identified in the request. Each retrieved attribute will generally have a data value. For example, if the claim category is "city", the attribute value may be "Boston". In some cases, the attributes may be generated in real time, or retrieved in real time from databases accessible to IdP server 350.

Once the attributes are received, IdP server 350 generates a cryptographic hash for each attribute using a cryptographic hash function, such as Secure Hash Function (SHA), to generate corresponding one or more hashed attributes.

IdP server 350 encrypts the one or more attributes using the data encryption key (DEK) to generate one or more encrypted attributes. Encryption may be performed using a nonce or salt. Encryption can be performed in various ways. In some embodiments, the one or more attributes are encrypted as part of a data bundle, that is, with indications of the claim categories, and with one or more claim categories. In some other embodiments, attribute values may be individually encrypted to produce multiple encrypted outputs, which may require managing the outputs to identify the claim category. In other embodiments, both the claim category and attribute value may be encrypted together, such that when decrypted the attribute value and its claim category are revealed.

At 416, IdP server 350 splits the data encryption key DEK into two or more parts, using a suitable key splitting algorithm. For example, the data encryption key may be split into two data encryption keys, DEK1 and DEK2, using a Shamir Secret Sharing algorithm. One key, DEK1, can be transmitted to the user agent server 3390. A key registrar portion of the key, DEK2, can be transmitted to the key registrar server 340, as described herein. In other embodiments, the key can be split into still further parts, and distributed to additional participants. In some embodiments, 416 may be omitted, for example if a trusted key registrar is used.

At 418, IdP server 350 can generate a key registrar bundle, and transmit the key registrar bundle to key registrar server 340. The key registrar bundle can contain one of the split data encryption keys, DEK2, if used, and the one or more hashed attributes generated at 414. The key registrar bundle may also be encrypted using a key registrar public key, and cryptographically signed with the identity provider private key (IdPPr).

At 420, key registrar server 340 receives the key registrar bundle, and at 422 it can decrypt the key registrar bundle using its key registrar private key, to generate a decrypted key registrar bundle. The key registrar server 340 can then verify the cryptographic signature of IdP server 350, based on the identity provider public key (IdPPub), thus generating a signature verification result. Key registrar server 340 can then create a key registrar record, and store the decrypted key registrar bundle and the signature verification result in the key registrar record.

The key registrar cryptographic key pair are previously generated, such that the key registrar public key will have been made available to IdP server 350. Likewise, key registrar server 340 will have previously obtained the IdP server 350 public key, IdPPub.

Next, IdP server 350 generates service ledger entries, in a distributed service ledger and in a private service ledger corresponding to the IdP. These ledger entries contain metadata that indicate, for example, which IdP originated Data Bundles are being shared with an RP. The ledger entries also contain data linking the entries to a particular user agent server, such as the data bundle ownership public key (UaboPub) which is based on the user public key (UPub). However, this data cannot be used to identify the user agent server, since it is only derived from the UPub in a one-way function that is not reversible. This prevents tracking of a particular user's activity.

Nevertheless, ledger entries can be used for dispute resolutions, since they can be used to verify that an event (data bundle creation or exchange) did occur. To enable blinding, ledger accuracy and integrity, audit servers are used, as described herein.

The concept of a "cryptographic commitment" is used to derive blinded ledger entries from the original data. A commitment is formed by hashing a blinding factor (e.g., a nonce or random number) along with the original data using a suitable one-way cryptographic hash function (e.g., Secure Hashing Algorithm, SHA2). A party in possession of the original data can verify that a separate party also possessed the same data, since only the original data can produce the correct hash function result.

Ledger entries generally do not contain user-identifying data, but rather metadata created using the above-described mechanisms to protect the privacy of the user.

To maintain consistency of data in the ledgers, a Merkle Tree data structure can be used to prove that a particular entry is part of the ledger or blockchain-type ledger. Furthermore, periodic checkpoints may be employed in which data is replicated into a more public and resilient ledger. Generally, ledgers preserve the order of transactions, by virtue of the blockchain structure.

Beginning at 430, IdP server 350 can generate a distributed service ledger entry for the attribute provisioning transaction. The distributed service ledger entry generally is blinded, which means that most of the data in the distributed service ledger contains only hashes of data, rather than recoverable data. The distributed service ledger entry can contain:

a hashed data bundle, generated by cryptographic hashing of the entire data bundle;

a cryptographic hash of the data bundle ownership public key (UaboPub) and a corresponding blinding factor—the blinding factor can be a cryptographic nonce of a suitable length added to the data prior to applying the hash function, to improve the blinding of the cryptographic hash function;

a cryptographic hash of the identity provider public key (IdPPub) and a corresponding blinding factor;

the one or more hashed attributes, individually, and a corresponding blinding factor;

an array of the blinding factors used to generate the cryptographic hashes in the ledger entry;

metadata corresponding to the one or more attributes, such as identifications of the claim category for each hashed attribute;

expiry information corresponding to the one or more attributes—in some embodiments, expiry information may differ for different attributes, while in other embodiments, expiry information may apply to the entire data bundle—in some embodiments, expiry information may specify both "not valid before" and "not valid after" dates; and a revocation status of the data bundle.

IdP server 350 generates a ledger signing key (IdPPr L2dp), which is derived from identity provider private key (IdPPr), and signs the generated ledger entry to generate a signed ledger entry. The signed ledger entry is transmitted to the distributed service ledger.

The distributed service ledger receives the signed ledger entry at 432 and verifies the signature of the IdP server 350 to generate a signature verification result. The distributed service ledger may also verify that IdP server 350 is eligible to write to the distributed service ledger (e.g., was pre-registered in a prior operation). If the verifications are successful, the distributed service ledger creates a distributed service ledger record (L2dpR) containing the ledger entry, and sends an address of the record to IdP server 350 at 434.

At 440, IdP server 350 receives the address of the distributed service ledger record (L2dpR) and can generate a private service ledger entry for the attribute provisioning transaction. The private service ledger entry contains less blinding than the distributed service ledger entry, which means that at least some of the data in the private service ledger entry is recoverable. For example, the private service ledger entry can contain:

a hashed data bundle, generated by cryptographic hashing of the entire data bundle;

the data bundle ownership public key (UaboPub), in the clear;

the identity provider public key (IdPPub), in the clear;

the one or more hashed attributes, individually, and a corresponding blinding factor;

an array of the blinding factors used to generate the cryptographic hashes in the ledger entry;

metadata corresponding to the one or more attributes, such as identifications of the claim category for each hashed attribute;

expiry information corresponding to the one or more attributes—in some embodiments, expiry information may differ for different attributes, while in other embodiments, expiry information may apply to the entire data bundle—in some embodiments, expiry information may specify both "not valid before" and "not valid after" dates; and a distributed service ledger identifier identifying the distributed service ledger storing a corresponding ledger entry as stored at 432, and a entry address identifying the address of the distributed service ledger record (L2dpR) transmitted at 434; and a revocation status of the data bundle.

IdP server 350 signs the private service ledger entry with its private key IdPPr, to create a signed private service ledger entry, and transmits the signed entry to an IdP private service ledger.

Since the IdP server 350 creates the signed ledger entry, which contains an address of a record in the distributed service ledger, and since the private service ledger entry is signed it with a private key, this is evidence that the IdP server 350 is responsible for the corresponding distributed service ledger entry. Accordingly, records in the distributed service ledger and the private service ledger can be linked.

The distributed service ledger receives the signed private service ledger entry at 450 and verifies the signature of the IdP server 350 to generate a signature verification result. The private service ledger may also verify that IdP server 350 is eligible to write to the private service ledger (e.g., was pre-registered in a prior operation). If the verifications are successful, the private service ledger creates a private service ledger record (L1dpR) containing the ledger entry, and sends an address of the record to IdP server 350 at 452.

At 460, IdP server 350 begins generating an auditor bundle for one or more IdP blinding auditor server 352 (e.g., an auditor system in the case of more than one auditor server). The auditor bundle can contain: a first ledger identifier identifying the first ledger storing the distributed service ledger entry; a second ledger identifier identifying the private service ledger storing the private service ledger entry, the distributed service ledger record address; and the private service ledger record address.

The auditor bundle is signed using the identity provider private key IdPPr to generate a signed auditor bundle, and the signed auditor bundle is transmitted to the IdP blinding auditor server 352.

The one or more auditor server receives the signed auditor bundle at 461 and verifies the signature of the IdP server 350 to generate a signature verification result. The distributed service ledger may also verify that IdP server 350 is eligible to write to IdP blinding auditor server 352 (e.g., was pre-registered in a prior operation). If the verifications are successful, IdP blinding auditor server 352 proceeds to 462.

At 462, IdP blinding auditor server 352 accesses the private service ledger entry, based on the private service ledger identifier and the private service ledger record address. IdP blinding auditor server 352 verifies the signature of IdP server 350 on the private service ledger entry retrieved from the private service ledger, verifies that the entry has not expired and that the revocation flag indicates a valid entry.

Similarly, at 464, IdP blinding auditor server 352 accesses the distributed service ledger entry, based on the distributed service ledger identifier and the distributed service ledger record address. IdP blinding auditor server 352 verifies the signature of IdP server 350 on the distributed service ledger entry retrieved from the distributed service ledger, verifies that the entry has not expired and that the revocation flag indicates a valid entry.

If the verifications at 462 and 464 are successful, IdP blinding auditor server 352 generates a confirmation entry for storage in the distributed service ledger, at the auditor server, or both. In the case of an auditor system, each auditor server generates a confirmation entry for each of the one or more auditor servers that form the auditor system, where each confirmation entry is based on successful verification of the signature of IdP server 350 on the distributed service ledger entry and the signature of IdP server 350 on the private service ledger entry.

To facilitate auditing at a later time, the confirmation entry can contain a link from distributed service ledger record (L2dpR) to the private service ledger and private service ledger record (L1dpR). Likewise, the confirmation entry can contain a link from private service ledger record (L1dpR) to the distributed service ledger and distributed service ledger record (L2dpR).

The confirmation entry can be signed by the IdP blinding auditor server and stored locally. Optionally, the signed confirmation entry can be transmitted to IdP server 350 at 468.

Generally, each transaction record can have one or more associated audit record stored by an auditor server, with each audit record eventually assigned to a custodian (and a separate audit record stored for each transaction participant). Transaction records can contain identifiers, blinded data, and non-blinded data, whereas audit records are stored encrypted (using unique keys for each record) and can contain information removed from transactions for privacy reasons (matching the blinded evidence). In both cases, records may also exist in the underlying hash chains and contain identifiers to allow location of the transaction in the distributed ledgers.

Auditing record encryption keys may be different for each auditing record, and may be protected by computing shares using a Threshold Secret Sharing (TSS) scheme, such as Shamir's Secret Sharing, and encrypting each share to public keys controlled by designated entities. Referring still to FIG. 4, at 480, IdP server 350 generates an issued data bundle. The issued data bundle can contain the following elements:
  encrypted attributes, generated by encrypting the one or more attributes identified in the data bundle with the data encryption key DEK;
  the one or more hashed attributes, individually, which may be generated using a corresponding blinding factor;
  if blinding factors are used, an array of the blinding factors used to generate the cryptographic hashes;
  metadata, for example, as described herein with respect to FIG. 5;
  the user portion DEK1 of the data encryption key;
  the distributed service ledger identifier identifying the distributed service ledger storing a corresponding ledger entry as stored at 432, and an entry address identifying the address of the distributed service ledger record (L2dpR) transmitted at 434; and
  a private service ledger identifier identifying the private service ledger storing a corresponding ledger entry as stored at 450, and an entry address identifying the address of the private service ledger record (L1dpR) transmitted at 452.
The data bundle can also contain one or more of:
  user visible attributes (e.g., unencrypted attributes) selected from the one or more attributes identified in the data bundle;
  expiry information corresponding to the one or more attributes; and
  a revocation status of the data bundle.

A portion of the data bundle, which is left unencrypted, or else appended to the encryption portion of the data bundle in unencrypted form, contains the derivation material generated by the identity provider server, at 412, which can be used with the user public key to reconstitute the user encryption key UEK.

The remainder of the data bundle is signed with the identity provider private key IdPPr, and encrypted with the user encryption key UEK. Alternatively, the remainder of the data bundle may be encrypted and the entire bundle—both encrypted and unencrypted portions—signed. The result is the issued data bundle.

In some embodiments, the issued data bundle is transmitted to the user agent server 3390 at 480. In other embodiments, the issued data bundle may be transmitted to the distributed database or to a digital lock box provider. Still other embodiments may transmit the issued data bundle to both the user agent server 3390 and the distributed database and/or digital lock box provider. In cases where the user agent server 3390 does not immediately receive the entire issued data bundle, the user agent server 3390 may receive the user part of the data encryption key DEK1, the data bundle metadata and a reference to the data bundle, which may be a cryptographic hash of the issued data bundle.

At 490, user agent server 3390 receives the issued data bundle, verifies the IdP server 350 signature, retrieves the derivation material and generates a reconstituted user encryption key UEK. The UEK can then be used to decrypt the remainder of the issued data bundle to generate a decrypted data bundle, which is stored in a user database managed by the user agent server 3390, at 492.

In some embodiments, user agent server 3390 may distribute portions of the decrypted data bundle to a distributed database, although these portions remain encrypted with the distributed encryption key DEK.

It will be appreciated that some of the acts of method 400 can be carried out in a different order, or omitted entirely in the case of variant embodiments. For example, the order in which service ledger entries are generated at 430 and 440 can be reversed.

Likewise, at least some of the acts of method 400 can be carried out in parallel, in asynchronous fashion. For example, communications with key registrar server 340 can be carried out in parallel, or asynchronously to, those with the service ledgers.

To briefly summarize, IdP server 350 can issue data bundles to user agent server 3390 or its designated digital lock box provider. The data bundle is cryptographically attached to a user and address known by the IdP server, which the user agent server previously provided to the IdP server, via the service ledgers.

IdP servers generally are the sources of data for a user's digital identity. By participating in system 300, the IdP server effectively asserts to relying parties that an identity attribute, as provided by a user agent, is known to the IdP.

As illustrated in FIG. 4, transaction metadata is stored in the distributed and private service ledgers when a data bundle is created. In some embodiments, the data bundle is delivered to the user agent server 3390 for storage into the user's digital lock box. However, in some cases, it may be impractical or undesirable to store an entire data bundle on a user device 330. For example, where the data bundle contains a large dataset that may exceed a storage capacity of the user device. In these cases, the data bundle can also be stored, encrypted, in a service distributed database (dDB). This is achieved by having the IdP servers write the issued data bundles directly into dDB.

User data in the dDB is encrypted, and generally will only be viewable in decrypted form by a relying party or by the user agent; intermediate parties cannot access the user data. Specifically, user data is typically encrypted so that both the user agent server 3390 and the key registrar 340 are needed to obtain the decryption key DEK. In some cases, however, less sensitive data may be transmitted in the clear.

Storing user data bundles in the dDB facilitates data backup, synchronization among multiple devices, large data elements, data residency requirements, and the like.

Figure 5:
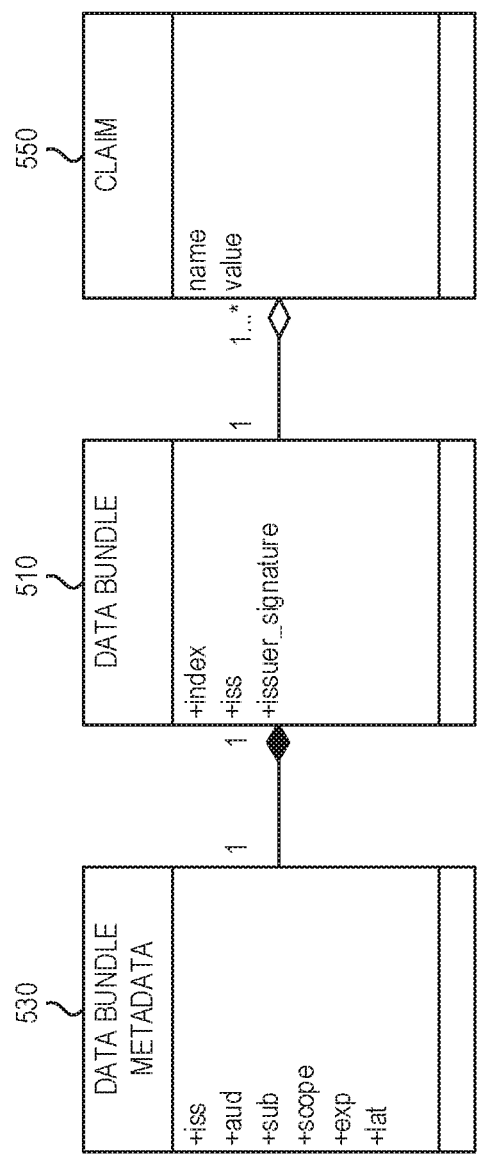
FIG. 5 is an example data structure for a data bundle in accordance with some embodiments.

Referring now to FIG. 5, there is illustrated an example data structure for a data bundle in accordance with some embodiments. A data bundle 510 may have two major components, metadata 530, which contains data bundle properties and ownership, and one or more payload 550, which contains one or more claims and attributes.

Generally, a data bundle may be a container of name/value pairs, or claims. In some embodiments, data bundles may be JavaScript Object Notation (JSON) documents, signed by the IdP server using a JSON web signature (JWS), and encrypted for recipients (aud) specified in the metadata 530 using JSON Web Encryption (JWE).

TABLE 1

Example data bundle metadata

| | |
|---|---|
| aud | The intended recipients of the data, e.g.: relying party servers, specific user agents (e.g., the user's own user agent), etc. |
| exp | The expiry date of this data. |
| iat | The "issued at" date of this data. |
| index | The index of this data structure in the data store: SHA256 of the data (including signatures). This may be produced by the dDB when a data bundle is stored. |
| iss | The IdP server identifier or address. |
| issuer_signature | The IdP server signature. |
| scope | The audience specific scope of the data bundle. |
| sub | The address of the data bundle, which may be generated, for example, based on the User@IdP address or pseudonym and the data bundle index, using a suitable derivation protocol. That is, the User@IdP or pseudonym can be derived into a bundle specific identifier, using the hash of the data bundle as the seed. This is to avoid user traceability in the dDB. |

An example payload of a data bundle from an IdP server is as follows:

```
{
  "iss" : "https://example.com/"
,
  "claims" : {
    "first_name" : "John" ,
    "last_name" : "Smith" ,
    "dob" : 1969-12-31
  }
}
```

Although method 400 is illustrated using only two service ledgers (i.e., distributed service ledger and a private service ledger), there may be a plurality of each of the distributed service ledgers and private service ledgers, forming a distributed service ledger architecture.

In some cases, when generating a response data bundle as described elsewhere herein, user agent server 3390 may be permitted to provide only a subset of the identity attributes that were originally obtained from an IdP server as part of an issued data bundle. To facilitate this, the IdP server can issue claim-level metadata in the issued data bundle, that permits the user agent server 3390 to subset identity attributes. Accordingly, user agent server 3390 may not be required to transmit the entire issued data bundle. This can enhance the user's privacy in several ways: 1) it allows the user to remove sensitive information; 2) it further masks the issuer of identity attributes from the relying party; 3) it hinders parties from colluding to uncover the identity of a user by comparing common data (e.g., expiration date).

Accordingly, the user agent server 3390 can derive and sign a new response data bundle, without information that can be fingerprinted, or which can be used to identify the IdP. To maintain verifiability of the data, blinding auditors can be used to validate and attest that the response data bundle data is valid.

The claim-level metadata can be signed, e.g., by the IdP server, to prove what identity attributes are contained in the data bundle without revealing the unencrypted identity attributes. Put another way, claim-level metadata can take the place, or supplement, a bundle-level signature.

For profiles or request scopes where the IdP is not revealed, the signed metadata need not be shared with the relying party. For example, generic data such as first name need not reveal the IdP. However, unique identifiers such as payment card numbers, driver license number, and the like, may require an indication of the IdP to be linked with the identity attribute.

Referring now to FIG. 6A, there is illustrated a system block diagram for a distributed service ledger system in accordance with some embodiments. Distributed service ledger system 370 has a distributed service ledger server 3730, a relying party private service ledger server 3720, and an identity provider private service ledger 3710. In addition, system 370 has a second distributed service ledger 3731, which employs replication of, or synchronization with, distributed service ledger 3730. Similarly, system 370 has a second identity provider private service ledger 3711, which may be replicated from server 3710, or which may be independent (e.g., with separate data).

Each of servers 3710, 3720 and 3730 may be operated by a first entity, or consortium, for example. A second entity may operate servers 3731 and 3711. Data may be replicated between various service ledger servers. However, since data bundles typically contain an identifier of the ledgers used in the creation of the data bundle, service ledgers do not need to be perfectly replicated or synchronized. That is, an entity 3750 that wishes to query a particular service ledger, can identify it or query it directly. Alternatively, entity 3750 may simply query another instance of a service ledger (i.e., with replicated data), based on the level of trust in that service ledger.

Generally, each participant (whether relying party or identity provider) is associated with its own private service ledger, which records portions of each transaction that participant is specifically involved in. With this ledger, participants can monitor that the system is operating properly and as expected. Each participant can also perform additional data mining as it relates to their own business. In addition, each participant can confirm that an entry in the private service ledger has a corresponding blinded version in the distributed service ledger (i.e., to confirm that it has not been manipulated).

Private service ledger servers may be provided and maintained by a consortium of trusted ledger auditors.

As noted elsewhere herein, to prevent a server from inferring private data, each ledger may be assigned a particular role (e.g., IdP private service ledger or distributed service ledger), and may be used only for that role. For example, an IdP service ledger would not simultaneously serve as a distributed service ledger.

As noted elsewhere herein, the distributed service ledger can contain the transaction history of the entire system, and can be replicated among many servers. The distributed service ledger generally contains a consolidated version of entries in the private service ledgers, with additional blinding, such that data sharing request entries, RP auditor entries, IdP auditor entries, key retrieval entries and the like are obfuscated.

In contrast, private service ledger entries will have less blinding on participant data, or none at all. In some cases, these entries can include certain encrypted information to unlock the entry in the case of dispute (particularly the user address, data reference and commitment blinding factors). For example, private service ledger entries may be locked to protect against snooping by requiring multiple parties to unlock an entry (e.g., each of the multiple parties may be provisioned a partial key, which requires one or more other keys to be combined to be usable to unlock the entry).

Unlocked private service ledger entries can reveal an entire transaction.

Referring now to FIG. 6B, there is illustrated a system block diagram for another distributed service ledger system in accordance with some embodiments. Distributed service ledger system 370' has a plurality of service ledger servers 3790. Each service ledger server 3790 can have multiple partitions (e.g., logical partitions), allowing it to carry out various functions. Partitioning can be carried out, for example, by dedicating predetermined nodes in a network cluster to a particular partition. Each partition is provided with unique keys, enabling decryption of data for the partition, but not that of other partitions.

Data for different pieces in a transaction can be segregated using the partitions. Accordingly, each partition of a service ledger server 3790 carries out a function analogous to a corresponding service ledger server in system 370 of FIG. 6A.

For example, a first partition can be a distributed service ledger partition for the distributed service ledger, which allows service ledger server 3790 to carry out functions analogous to those of a distributed service ledger server 3730 (e.g., as in system 370 of FIG. 6A). A further partition can be a relying party private service ledger partition, which allows service ledger server 3790 to carry out functions analogous to those of a relying party service ledger server 3720 (e.g., as in system 370 of FIG. 6A). Likewise, still another partition can be an identity provider service ledger partition, which allows service ledger server 3790 to carry out functions analogous to those of an identity provider service ledger server 3710 (e.g., as in system 370 of FIG. 6A).

As in system 370, each service ledger server 3790 can be replicated to, or synchronized with, other service ledger servers 3790 in system 370'.

In operation, when a transaction is submitted to the service ledger system 370', the transaction may be split into multiple parts, with one part generated per each appropriate partition. A transaction part destined for a particular partition is then encrypted with a unique partition encryption key. As noted above, partitions have unique keys that are not shared with other partitions, therefore each individual partition can only decrypt those transaction parts specific to the partition. For example, a relying party ledger partition has a unique partition encryption key for the relying party ledger; this key can be used to decrypt a transaction part destined for the relying party ledger, but cannot be used to decrypt a different transaction part destined for an identity provider ledger.

Accordingly, encrypted transaction parts are submitted to their respective partitions. The respective partition can decrypt the transaction part, validate the contents and carry out any additional processing appropriate for that partition. When consensus has been reached for a partition, the result may be combined with the result(s) from the other partition(s) to form a global consensus that the transaction was valid. Each of service ledger servers 3790 may be operated by a first entity, or consortium, for example. In some cases, one or more additional entities may operate the additional service ledger servers. As noted, data is replicated between various service ledger servers.

Generally, each participant (whether relying party or identity provider) is provided access (e.g., cryptographic keys) to a corresponding private service ledger partition, which records portions of each transaction that participant is specifically involved in. With access to this ledger partition, participants can monitor that the system is operating properly and as expected. In addition, each participant can confirm that an entry in the private service ledger partition has a corresponding blinded version in the distributed service ledger partition (i.e., to confirm that it has not been manipulated).

As noted elsewhere herein, to prevent a server from inferring private data, each ledger partition may be assigned a particular role (e.g., IdP private service ledger or distributed service ledger), and may be used only for that role. For example, an IdP service ledger partition would not simultaneously serve as a distributed service ledger partition, although service ledger server 3790 may contain both partitions.

As noted elsewhere herein, the distributed service ledger partition can contain the transaction history of the entire system, and can be replicated among many servers. The distributed service ledger generally contains a consolidated version of entries in the private service ledger partitions, with additional blinding, such that data sharing request entries, RP auditor entries, IdP auditor entries, key retrieval entries and the like are obfuscated.

In contrast, private service ledger partition entries will have less blinding on participant data, or none at all. In some cases, these entries can include certain encrypted information to unlock the entry in the case of dispute (particularly the user address, data reference and commitment blinding factors).

The described embodiments make use of addresses for interacting with various entities, such as the user agent server, identity provider server and relying party server. These addresses may be cryptographically-derived. In a sense, these addresses may be viewed as pseudonyms, with each participant using a unique pseudonym for each counterpart with which they interact. For example, when a user agent server interacts with an identity provider server, the user agent server may generate, or may be assigned (e.g., by a digital lock box provider or IdP server), a unique address specific to the identity provider server.

Figure 7:
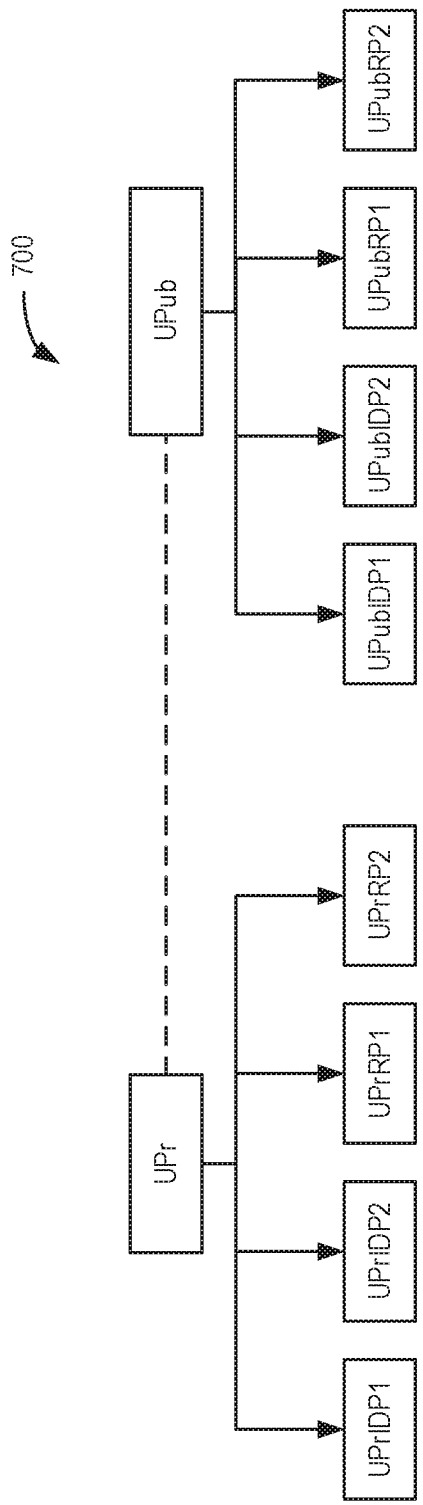
FIG. 7 is an example key hierarchy in accordance with some embodiments.

To do so, the User Agent generates a unique key pair for each entity with which it interacts. In some cases, the mechanism described in BIP32, or as described for use with the IBM Hyperledger Fabric, may be used to create a hierarchy of derived key pairs and addresses as illustrated in FIG. 7.

With this hierarchy, the user agent server can now interact with each entity using a different key pair to sign messages and perform key agreement. As usual with public key cryptography, the private keys generally do not leave the user agent server's control, while the public keys can be provided to the entity when they need to verify a signature. As a result, the user agent server can interact with other participants in a one-to-one manner, while no other participant shares a common identifier for the user agent server.

Generally, a cryptographically-derived address may have several properties:

The address is cryptographically derived from the public key (there is a provable relationship between the public key and the address);

The address cannot be reversed into a public key (given an address, one cannot extract the corresponding public key); and The address is usable by humans, that is, it can be displayed with minimal ambiguity, included in a URL, typed and checked for typos.

In some cases, a cryptographically-derived address may also be usable by a blockchain, that is, it can be used to refer to the "From" or "To" of a transaction.

One example cryptographically-derived address scheme is that used in the Bitcoin protocol: HASH160 of the PublicKey+Base58 Encoding, where HASH160 is the SHA-2 function, followed by the RACE integrity Primitives Evaluation Message Digest function (RIPEMD).

As a result of this address scheme, user agent servers are tightly associated with their addresses. A user agent server can provide proof that it controls an identifier by signing challenge data (e.g., addresses) with its private key. Since the user private key does not leave the control of the user agent server, the party interacting with the user can be assured in the correctness of exchanged data by verifying the signature of the address using cryptographic means.

Providing Attributes to Relying Parties

Figure 8:
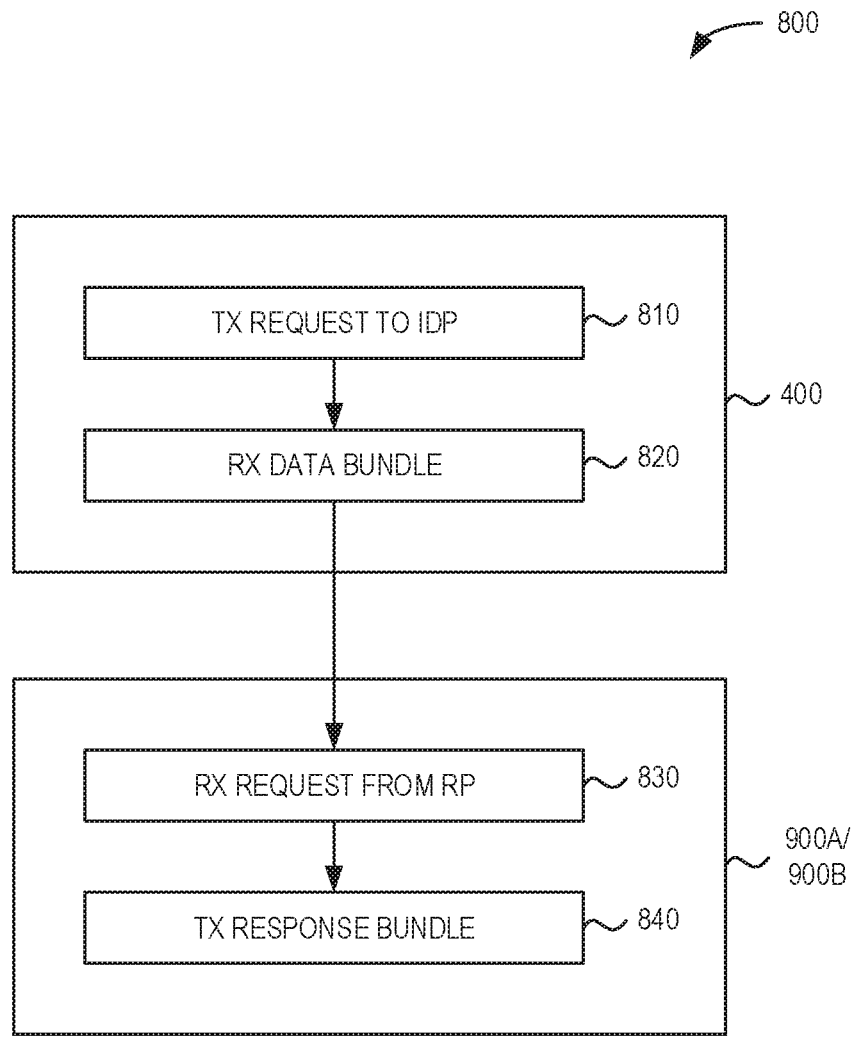
FIG. 8 is a process flow diagram for controlling an exchange of data bundles by a user agent server, in accordance with some embodiments.

Referring now to FIG. 8, there is illustrated a process flow diagram for controlling an exchange of data bundles by a user agent server, in accordance with some embodiments.

Identity management method 800 generally enables the asynchronous authentication and provision of identity attributes. This means that a user—and more specifically the user agent—can collect digital identity data from one or more IdP servers at any time before exchanging data with a RP server and, in some embodiments, store the data with a digital lock box provider. Assuming that the user agent has already collected the information required by RP server (e.g., user's first name, last name, date of birth) in a data bundle, the user may authorize the user agent or digital lock box provider to release the requested data bundle to the RP server, without further involvement from the IdP server.

Identity management method 800 involves two primary phases. In a first phase, user agent server 3390 carries out acts associated with identity management method 400, as described herein. In particular, user agent server 3390 transmits a request for IdP server 350 at 810, and receives a data bundle at 820. Acts 810 and 820 generally correspond to acts 402, 407, 408, 490 and 492 of method 400, and are not repeated here in detail.

In a second phase, user agent server 3390 receives a request from a relying party (RP) server 310 at 830, with the request identifying a desired scope of attributes to be provided to RP server 310, for example as part of a user registration or login process. At 840, user agent server 3390 generates and provides a response bundle in response to the request.

Acts 830 and 840 are described in greater detail with reference to the example methods 900A and 900B.

Figure 9A:
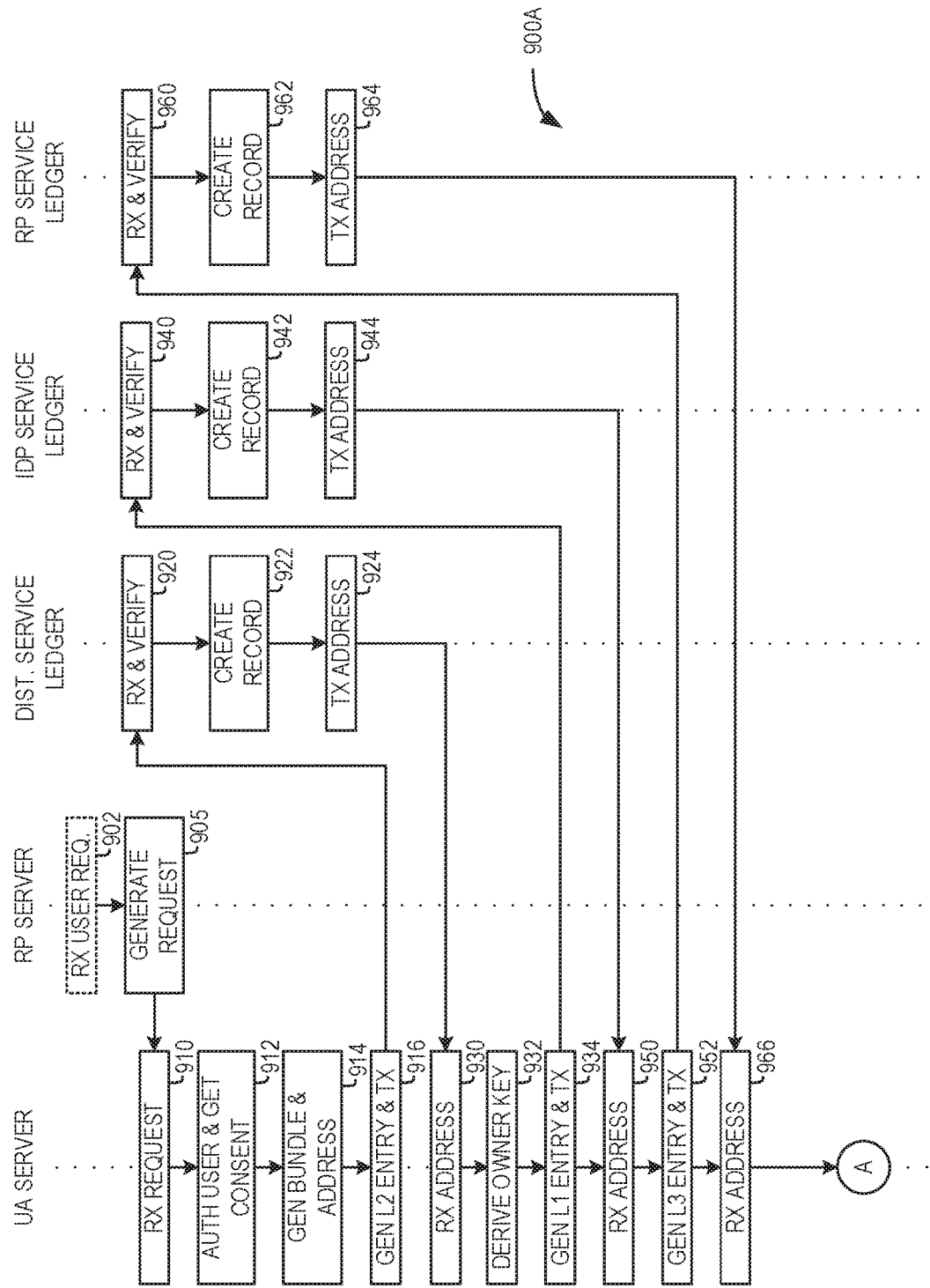
FIG. 9A is a process flow diagram for an example identity management method for controlling an exchange of data bundles by a user agent server, in accordance with some embodiments.

Referring now to FIG. 9A, there is illustrated a process flow diagram for an example identity management method for controlling an exchange of data bundles by a user agent server, in accordance with some embodiments.

Identity management method 900A begins at 902, with a user device 330 exchanging data with a relying party server 310. For example, a web browser of user device 330 may be attempting to login, or to provide other data, to a legacy web site of relying party server 310. RP server 310 determines that one or more identity attribute is desired as party of the interaction with user device, and proceeds to generate a request identifying a scope of identity attributes that are desired, at 905. The generated request is transmitted to user agent server 3390 of user device 330, for example via a web browser, via SMS text message, or via the user capturing an image of a quick response (QR) code generated by RP server 310 (which also encodes a response address).

At 910, user agent server 3390 receives the request and determines the scope of the request, and the specific identity attributes that are desired by RP server 310.

At 912, user agent server 3390 determines whether it can provide some or all of the requested identity attributes. For example, user agent server 3390 may review its locally-stored data bundles or data bundles in the distributed database or digital lock box provider, to determine if the requested identity attributes have previously been issued by an IdP server, such that the identity attributes are in a locally-stored data bundle or in the distributed database or digital lock box provider. In some cases, if certain requested identity attributes have not been previously issued, user agent server 3390 may initiate a process similar to method 400, in order to obtain the requested identity attributes from an IdP server.

When one or more of the requested attributes are available, user agent server 3390 or digital lock box provider, or both, may request authentication from a user of the user device 330. The authentication may involve the user entering a password, biometric, token or other factor via a user interface of user device 330. In some cases, user authentication may be delegated to an IdP server 350, which can provide confirmation to user agent server 3390 once authentication is successfully completed.

With the user authenticated, user agent server 3390 can further prompt the user, via user device 330, to consent to the release of at least some of the requested identity attributes to RP server 310. For example, a graphical user interface of user device 330 may display claim categories and attribute values that are requested, along with a selection widget (e.g., checkbox, drop-down dialog, etc.).

If the user has authenticated and provided consent, user agent server 3390 can generate a response bundle based on the scope of attributes identified in the request and the user consent, where the response bundle identifies one or more response attributes associated with a user related to the user agent server, and where each response attribute corresponds to a claim category and a corresponding value.

User agent server 3390 can generate a pseudonym or user agent address (User@RP) uniquely identifying the user agent server to the RP server, which can be generated based on UPub in similar fashion to the User@IdP address used in method 400. As with the User@IdP address, the User@RP address can, in some embodiments, be created by a third party, such as a digital lock box provider.

At 916, user agent server 3390 can generate a distributed service ledger entry for the attribute release transaction. The distributed service ledger entry generally is blinded, which means that most of the data in the distributed service ledger contains only hashes of data, rather than recoverable data. The distributed service ledger entry for the attribute release transaction can contain:

a hashed response data bundle, generated by cryptographic hashing of the entire response data bundle;

a cryptographic hash of the relying party public key (RPPub);

a cryptographic hash of the pseudonym/user agent address for the relying party (User@RP);

the one or more hashed attributes included in the response data bundle, individually, and a corresponding blinding factor;

an array of the blinding factors used to generate the cryptographic hashes in the ledger entry;

metadata corresponding to the one or more attributes, such as identifications of the claim category for each hashed attribute;

expiry information corresponding to the one or more attributes—in some embodiments, expiry information may differ for different attributes, while in other embodiments, expiry information may apply to the entire data bundle—in some embodiments, expiry information may specify both "not valid before" and "not valid after" dates; and a revocation status of the data bundle.

User agent server 3390 generates a ledger signing key, which is a private key derived from the pseudonym/user agent address User@RP. Using the ledger signing key, user agent server 3390 signs the generated ledger entry to generate a signed ledger entry. The signed ledger entry is transmitted to the distributed service ledger. In some cases, additional signatures may be made by the user agent itself (e.g., a specific mobile app), or the user device.

The distributed service ledger receives the signed ledger entry at 920 and verifies the signature of the user agent server 3390 to generate a signature verification result. The distributed service ledger may also verify that user agent server 3390 is eligible to write to the distributed service ledger (e.g., was pre-registered in a prior operation). If the verifications are successful, the distributed service ledger creates an attribute release record in the distributed service ledger containing the ledger entry at 922, and sends an address of the attribute release record (L2aR) to user agent server 3390 at 924.

At 930, user agent server 3390 receives the address of the attribute release record L2aR.

At 932, user agent server 3390 generates a response bundle ownership key pair with a response data bundle ownership public key (UaboPub) and a response data bundle ownership private key (UaboPr), using derivation material previously received from the IdP server (e.g., as generated at 412 of method 400, and received at 490 of method 400 with the issued data bundle). The derivation material generated by the IdP server during the provisioning process thus serves as a link between the provisioning process and attribute release to the RP server. The response data bundle ownership public and private keys are usable for releasing the response bundle to the relying party server. The response bundle ownership key pair can be generated using derivation material using a suitable key derivation protocol as described elsewhere herein.

At 934, user agent server 3390 can generate an IdP private service ledger entry for the attribute release transaction. The IdP private service ledger entry can contain:

a hashed data bundle, generated by cryptographic hashing of the entire data bundle;

the identity provider public key (IdPPub), in the clear;

the data bundle ownership public key (UaboPub), in the clear;

the one or more hashed attributes, individually, and a corresponding blinding factor;

an array of the blinding factors used to generate the cryptographic hashes in the ledger entry;

metadata corresponding to the one or more attributes, such as identifications of the claim category for each hashed attribute;

expiry information corresponding to the one or more attributes—in some embodiments, expiry information may differ for different attributes, while in other embodiments, expiry information may apply to the entire data bundle—in some embodiments, expiry information may specify both "not valid before" and "not valid after" dates; and at least one distributed service ledger identifier identifying the distributed service ledger storing a ledger entry created at 432 of method 400, that is, when the identity attributes were initially provisioned, and an entry address identifying the address of distributed service ledger record (L2dpR) was transmitted as at 434 of method 400;

at least one private service ledger identifier identifying the private service ledger storing a ledger entry created at 450 of method 400, that is, when the identity attributes were initially provisioned, and an entry address identifying the address of private service ledger record (L1dpR) was transmitted as at 452 of method 400;

a revocation status of the data bundle.

User agent server 3390 signs the IdP private service ledger entry with private key UaboPr, to create a signed IdP private service ledger entry, and transmits the signed entry to the IdP private service ledger.

Since the user agent server 3390 creates the signed IdP private service ledger entry, which contains an address of a provisioning record in the distributed service ledger, records in the distributed service ledger from the original provisioning event, and the IdP private service ledger can be linked.

The signed IdP private service ledger entry is transmitted to the IdP private service ledger.

The IdP private service ledger receives the signed IdP private service ledger entry at 940 and verifies the signature of the user agent server 3390 to generate a signature verification result. The IdP private service ledger may also verify that user agent server 3390 is eligible to write to the IdP private service ledger (e.g., was pre-registered in a prior operation). If the verifications are successful, the IdP private service ledger creates an attribute release record in the IdP private service ledger containing the ledger entry at 942, and sends an address of the attribute release record (L1aR) to user agent server 3390 at 944.

At 950, user agent server 3390 receives the address of the attribute release record L1aR.

At 952, user agent server 3390 can generate a RP private service ledger entry for the attribute release transaction. The RP private service ledger entry can contain:

a hashed data bundle, generated by cryptographic hashing of the entire data bundle;

the relying party public key RPPub;

the pseudonym/user agent address User@RP;

the one or more hashed attributes, individually, and a corresponding blinding factor;

an array of the blinding factors used to generate the cryptographic hashes in the ledger entry;

metadata corresponding to the one or more attributes, such as identifications of the claim category for each hashed attribute;

expiry information corresponding to the one or more attributes—in some embodiments, expiry information may differ for different attributes, while in other embodiments, expiry information may apply to the entire data bundle—in some embodiments, expiry information may specify both "not valid before" and "not valid after" dates; and at least one distributed service ledger identifier identifying the distributed service ledger storing a ledger entry created at 432 of method 400, that is, when the identity attributes were initially provisioned, and an entry address identifying the address of distributed service ledger record (L2dpR) was transmitted as at 434 of method 400;

a revocation status of the data bundle.

User agent server 3390 signs the RP private service ledger entry with the ledger signing key, which is the private key derived from the pseudonym/user agent address User@RP.

Since the user agent server 3390 creates the signed RP private service ledger entry, which contains an address of a provisioning record in the distributed service ledger, records in the distributed service ledger from the original provisioning event, and the RP private service ledger can be linked.

The signed RP private service ledger entry is transmitted to the RP private service ledger.

The RP private service ledger receives the signed RP private service ledger entry at 960 and verifies the signature of the user agent server 3390 to generate a signature verification result. The RP private service ledger may also verify that user agent server 3390 is eligible to write to the RP private service ledger (e.g., was pre-registered in a prior operation). If the verifications are successful, the RP private service ledger creates an attribute release record in the RP private service ledger containing the ledger entry at 962, and sends an address of the attribute release record (L3aR) to user agent server 3390 at 964.

At 966, user agent server 3390 receives the address of the attribute release record L3aR.

Figure 9B:
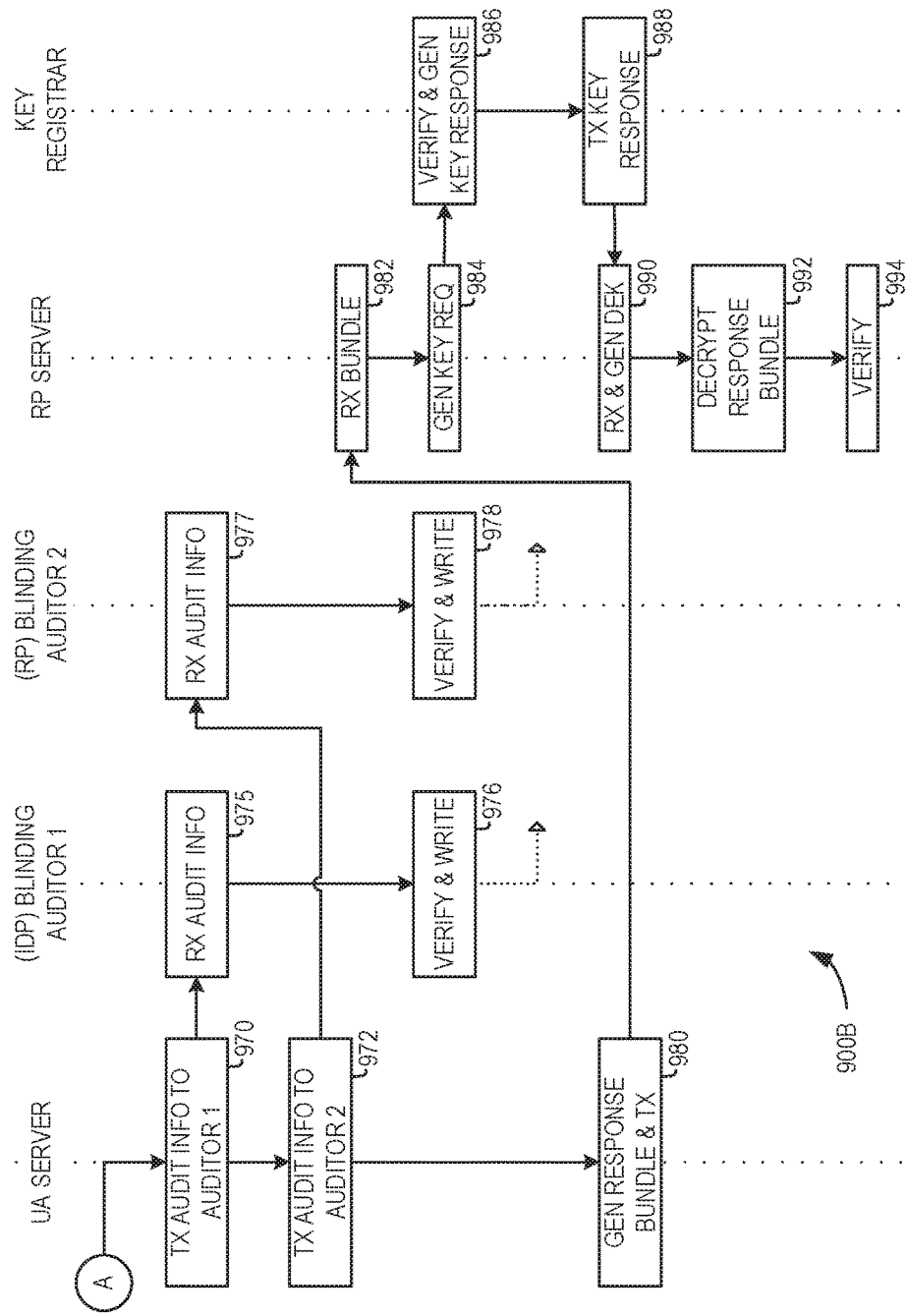
FIG. 9B continues the process flow diagram of FIG. 9A.

Method 900A now to continues to method 900B shown in FIG. 9B. Methods 900A and 900B are linked at marker A.

At 970, user agent server 3390 generates a first auditor bundle for a first auditor system (e.g., IdP blinding auditor), the first auditor bundle having a distributed service ledger identifier identifying the distributed service ledger storing the attribute release record L2aR, and an IdP private service ledger identifier identifying the IdP private service ledger storing the attribute release record L1aR, along with both addresses L1aR and L2aR. The first auditor bundle is transmitted to the IdP blinding auditor 352 (or auditor system).

At 975, IdP blinding auditor 352 receives the first auditor bundle and verifies that the entry with address L2aR is consistent with the IdP service ledger, for example by comparing hashes of data in the distributed service ledger with corresponding entries in the IdP service ledger, to generate a comparison result.

IdP blinding auditor 352 also verifies that the response data bundle ownership public key in the entry with address L1aR matches a response data bundle ownership public key in the corresponding data provisioning record to generate a second comparison result.

If the first and second comparisons are successful, IdP blinding auditor 352 generates at least one confirmation entry, and at 976 links the L1aR and L2aR addresses to the distributed service ledger identifier, by writing the L2aR address into the IdP service ledger, and writing the L1aR address into the distributed service ledger.

At 972, user agent server 3390 generates a second auditor bundle for a second auditor system (e.g., RP blinding auditor), the second auditor bundle having a distributed service ledger identifier identifying the distributed service ledger storing the attribute release record L2aR, and an RP private service ledger identifier identifying the RP private service ledger storing the attribute release record L3aR, along with both addresses L3aR and L2aR. The second auditor bundle is transmitted to the RP blinding auditor 312 (or auditor system).

At 977, RP blinding auditor 312 receives the second auditor bundle and verifies that the entry with address L2aR is consistent with the RP service ledger, for example by comparing hashes of data in the distributed service ledger with corresponding entries in the RP service ledger, to generate a comparison result.

If the comparison is successful, RP blinding auditor 352 generates at least one confirmation entry, and at 978 links the L3aR and L2aR addresses to the distributed service ledger identifier, by writing the L2aR address into the RP service ledger, and writing the L3aR address into the distributed service ledger.

At 980, user agent server 3390 generates the response data bundle. The response data bundle can have a data structure similar to that of the issued data bundle created by IdP server 350 in method 400, and as described with reference to FIG. 5. Generally, the response data bundle can contain the following elements:

encrypted attributes, generated by encrypting the one or more attributes identified in the data bundle—the attributes can be encrypted with the data encryption key used by the IdP server 350 that issued the attributes;

the one or more hashed attributes, individually, which may be generated, optionally by using a corresponding blinding factor;

the user portion DEK1 of the data encryption key—in some cases, if more than one IdP is the source of the attributes in the response data bundle, each DEK1 may be included, along with metadata to identify the attributes to which it corresponds;

if blinding factors are used, an array of the blinding factors used to generate the cryptographic hashes; and the distributed service ledger identifier identifying the distributed service ledger storing a corresponding attribute release record entry as stored at 922, and an entry address identifying the address of the attribute release record (L2aR) transmitted at 924.

The response data bundle can contain more, or fewer, elements in some cases. The response data bundle may be signed and encrypted by user agent server 3390 for RP server 310. The response data bundle is transmitted to RP server 310, at 980.

In the case of identity attributes that are present only in the distributed database (e.g., because they are too large for local storage at user device 330), the response data bundle may include an address at which the encrypted attributes can be retrieved (e.g., by RP server 310 from a distributed database server) in place of the encrypted attribute itself. In some cases, an address of the issued data bundle that contains the identity attribute may be used instead.

At 982, RP server 310 receives the response data bundle, and may decrypt and verify the signature of user agent server 3390.

At 984, RP server 310 extracts the attribute release record address L2aR from the response data bundle, and generates a key registrar bundle, generally contains:

a relying party public key corresponding to the relying party server (e.g., RPPub);

a distributed service ledger identifier;

the attribute release record address L2aR at the distributed service ledger; and a cryptographic nonce.

Optionally, the key registrar bundle can be signed using the relying party private key (e.g., RPPr), to establish that the request originates from RP server 310, it is then transmitted to key registrar server 340.

At 986, key registrar server 340 receives the key registrar bundle and validates the relying party, by generating a cryptographic hash of the relying party public key RPPub and comparing this with the hashed relying party public key that was submitted to the distributed service ledger by user agent server 3390 at 916.

Based on the distributed service ledger identifier or the attribute release record address, key registrar 340 queries the identified distributed service ledger for the attribute release record with address L2aR, and receives the record in response, which contains hashes of the record attributes.

Based on the hashed attributes, key registrar 340 retrieves a key registrar portion of the data encryption key for the attributes, DEK2.

At 988, key registrar 340 encrypts the key portion DEK2 with the relying party public key RPPub, and transmits the encrypted key to the RP server 310.

At 990, RP server 310 receives the encrypted key, decrypts it to obtain the DEK2, and reconstructs the data encryption key DEK using the user portion of the key DEK1, which was received as part of the response data bundle. The reconstruction can proceed as described elsewhere herein, for example in accordance with the Shamir Secret Sharing algorithm.

At 992, RP server 310 uses the reconstructed data encryption key DEK to decrypt the encrypted attributes.

Transaction Audit by RP

Optionally, at 994, RP server 310 can verify the one or more identity attributes, for example, by accessing the attribute release record at address L2aR, verifying that the attribute release record at address L1aR is linked to address L2aR by IdP blinding auditor server 352, and verifying that the attribute release record at address L3aR is linked to address L2aR by RP blinding auditor server 312. Verification can be carried out by comparing the cryptographic hash of the one or more response attributes contained in the ledger entries with the hashed response attributes in the response data bundle. Once verified, the identity attributes can be provided to legacy systems such as a relying party web server, for further use. Verification at 994 can be omitted in some cases, such as low risk transactions, or may be performed only intermittently as a spot check.

In general, RP server 310 (or any participant) may implicitly trust the attestations provided by blinding auditor servers. However, it remains to possible to verify whether any service ledger entry, auditor attestation, data bundle, or user address is still valid.

Generally, to verify a data bundle, a participant can: 1) query for the appropriate private service ledger entry using a reference (e.g., the bundle hash or an entry within the auditor attestation); and 2) look up the reference to the corresponding distributed service ledger entry from the private service ledger entry, and query for the appropriate distributed service ledger entry using the reference from the previous step.

To validate that an auditor properly performed a blinding operation, a participant that holds the unblinded data can verify that its ledger entries are properly created. To do so, the participant can: 1) query for the appropriate service ledger entries (as above); and 2) validate that the blinding information is correctly generated.

For example, in the event that RP server 310 wishes to perform an attribute release transaction audit, RP server 310 can investigate the record in the distributed service ledger and extract the attribute release record at address L2aR.

In some cases, RP server 310 may verify that the attribute release record was signed by trusted auditors, for example by verifying that there are corresponding attribute release records at L1aR and L3aR (each of which related to L2ar) signed by trusted auditors (e.g., IdP and RP blinding auditor servers).

Additionally, to verify identity attributes have been cryptographically attested, RP server 310 can compute a cryptographic hash of the data (e.g., identity attribute) received in the response data bundle using the blinding factors (e.g., nonces) found in the ledger entries. If the hashes computed in this way match those in the response data bundle, this is confirmation that the data is valid and attested.

It will be appreciated that some of the acts of method 900A and 900B can be carried out in a different order, or omitted entirely in the case of variant embodiments. For example, the order in which auditor servers are engaged at 970 and 972 can be reversed.

Likewise, at least some of the acts of method 900A and 900B can be carried out in parallel, in asynchronous fashion. For example, communications with IdP and RP blinding auditor servers can be carried out in parallel, or asynchronously to, those with the RP server 310.

In some embodiments in which a digital lock box provider is used, the digital lock box provider may carry out some or all acts of methods 900A and 900B on behalf of user agent server 3390.

To briefly summarize, user agent server 3390 can generate response data bundles for RP server 310. The response data bundle is cryptographically attached to a user and address known by the RP server, and also contains data that is cryptographically attached to IdP servers and verifiable in one or more service ledgers. Each attribute release transaction is also recorded in one or more service ledgers, allowing for later auditing.

Although not always described explicitly herein, all communications between servers and computing devices in the described embodiments—including but not limited to those of methods 400, 900A and 900B—can be secured using session-based encryption, such as Transport Layer Security (TLS).

As noted above, when generating a response data bundle, user agent server 3390 has the ability in some cases to provide only a subset of the identity attributes that were originally obtained from an IdP server as part of an issued data bundle. To facilitate this, the IdP server can issue claim-level metadata in the issued data bundle, that permits the user agent server 3390 to subset identity attributes. Accordingly, user agent server 3390 may not be required to transmit the entire issued data bundle. This can enhance the user's privacy in several ways: 1) it allows the user to remove sensitive information; 2) it further masks the issuer of identity attributes from the relying party; 3) it hinders parties from colluding to uncover the identity of a user by comparing common data (e.g., expiration date).

Accordingly, the user agent server 3390 can derive and sign a new response data bundle, without information that can be fingerprinted, or which can be used to identify the IdP. To maintain verifiability of the data, blinding auditors can be used to validate and attest that the response data bundle data is valid.

However, in some cases, user agent server 3390 can generate a response data bundle that contains a full issued data bundle. The response data bundle generally can contain the issued data bundle (or a reference to it, if stored in the distributed database) encrypted using JWE, for example. For verification by auditor servers, the response data bundle can further contain the User@RP address, the data bundle reference, the data bundle hash, an IdP category (if available) and a specific issuer (if allowed). The DEK1 can also be provided.

Because the response data bundle in such cases contains a full issued data bundle, which has already been recorded in the service ledgers, the process of methods 900A and 900B can be simplified. Rather than generating new ledger entries, and auditing, the original ledger entries and auditor records can be leveraged.

Figure 10:
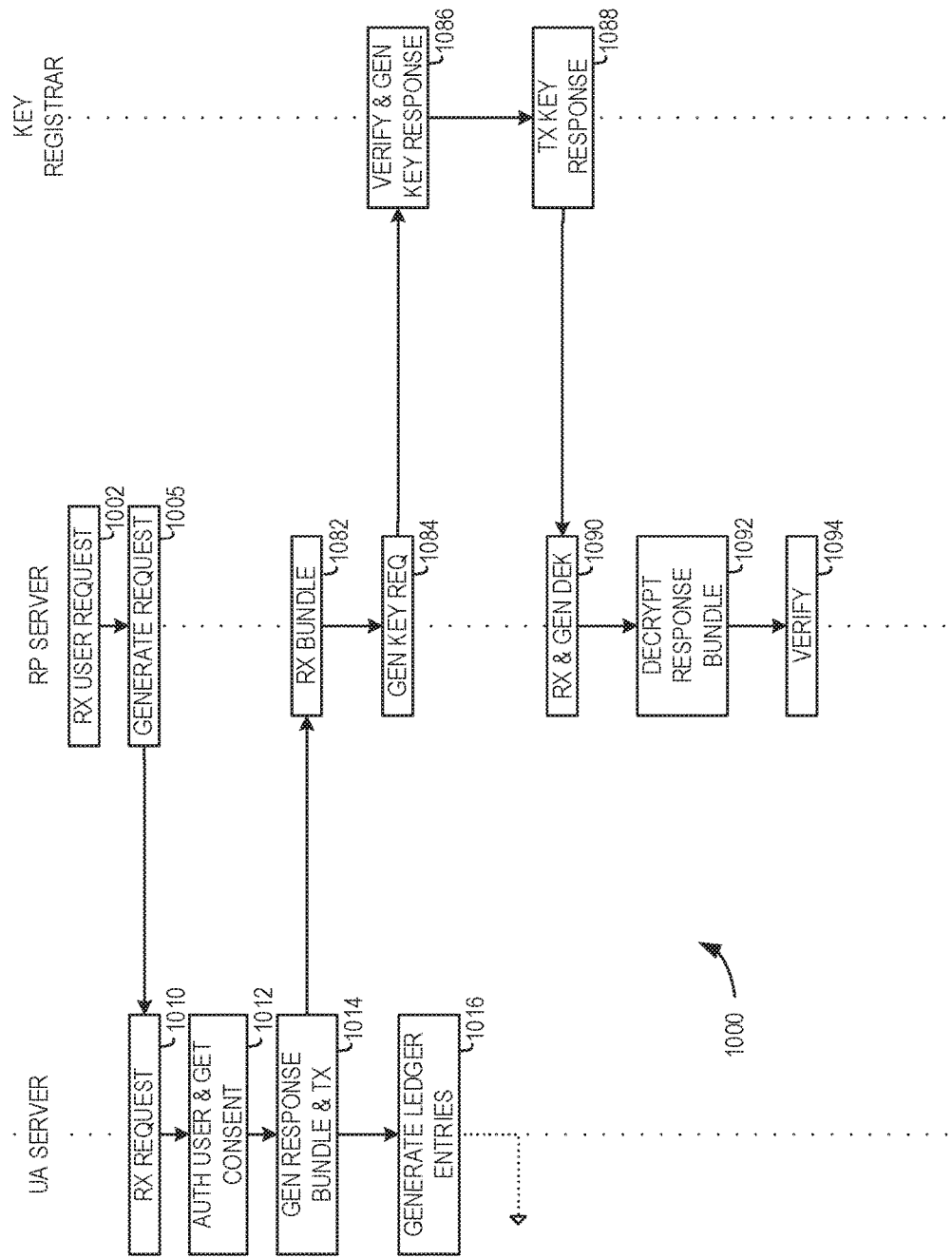
FIG. 10 is a process flow diagram for an example identity management method for controlling an exchange of data bundles by a user agent server, in accordance with some embodiments.

Referring now to FIG. 10, there is illustrated a process flow diagram for an example identity management method for controlling an exchange of data bundles by a user agent server, in accordance with some alternative embodiments. Identity management method 1000 is generally analogous to methods 900A and 900B, except that the response data bundle is based on the entirety of an issued data bundle. That is, individual identity attributes are released only as part of the data bundle in which they were issued.

Identity management method 1000 begins at 1002, with a user device 330 exchanging data with a relying party server 310. For example, a web browser of user device 330 may be attempting to login, or to provide other data, to a legacy web site of relying party server 310. RP server 310 determines that one or more identity attribute is desired as party of the interaction with user device, and proceeds to generate a request identifying a scope of identity attributes that are desired, at 1005. The generated request is transmitted to user agent server 3390 of user device 330, for example via a web browser, or via the user capturing an image of a quick response (QR) code generated by RP server 310 (which also encodes a response address).

At 1010, user agent server 3390 receives the request and determines the scope of the request, and the specific identity attributes that are desired by RP server 310.

At 1012, user agent server 3390 determines that the requested identity attributes are part of a previously issued data bundle. For example, user agent server 3390 may review its locally-stored data bundles or data bundles in the distributed database, to determine if the requested identity attributes have previously been issued by an IdP server, such that the identity attributes are in a locally-stored data bundle or in the distributed database or digital lock box provider. In some cases, if certain requested identity attributes have not been previously issued, user agent server 3390 may initiate a process similar to method 400, in order to obtain the requested identity attributes from an IdP server.

Once one or more of the requested attributes are available, user agent server 3390 or the digital lock box provider, or both, may request authentication from a user of the user device 330 as described elsewhere herein.

With the user authenticated, user agent server 3390 can further prompt the user, via user device 330, to consent to the release of all the requested identity attributes in the issued data bundle to RP server 310. For example, a graphical user interface of user device 330 may display the claim categories and attribute values that are requested, along with a selection widget (e.g., checkbox, drop-down dialog, etc.) to authorize release of the data bundle.

If the user has authenticated and provided consent, user agent server 3390 can generate a response bundle based on the issued data bundle, and transmit the response bundle to RP server 310 at 1014.

User agent server 3390 can also generate and include a user agent address (User@RP) uniquely identifying the user agent server to the RP server, which can be generated based on UPub in similar fashion to the User@IdP address or pseudonym used in method 400.

At 1016, user agent server 3390 generates and submits ledger entries for the attribute release, which are sent to the distributed service ledger and the RP private service ledger (not shown). In some cases, ledger entries can also be made in the IdP private service ledger for the issuing IdP. The distributed service ledger entry is generally similar to that generated at 916, but may omit hashes and metadata related to individual identity attributes, including instead only the issued data bundle. The response data bundle can be finalized to include the attribute release record addresses, and transmitted to RP server 310.

At 1082, RP server 310 receives the response data bundle, and may decrypt and verify the signature of user agent server 3390.

At 1084, RP server 310 extracts the attribute release record address L2aR from the response data bundle, and generates a key registrar bundle, generally contains:
- a relying party public key corresponding to the relying party server (e.g., RPPub);
- a distributed service ledger identifier;
- the attribute release record address L2aR at the distributed service ledger; and
- a cryptographic nonce.

Optionally, the key registrar bundle can be signed using the relying party private key (e.g., RPPr), to establish that the request originates from RP server 310, it is then transmitted to key registrar server 340.

At 1086, key registrar server 340 receives the key registrar bundle and validates the relying party, by generating a cryptographic hash of the relying party public key RPPub and comparing this with the hashed relying party public key that was submitted to the distributed service ledger by user agent server 3390 at 1016.

Based on the distributed service ledger identifier or the attribute release record address, key registrar 340 queries the identified distributed service ledger for the attribute release record with address L2aR, and receives the record in response, which contains hashes of the record attributes.

Based on the hashed attributes, key registrar 340 retrieves a key registrar portion of the data encryption key for the attributes, DEK2.

At 1088, key registrar 340 encrypts the key portion DEK2 with the relying party public key RPPub, and transmits the encrypted key to the RP server 310.

At 1090, RP server 310 receives the encrypted key, decrypts it to obtain the DEK2, and reconstructs the data encryption key DEK using the user portion of the key DEK1, which was received as part of the response data bundle. The reconstruction can proceed as described elsewhere herein, for example in accordance with the Shamir Secret Sharing algorithm.

At 1092, RP server 310 uses the reconstructed data encryption key DEK to decrypt the encrypted attributes.

At 1094, RP server 310 can verify the data bundle, for example, by accessing the attribute release record at address L2aR, verifying that the attribute release record at address L1aR is linked to address L2aR by IdP blinding auditor server 352, and verifying that the attribute release record at address L3aR is linked to address L2aR by RP blinding auditor server 312.

In some variant embodiments, the attribute release record may be linked with the attribute provisioning records (L1dpR, L2dpR) of the issued data bundle instead.

Verification can be carried out by comparing the cryptographic hash of the one or more response attributes contained in the ledger entries with the hashed response attributes in the response data bundle. Once verified, the identity attributes can be provided to legacy systems such as a relying party web server, for further use.

In the embodiments illustrated in method 400 and methods 900A, 900B and 1000, generally, there is a single auditor server shown for each IdP server and RP server. That is, there appears to be a single IdP blinding auditor that corresponds to IdP server 350, and a single RP blinding auditor that corresponds to RP server 310. However, in some embodiments, multiple auditor confirmations may be supported and multiple attribute bundles may be created. In such embodiments, confirmations from each of the multiple auditors may be required for validation and attestation.

In some embodiments in which a digital lock box provider is used, the digital lock box provider may carry out some or all acts of method 1000 on behalf of user agent server 3390.

Data Revocation

Occasionally, an IdP may wish to revoke one or more identity attributes that have been issued previously. This may occur, for example, if a user ceases to be a client of a financial institution, if a payment card number is cancelled, if a driver's license is revoked, etc.

To revoke a previously issued identity status, an IdP server 350 can append or modify ledger entries in the IdP private service ledger with an updated revocation status that indicates that data in the ledger entry is no longer valid. Subsequently, when a participant attempts to verify the data, or is performing an audit, the data will be identified as revoked.

User Recovery

When recovery data has been created as part of the attribute provisioning process, and the user device 330 is subsequently lost or damaged, a user account can be recovered without re-engaging in a new attribute provisioning process.

Figure 11:
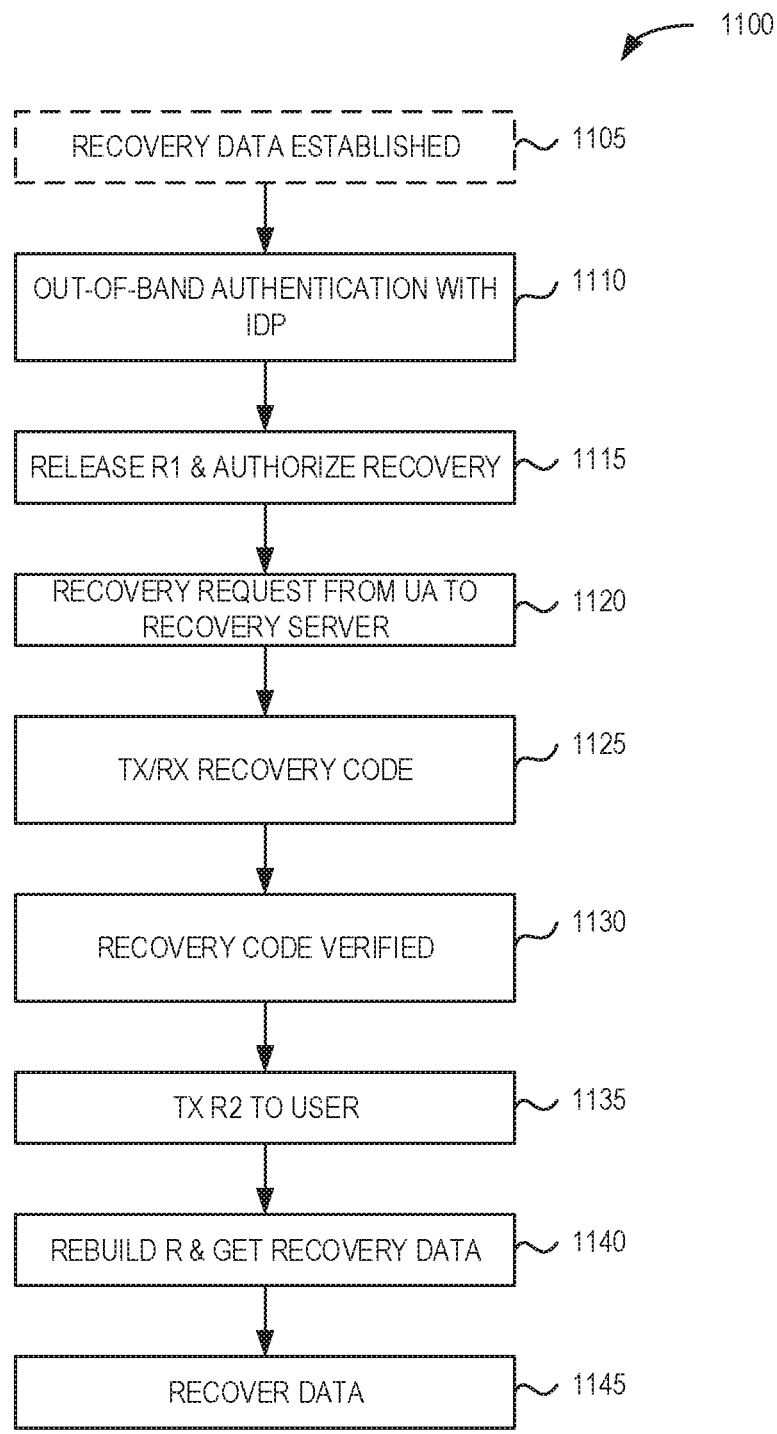
FIG. 11 is a process flow diagram for user account recovery, in accordance with some embodiments.

Referring now to FIG. 11, there is illustrated a process flow diagram for user account recovery, in accordance with some embodiments.

Recovery method 1100 assumes that recovery data has been established previously at 1105, for example during method 400. In particular, a user recovery key R was created, split into R1 and R2. With R1 stored with an IdP server, and with R2 and encrypted recovery data stored in the distributed database at a known location.

At 1110, a user can authenticate out-of-band with the primary IdP with which the recovery data was originally stored. For example, if the IdP is a financial institution, the user can satisfy the identification or authentication requirements of the financial institution. If the financial institution accepts the identification of the user, at 1115, it can release the IdP recovery key portion R1 to the user device 330, and transmit a recovery authorization (which optionally identifies the user agent server 3390) to recovery server 390.

At 1120, user agent server 3390 transmits a recovery request to recovery server 390.

At 1125, recovery server 390 may transmit a recovery code to user device 330. The recovery code can be transmitted out-of-band, for example, using a SMS text message to a phone number associated with user device 330.

At 1130, the user provides the recovery code to user agent 3310, via a user interface, the code is in turn relayed to user agent server 3390 and transmitted to recovery server 390, where it is verified.

If the recovery code was successfully verified by recovery server 390, the recovery server key portion R2 can be transmitted to user agent server 3390 at 1135.

At 1140, user agent server 3390 receives the key R2 and uses both key portions R1 and R2 to reconstruct the recovery key R. User agent server 3390 retrieves the encrypted recovery data from the distributed database and, using the reconstructed recovery key R, decrypts the encrypted recovery data at 1145.

Identity Provider Registration

New identity providers can be registered as part of system 300. Generally, IdPs can be added by adding an IdP identifier and a corresponding public key to a database of identity providers maintained by user agent server 3390 (e.g., configuration database 3397). In some cases, updated databases can be "pushed" to user devices by a trusted authority. In other cases, users can select to add new IdPs independently.

Generally, an IdP server should have a signed cryptographic certificate for use with TLS (and corresponding private key), a master signing key, a master encryption key. IdP server will also create and manage derived or generated keys used in signing or encrypting messages in system 300. Generally, master keys, derived and generated keys should be generated and protected by a Hardware Security Module (HSM). The public keys can be stored in a JWK (JSON Web Key) data structure, and identified with OpenID Connect metadata on a legacy web server. OpenID Connect metadata can hold pointers to JWK key set files, which specify the IdP keys used for signing and encryption. Key trust is therefore hierarchical: system 300 can trust the JWK file because it was referenced in the IdP server's OpenID Connect metadata document hosted at the IdP domain with a verified TLS certificate.

Relying Party Registration

New relying parties can be registered as part of system 300. Generally, relying parties can be added by a trusted party, such as an existing a system governance authority or IdP. The trusted party can register the relying party in a registry (e.g., configuration database 3397), which can be pushed to or otherwise updated by user agent servers 3390. Optionally, or alternatively, an IdP can issue credentials to update the registry and provide the updates to user agent servers 3390. The RP can create a metadata file with a TLS certificate and public keys for the relying party, which can be provided with the RP registry update.

Gateway IdP System

Figure 12A:
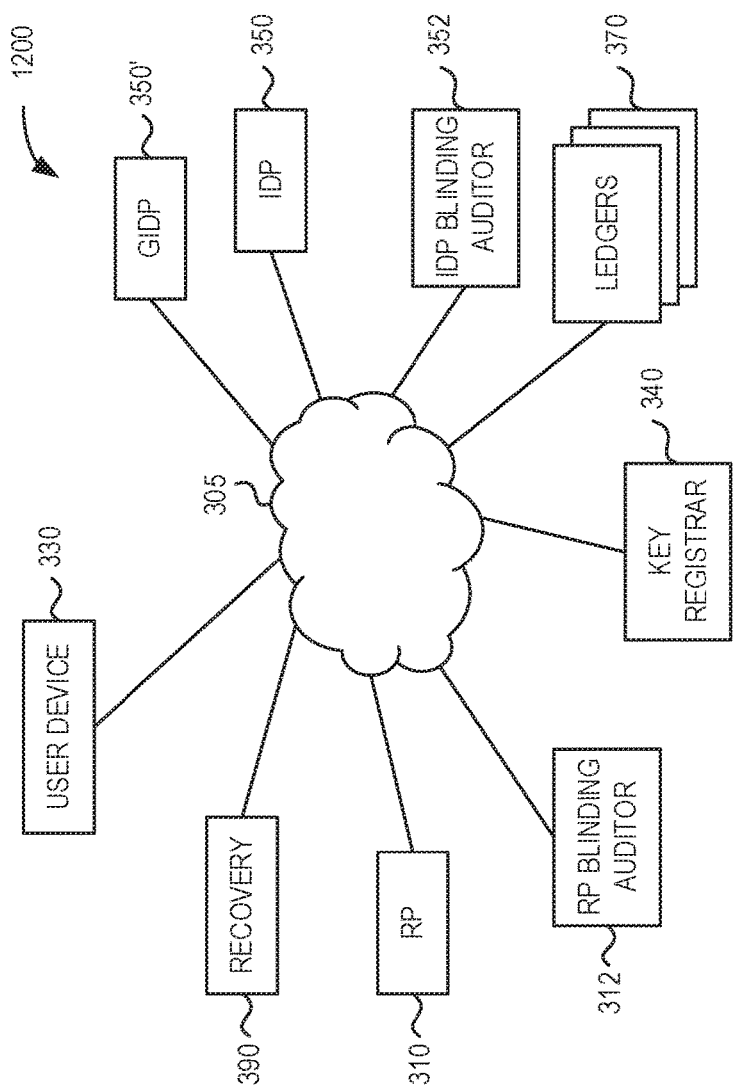
FIG. 12A is a schematic block diagram of an identity management system in accordance with at least some embodiments.

Referring now to FIG. 12A, there is illustrated a schematic block diagram of another identity management system in accordance with at least some embodiments.

Identity management system 1200 is generally analogous to system 300 of FIG. 3A, excepting that system 1200 further has one or more Gateway IdP (GIdP) 350'. Accordingly, like-numbered elements of system 1200 are functionally similar to those of system 300.

GIdP 350' provides a superset of the functions of IdP 350 of FIGS. 3A and 3E. Accordingly, GIdP 350' can act as, and carry out the functions of, an IdP 350. In addition to the functions of IdP 350, GIdP 350' also provides one or more functions as described further with reference to FIGS. 13 and 14. For example, when transactions are submitted to the system, a set of GIdP servers 350' can work together to build a set of child transactions that will be submitted to segregated ledgers, as described herein. In particular, the segregated ledgers may accept only those transactions created and endorsed by other GIdP servers, to mitigate against a rogue GIdP server corrupting the ledgers.

Figure 12B:
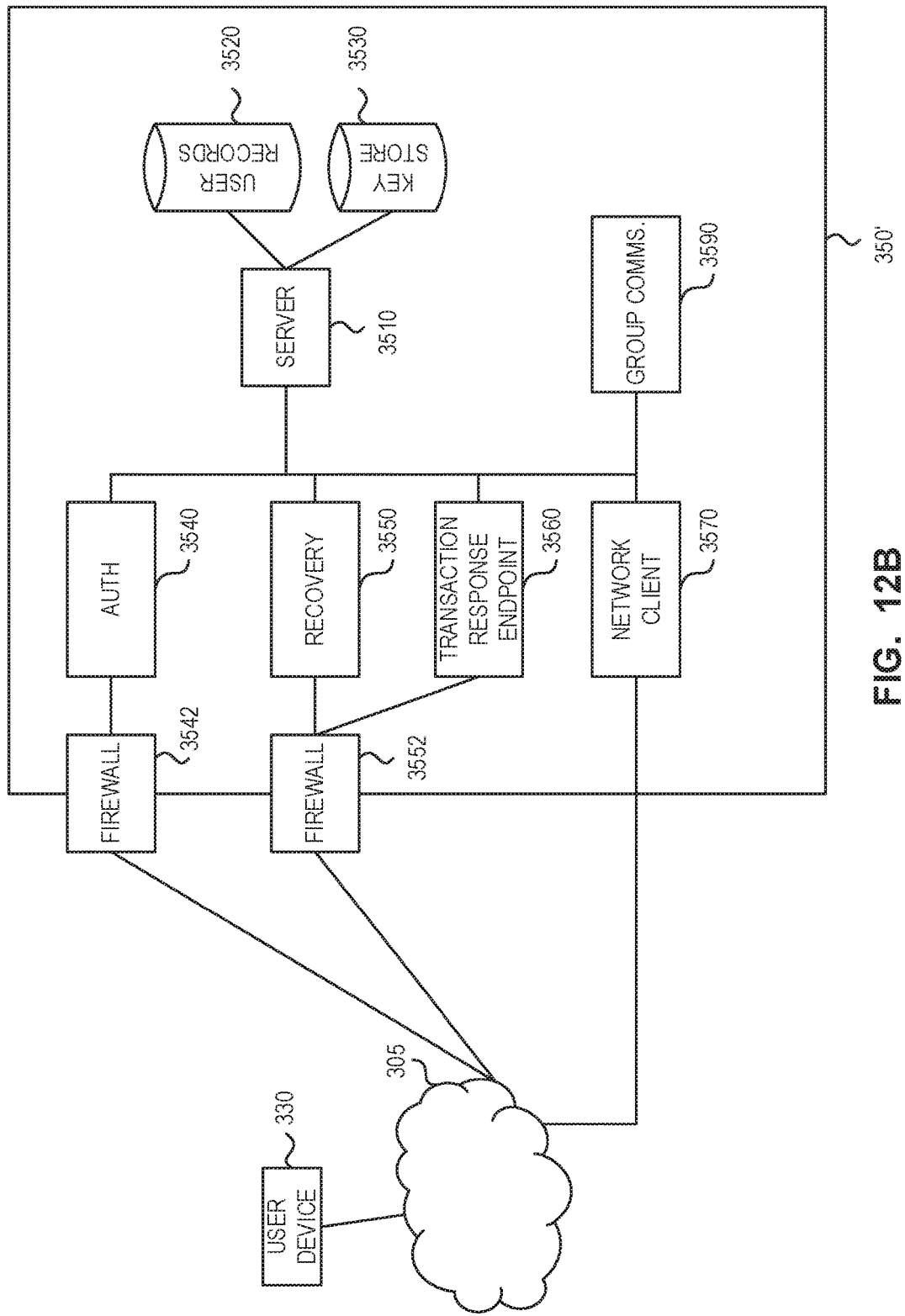
FIG. 12B is a detailed system block diagram of the GIdP server 350' of FIG. 12A and its interfaces to other elements of system 1200.

Referring now to FIG. 12B, there is illustrated a detailed system block diagram of the GIdP server 350' of FIG. 12A and its interfaces to other elements of system 1200. As described herein, GIdP server 350' provides a superset of the functions of IdP 350, therefore like-numbered elements function in similar fashion. GIdP server 350' further has a group communication module 3590, for communication with other GIdP servers 350' as described herein.

IdP server 350 is generally provided or operated by an entity that can provide one or more user identity attributes, because the user has some sort of relationship with the entity. For example, the entity may be a financial institution or a government agency. In many cases, the entity will have procedures for the real-world verification of identity attributes, which means that identity attributes will have strong assurances when their origin is the IdP.

GIdP server 350' may also be provided or operated by an entity that can provide one or more user identity attributes. In addition to providing user identity attributes, GIdP server 350' may be part of a group of GIdP servers 350', which may be operated by a trusted consortium. The group of GIdP servers 350' can split transactions into child transactions for processing by a subset of the group members. Thereafter, a transaction can be verified as valid if a consensus is reached by the group members processing their respective child transactions. Examples of child transactions may include processing blind queries (e.g., where the user agent server or RP is unaware of the specific IdP or GIdP server that has possession of an attribute), or generating data that may require multiple verifiers or issuers (e.g., generating a trusted certificate).

Generally, child transactions may be created and used in situations where, for example, the user agent server should not be aware that the child transaction is being performed, the user agent server is not trusted to perform a transaction, or if the user agent server lacks sufficient information to carry out the transaction. For example, audit records may be created for certain types of transactions, in which the transaction is triggered by the user agent server, with updates to multiple ledgers being formed as a result.

In another example, child transactions may be used where the specific ledger used to store or record data is not known to the user agent, and should not be known for security reasons. In this case, an intermediate server, such as a GIdP can be delegated responsibility for the transaction, with the GIdP determining the destination ledger and creating the necessary child transactions. In such cases, to preserve the "triple blind" principle, the delegated GIdP may provide temporary storage for transaction data so that senders and receivers need not connect directly. In the case of a relying party transaction for example, a first encryption key may be derived (from previously provided derivation materials) and delivered directly by the user agent server to the receiver; a second key can be provided by the RP server to the GIdP, which can be used to apply a second layer of encryption to the transaction data); and a third key may be generated to provide session encryption (e.g., TLS) between the GIdP and IdP.

In the case where transaction data may be repeated (e.g., digital content assets, such as audio or video files), a unique per-transaction identifier for the asset may be generated by the custodian of the asset. This identifier can be broadcast, e.g., in a blind query as described herein, to retrieve the requested asst.

In some cases, child transactions can be created to limit the amount of correlatable information that is received by an endorser or auditor. For example, parameters related to a RP or IdP may be separated from parameters related to a user agent server, with each set of parameters sent to different endorsers or auditors. To link the transactions, a new and unique non-correlatable identifier can be created.

Child transactions may be singular or plural. In the latter case, when there are multiple transactions, a proof transaction may be the final child transaction created, which links to the prior transactions and can be used to verify that all prior child transactions in the set were successful. In such cases, the absence of a proof transaction may be used as evidence that the set of child transactions was not successful.

Figure 13:
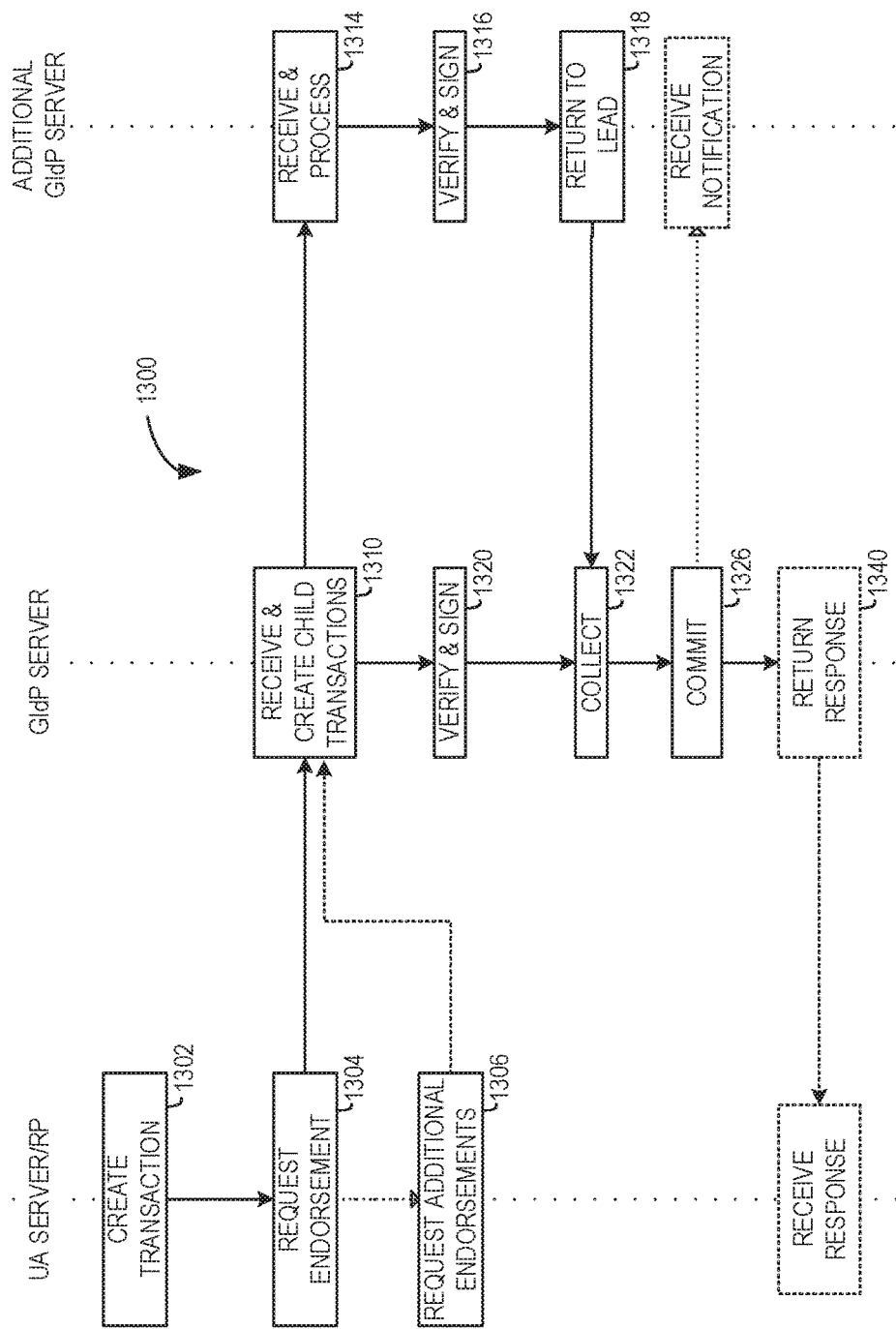
FIG. 13 is a process flow diagram for an example child transaction.

Referring now to FIG. 13, there is illustrated an example child transaction process flow diagram. As noted, child transaction process 1300 may be invoked when a user agent server initiates a transaction with an IdP, or when a RP initiates a transaction with an IdP, and so forth. Examples of child transactions that may be created include, but are not limited to:

Digital lock box provider ledger transactions, to create pseudonyms or IdP-specific user addresses, manage user data, etc.;

Digital lock box provider audit ledger transactions, to preserve digital lock box provider transaction evidence;

Custodian ledger transactions, to create digital assets, associate identifiers, and so forth;

Custodian auditor ledger transactions to preserve custodian transaction evidence;

Billing ledger transactions to assign billing codes to transactions;

Billing auditor ledger transactions to preserve billing transaction evidence;

GIdP ledger to store transactions and any transaction data temporarily held in escrow; and Distributed audit ledger transactions to preserve evidence of transaction existence across multiple ledgers (e.g., without revealing privacy and confidentiality).

Generally, for each transaction, a set of parameters may be considered transient, that is parameters that should be recorded only within an auditor ledger and not stored within a corresponding ledger. To preserve such parameters, a preservation transaction can be created in the appropriate audit ledger, to store the transaction parameters.

The child transaction process involves three major parts: creation, endorsement, and commit. In some cases, endorsement may be obtained or required from multiple peers, and validation against an endorsement policy can be performed at commit time, by each committer. In some other cases, a proof transaction may be used. In still other embodiments, validation by each committer and a separate proof transaction for each committer may be used.

Child transaction process 1300 begins at 1302, with a user agent server or RP server initiating a transaction and signing transaction data. In some cases, the transaction may require endorsement, accordingly at 1304, the transaction data is transmitted to a GIdP server. In some embodiments, multiple endorsers may be required, accordingly the transaction data may be transmitted to additional peers at 1306, which thereupon execute a similar process, beginning at 1310. In some cases, the user agent server or RP server may transmit a unique value (e.g., a transaction ID) that can be used by multiple GIdP servers to validate transactions in a deterministic way.

The GIdP server receives the transaction data at 1310 and determines that one or more child transactions are required, creates the one or more child transaction, and transmits it to one or more peer GIdP server in the group, where it is received at 1314. In some cases, one or more of the child transactions may require further child transactions (e.g., grandchild transactions), and may be processed in similar fashion.

The initiating GIdP server verifies the transaction data at 1320 and signs it if valid. Similarly, each other GIdP server similarly performs a verification of the transaction data and signs an endorsement if valid at 1316. An endorsement (e.g., signed transaction data) can be returned to the lead GIdP server at 1318.

In some embodiments, a GIdP server may validate the identity of each party to a transaction. This information can be sensitive and therefore may be hidden or encrypted in such a way that it can only be revealed during an audit.

At 1322, a lead GIdP server, which may be the initiating GIdP server, collects the signed endorsements. In some cases, the lead GIdP server may wait to collect a predetermined threshold number of endorsements (e.g., to verify that there is a consensus) before determining that the collective endorsement is valid. Such predetermined threshold number may be specified by a group policy. The lead GIdP server may be elected on a per-transaction basis, for example, to distribute processing loads.

If the transaction requires that the transaction be committed to a ledger, it may be committed by the initiating GIdP server at 1326, and on successful commit, the other group GIdP servers may be notified. Generally, the commit can occur following acknowledgment that a consensus has been formed, and that the ledgers of all other participating GIdP servers have been updated. However, in some cases, commits can occur in parallel, and a transaction commit can be verified only if all commits are successfully made.

If necessary, the initiating GIdP server may transmit a response to the user agent server or RP server at 1340.

As described elsewhere herein, to maintain security and auditability, certain transactions can be signed by one or more endorser (e.g., IdP) and evidence of this signature included in one or more ledgers. When submitting a transaction to an endorser, the endorser can validate a user agent server credential and that the request originated from the user agent server, for example because the transaction is signed by the user agent server using a private key.

In some embodiments, there may be a desire to validate users as members of the system. In such cases, the user agent server may be provisioned with a certificate based on a cryptographic key pair (e.g., X.509 certificate), using one or more IdP servers or GIdP servers configured to perform the role of X.509 certificate authorities. Such servers may issue long term keys to user agents (e.g., in the form of enrollment certificates or "E-Certs"). To enhance privacy, in some embodiments, one or more alternate key or transaction key can be used for some transactions, which can be in the form of transaction certificates or "T-Certs". Evidence of a link between E-Certs and T-Certs can be provided via the use of key derivation to create the T-Certs, or the certificate authorities may maintain a database of links. Such an approach allows for a signature to be used thereby allowing later auditability of the ledger, in which the signature demonstrates that a particular member originated a transaction. However, in some cases, the issuer of the T-Certs may be able to deduce the identity of the certificate holder, diminishing privacy. Moreover, derivation material used to generate the certificates may be stored in a single database, representing a single point of failure.

In some alternative embodiments, however, alternate certificate issuing mechanisms may be available instead of the single CA model, or in addition to the traditional model. Such an approach removes the need for fetching T-Certs from a single issuer, removes the need for each organization to have its own CA, and removes the need for auditing material to be maintained by each CA.

Figure 14:
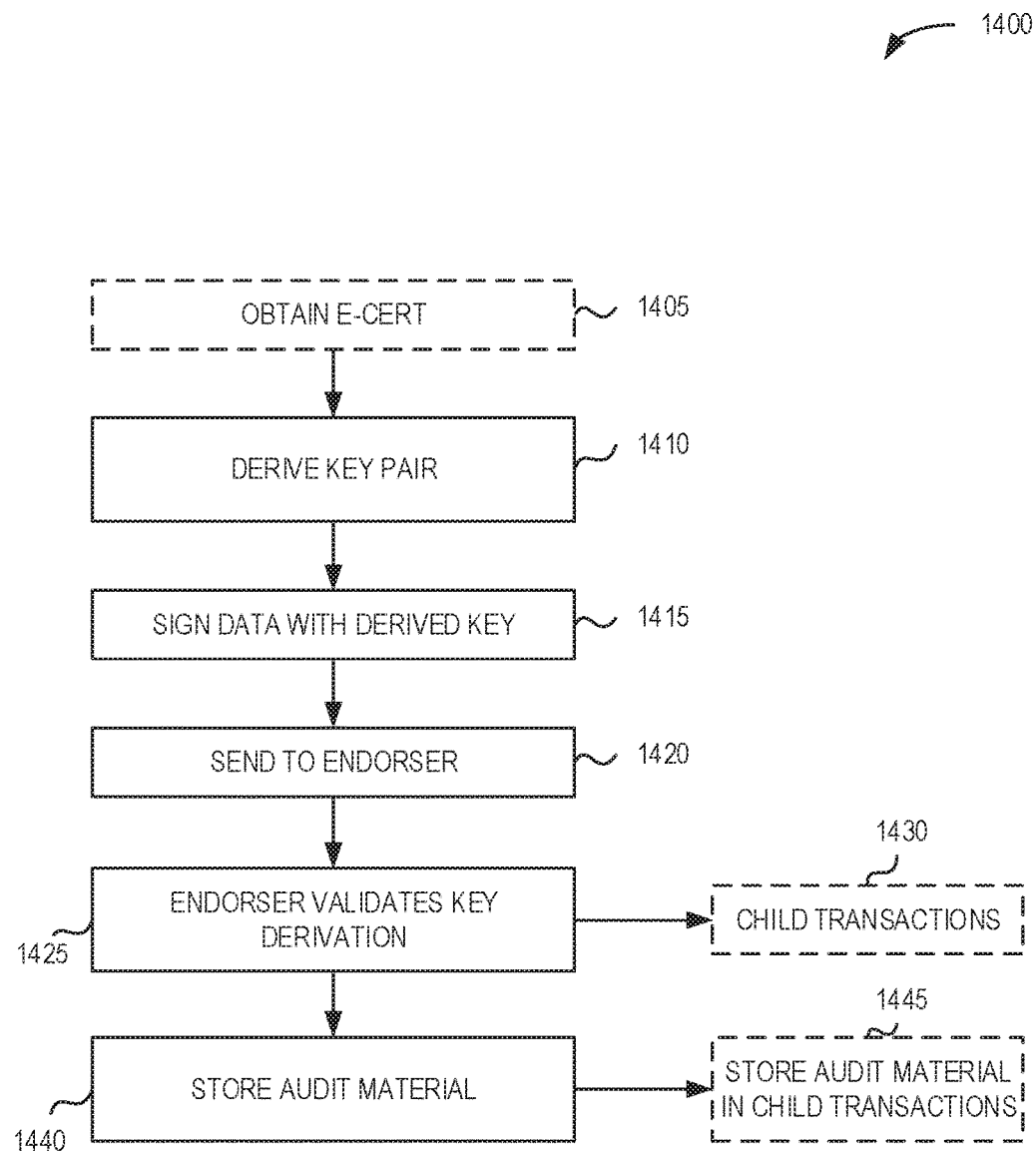
FIG. 14 is a process flow diagram for an example method of using a transaction certificate in accordance with some embodiments.

Referring now to FIG. 14, there is illustrated an example process flow diagram for a method of using a T-Cert for a transaction in accordance with some embodiments.

Transaction process 1400 begins at 1405, with a user agent server obtaining an E-Cert from an IdP. In some cases, there may be specialized certificate authority IdPs which are deputized to perform as a CA by a consortium of organizations, for example, as part of a distributed ledger system. In some cases, such CA IdPs may issue the equivalent of T-Certs for use with another IdP at a later time.

If an E-Cert has previously been obtained, then 1405 may be omitted.

In some cases, a user agent server may obtain multiple E-Certs from various IdPs or CA IdPs, which may be used in a single transaction, depending on the transaction requirements.

At 1410, the user agent server derives a key pair from the E-Cert key pair, according to a predetermined derivation function, as described herein, for use in the transaction.

At 1415, the user agent server signs the desired transaction data using the derived key. At 1420, the user agent server transmits the transaction data and the derived public key (or a self-signed certificate) to the IdP. The user agent server may also transmit a proof of derivation of the derived key, which may have, for example, the E-Cert, derivation material used, and so forth.

At 1425, the key derivation is validated. Depending on the IdP, the key derivation may be validated at the receiving IdP, or may be delegated to one or more other IdPs for validation. For example, child transactions may be used at 1430, as described herein with reference to FIG. 13.

At 1440, the IdP or validating IdPs may validate the transaction and store any required audit materials in an audit ledger, as described elsewhere herein. Validation may involve, for example:

Organization validity and signature check (e.g., on the T-Cert used for the transaction)

A policy check (e.g., is the organization allowed to perform this transaction?)

User authentication check (e.g., is the associated user identifier authenticated by the user agent keys and/or the digital lock box provider?)

Authorization check (e.g., does the user agent hold a license for the digital asset?)

Optionally, audit materials may also be stored using child transactions at 1445, for example to store blinded hashes in shared ledger, store hidden privacy parameters an auditor ledger, and to store appropriate non-hidden parameters with an auditor ledger.

Investigations/Audits

When an investigation or audit is desired for a particular transaction, the unique transaction identifier for the transaction in question can be provided to the relevant auditor ledger for that transaction, or in some cases a designated contact. The auditor ledger or designated contact can then retrieve the required information for the audit, from the ledger.

In some cases, when requesting an audit, the requesting party may be required to provide a reason or rationale for the audit request, which can subsequently be stored in the auditor ledger (e.g., as a salted hash).

Once the initial information is retrieved, each auditor ledger for every other party to the transaction can be requested to approve the audit and unlock the necessary decryption keys (e.g., provide parts of keys needed to reconstruct the decryption key).

Once a sufficient number auditor ledgers have approved the unlock procedure, the auditors are requested to provide their key parts to the initial auditor. For example, each individual auditor may Read their encrypted key part from the auditor ledger;
Decrypt using their assigned private key;
Encrypt using an agreed upon public key (e.g., that of the initiating auditor);
Transmit the encrypted keyshare to the initiating auditor; and
Record the audit in the audit ledger.

Once the initiating auditor has a sufficient set of key parts, the decryption key can be reconstructed, and used to decrypt the preserved transaction record, validate the signature on the transaction, and ensure that the appropriate ledger records exist in the relevant auditor ledgers.

In some cases, the audit procedure can be nested to retrieve one type of audit record, and use the result of that retrieval to audit a further set of related records. For example, an auditor may audit the transactions performed by particular pseudonymous user identifier, and use the transaction identifiers thus obtained to request audits of the transactions themselves.

Custodian Registration

As described herein, a custodian is a designated entity that can store data, or conduct transactions, on behalf of another entity. For example, a digital lock box provider may act as custodian for some user agent servers.

Generally, each custodian will have its own set of ledgers: one for the custodian itself and at least one for the custodian and any auditors. Cryptographic certificates and key pairs may be generated and registered to provide access control to those ledgers by the respective auditors. Any public keys can be recorded in a configuration ledger, while private keys can be protected using key splitting, hardware security modules, and the like.

Custodian auditing keys can be split at creation, to require that multiple parties co-operate to decrypt the audit materials.

Licenses

Figure 15:
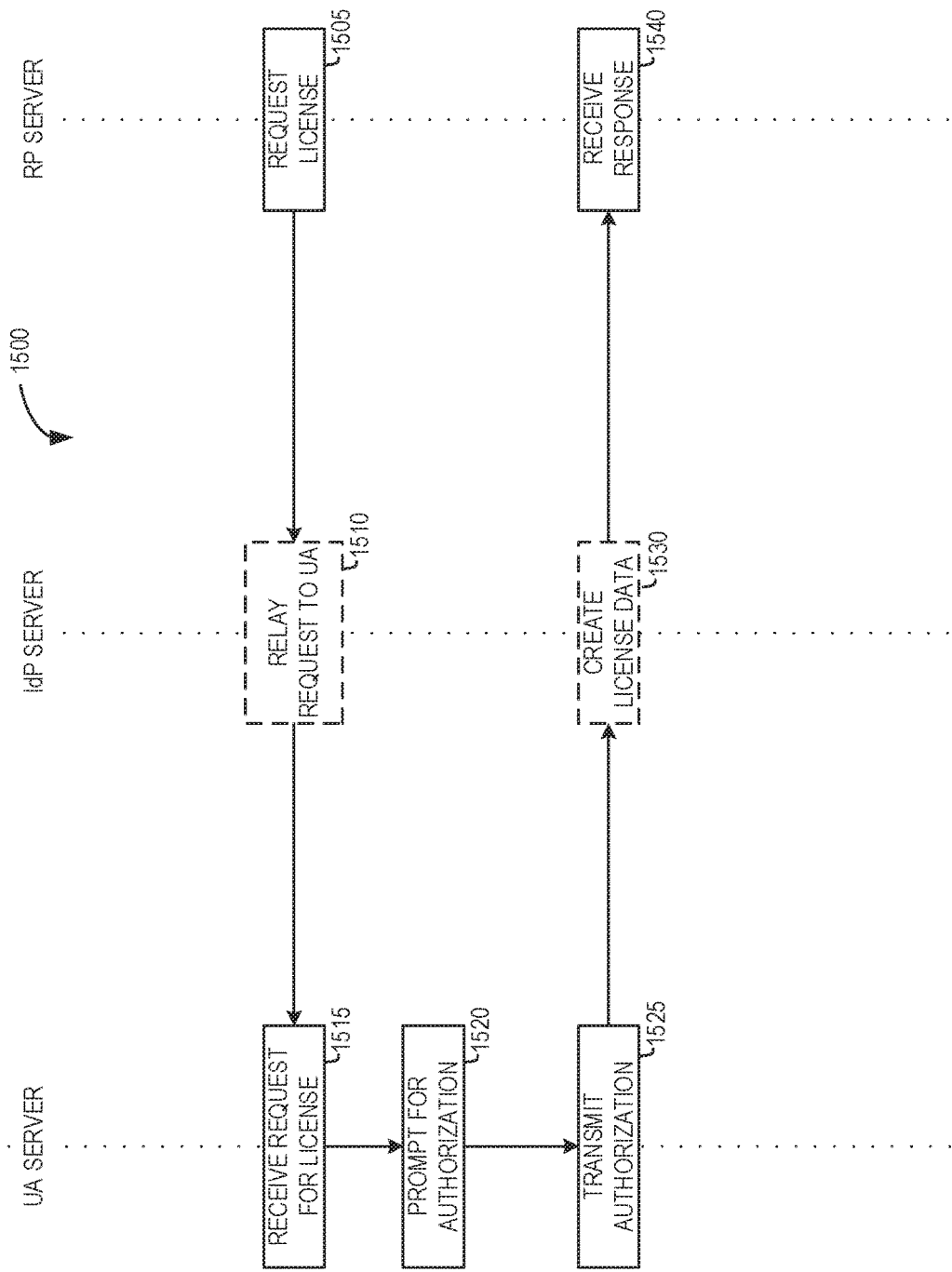
FIG. 15 is a process flow diagram for an example data license process.

Referring now to FIG. 15, there is illustrated an example data license process flow diagram. As noted above with respect to FIG. 4, in some cases, a RP server 310 may be provided access to directly retrieve from an IdP server 350 one or more attributes associated with a user. The access or "data license" may be valid for one-time use, for a limited time period, or indefinitely. In some cases, a valid data license may allow the RP server 310 to effectively access permitted user attributes in the same manner as the user agent server.

Process 1500 begins at 1505 with a RP server 310 transmitting a request for a data license from an IdP server 350 known to possess the desired attributes (e.g., where the user has provided an indication of the IdP server out-of-band). In some cases, RP server 310 may request a data license directly from a user agent server 1515, in which case the response may provide an indication of the IdP server to be used subsequently. The request may contain an identifier of the RP server, such as a public key of the RP.

At 1510, IdP server 1510 receives the request, determines the appropriate user agent server 3390 to be contacted for authorization, and relays the request to the user agent server. In some embodiments, this act may be omitted and the request may be transmitted directly to the user agent server.

At 1515, the user agent server receives the request for the data license, and prompts a user for authorization at 1520. The prompt may contain an indication of the data license request, its duration and the data attributes to be made accessible. A user may provide authorization accordingly, e.g., via a user interface.

At 1525, if user authorization is obtained, an authorization message can be transmitted to IdP server 1530. The authorization message may contain a cryptographically-signed authorization message that defines the terms under which specific attributes can be released, and to which parties. In some cases, the authorization message may contain license data, such as a cryptographic key or data usable to derive a key for accessing the licensed data attributes. In some embodiments, the authorization message and license data can be transmitted directly to the requesting RP server.

Optionally, at 1530, if the authorization has been transmitted to the IdP server by the user agent server, then the IdP server may generate license data, and relay the authorization message and license data to the RP server, which receives it at 1540.

Upon receiving the authorization and license data, the RP server may request data attributes, as authorized with the license data, directly from an IdP server in similar fashion as would be requested by a user agent server carrying out, e.g., method 400 of FIG. 4.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. An identity management method for controlling an exchange of data bundles by an identity provider server, the method comprising:
  receiving, at the identity provider server, a first request from a user agent server, the first request identifying one or more claim categories;
  generating, at the identity provider server, a data bundle at a first time in response to the first request, the data bundle identifying one or more attributes associated with a user related to the user agent server, wherein each attribute corresponds to a claim category of the one or more claim categories identified in the first request and a corresponding value;
  the identity provider server encrypting the data bundle with a user encryption key (UEK);
  transmitting, by the identity provider server, the data bundle to the user agent server;
  generating a first entry;
  signing the first entry with an identity provider private key corresponding to the identity provider server to generate a signed first entry;
  generating a second entry; and
  signing the second entry with a second key to generate a signed second entry, the second key being derived from the identity provider private key;

at a first ledger:
  verifying a signature of the identity provider server on the first entry to generate a first signature verification result;
  storing the first entry in the first ledger based on the first signature verification result; and
  transmitting a first entry address to the identity provider server, the first entry address identifying an address of the first entry in the first ledger;
at a second ledger:
  verifying a signature of the identity provider server on the second entry to generate a second signature verification result;
  storing the second entry in the second ledger based on the second signature verification result; and
  transmitting a second entry address to the identity provider server, the second entry address identifying an address of the second entry in the second ledger; and
at one or more auditor servers:
  receiving a first ledger identifier identifying the first ledger storing the first entry, a second ledger identifier identifying the second ledger storing the second entry, the first entry address and the second entry address;
  accessing the first entry based on the first ledger identifier and the first entry address;
  verifying the signature of the identity provider server on the first entry;
  accessing the second entry based on the second ledger identifier and the second entry address;
  verifying the signature of the identity provider server on the second entry;
  generating a confirmation entry for each of the one or more auditor servers, wherein each confirmation entry is based on successful verification of the signature of the identity provider server on the first entry and the signature of the identity provider server on the second entry; and
  linking the first entry address to the second ledger identifier and the second entry address to the first ledger identifier based on the confirmation entry of the one or more auditor servers,
wherein the identity provider server, the user agent server, the first ledger, the second ledger, and the one or more auditor servers are executed by one or more computing devices and communicate via a data communication network.

2. The identity management method of claim 1, further comprising, prior to receiving the first request, registering the user agent server at the identity provider server, wherein registering the user agent server at the identity provider server comprises:
  receiving a user agent public key corresponding to the user agent server and a first user agent address uniquely identifying the user agent server to the identity provider server, wherein the first user agent address and the user encryption key are at least partially based on the user agent public key; and
  transmitting an identity provider public key associated with the identity provider server to the user agent server.

3. The identity management method of claim 2, further comprising:
  generating, at the identity provider server, a data bundle ownership public key for the user agent server, the data bundle ownership public key being usable for releasing a response bundle based on one or more data bundles to a relying party server.

4. The identity management method of claim 1, further comprising:
  generating a first entry for a first ledger, the first entry comprising:
    a hashed data bundle generated by cryptographic hashing of the data bundle;
    the data bundle ownership public key;
    the identity provider public key;
    the one or more hashed attributes and corresponding blinding factor;
    a cryptographic nonce;
    metadata corresponding to the one or more attributes;
    expiry information corresponding to the one or more attributes;
    a second ledger identifier identifying a second ledger storing a corresponding second entry and a second entry address identifying an address of the second entry in the second ledger; and
    a revocation status of the data bundle.

5. The identity management method of claim 1, further comprising:
  generating a second entry for a second ledger, the second entry comprising:
    a hashed data bundle generated by cryptographic hashing of the data bundle;
    a cryptographic hash of the data bundle ownership public key and a corresponding blinding factor;
    a cryptographic hash of the identity provider public key and a corresponding blinding factor;
    the one or more hashed attributes and corresponding blinding factor;
    a cryptographic nonce;
    metadata corresponding to the one or more attributes;
    expiry information corresponding to the one or more attributes; and
    a revocation status of the data bundle.

6. The identity management method of claim 1, further comprising:
  generating an auditor bundle for the one or more auditor servers, the auditor bundle comprising a first ledger identifier identifying the first ledger storing the first entry, a second ledger identifier identifying the second ledger storing the second entry, the first entry address and the second entry address; and
  signing the auditor bundle with the identity provider private key corresponding to the identity provider server to generate a signed auditor bundle.

7. The identity management method of claim 1, wherein the identity provider server is a group identity provider server, the method further comprising:
  the identity provider server determining that a child transaction is required to fulfil the first request; and
  generating at least one child transaction request; and
  transmitting the at least one child transaction request to at least one other group identity provider server.

8. The identity management method of claim 1, further comprising:
  the identity provider server determining that a blind query is required to fulfil the first request; and
  generating at least one blind query; and
  transmitting the at least one blind query to at least one other identity provider server.

9. An identity management system for controlling an exchange of data bundles, the system comprising:

a data communication network;

a user agent server configured to transmit a first request identifying one or more claim categories to an identity provider server via the data communication network;

the identity provider server in communication with the user agent server via the data communication network, the identity provider server being configured to:
receive the first request;
generate a data bundle at a first time in response to the first request, the data bundle identifying one or more attributes associated with a user related to the user agent server, wherein each attribute corresponds to a claim category of the one or more claim categories identified in the first request and a corresponding value;
transmit the data bundle to the user agent server;
generate a first entry;
sign the first entry with an identity provider private key corresponding to the identity provider server to generate a signed first entry;
generate a second entry; and
sign the second entry with a second key to generate a signed second entry, the second key being derived from the identity provider private key;

a first ledger in communication with the data communication network and configured to:
verify a signature of the identity provider server on the first entry to generate a first signature verification result;
store the first entry in the first ledger based on the first signature verification result; and
transmit a first entry address to the identity provider server, the first entry address identifying an address of the first entry in the first ledger;

a second ledger in communication with the data communication network and configured to:
verify signature of the identity provider server on the second entry to generate a second signature verification result;
store the second entry in the second ledger based on the second signature verification result; and
transmit a second entry address to the identity provider server, the second entry address identifying an address of the second entry in the second ledger; and one or more auditor servers in communication with the first ledger and the second ledger via the data communication network, the one or more auditor servers configured to:
receive a first ledger identifier identifying the first ledger storing the first entry, a second ledger identifier identifying the second ledger storing the second entry, the first entry address and the second entry address;
access the first entry based on the first ledger identifier and the first entry address;
verify the signature of the identity provider server on the first entry;
access the second entry based on the second ledger identifier and the second entry address;
verify the signature of the identity provider server on the second entry;
generate a confirmation entry for each of the one or more auditor servers, wherein each confirmation entry is based on successful verification of the signature of the identity provider server on the first entry and the signature of the identity provider server on the second entry; and
link the first entry address to the second ledger identifier and the second entry address to the first ledger identifier based on the confirmation entry of the one or more auditor servers, wherein the identity provider server, the user agent server, the first ledger, the second ledger, and the one or more auditor servers are executed by one or more computing devices.

* * * * *